(12) United States Patent
Myung et al.

(10) Patent No.: US 11,889,439 B2
(45) Date of Patent: Jan. 30, 2024

(54) METHOD FOR RECEIVING DOWNLINK SIGNAL BY TERMINAL IN WIRELESS COMMUNICATION SYSTEM, AND TERMINAL USING SAME METHOD

(71) Applicant: LG Electronics Inc., Seoul (KR)

(72) Inventors: Sechang Myung, Seoul (KR); Seonwook Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 17/265,322

(22) PCT Filed: Aug. 9, 2019

(86) PCT No.: PCT/KR2019/010135
§ 371 (c)(1),
(2) Date: Feb. 2, 2021

(87) PCT Pub. No.: WO2020/032724
PCT Pub. Date: Feb. 13, 2020

(65) Prior Publication Data
US 2022/0377683 A1    Nov. 24, 2022

(30) Foreign Application Priority Data
Aug. 9, 2018 (KR) .................. 10-2018-0092932

(51) Int. Cl.
*H04L 12/28* (2006.01)
*H04W 56/00* (2009.01)
*H04W 74/08* (2009.01)

(52) U.S. Cl.
CPC ..... *H04W 56/001* (2013.01); *H04W 74/0816* (2013.01); *H04W 74/0841* (2013.01)

(58) Field of Classification Search
CPC ............ H04W 74/0816; H04W 56/00; H04W 74/084; H04L 12/50
(Continued)

(56) References Cited

U.S. PATENT DOCUMENTS

2017/0238304 A1* 8/2017 Ling ................ H04L 5/0037
                                                   370/336
2018/0041295 A1* 2/2018 Zheng ................ H04B 17/382
(Continued)

FOREIGN PATENT DOCUMENTS

KR        20170137169        12/2017

OTHER PUBLICATIONS

Huawei, HiSilicon, "NR frame structure on unlicensed bands," R1-1805917, 3GPP TSG RAN WG1 Meeting #93, Busan, Korea, May 21-May 25, 2018, 8 pages.
(Continued)

*Primary Examiner* — Dang T Ton
(74) *Attorney, Agent, or Firm* — Fish & Richardson P.C.

(57) ABSTRACT

Proposed is a method for receiving a downlink signal by a terminal in a wireless communication system. The method comprises: receiving a synchronization signal block (SSB) from an initiating device; and receiving a downlink signal from the initiating device, wherein the SSB is periodically transmitted in every Nth fixed frame period, the N is an integer equal to or greater than 1, and transmission of the SSB is started at the first time resource included in the every Nth fixed frame period.

13 Claims, 41 Drawing Sheets

(58) Field of Classification Search
USPC .................. 370/329, 401, 400, 402, 465
See application file for complete search history.

(56) References Cited

U.S. PATENT DOCUMENTS

2018/0103458 A1    4/2018   Tooher et al.
2020/0112978 A1*   4/2020   Zhang .................. H04W 16/14

OTHER PUBLICATIONS

ITL, "On NR PBCH Design," R1-1705793, 3GPP TSG RAN WG1 Meeting #88bis, Spokane, USA, dated Apr. 3-7, 2017, 10 pages.
Qualcomm Incorporated, "TxOP Frame Structure for NR unlicensed," R1-1807386, 3GPP TSG RAN WG1 Meeting #93, Busan, Korea, dated May 20-May 25, 2018, 8 pages.

* cited by examiner

[Parity-check matrix]

[Protograph]

(a)

$$F = \begin{bmatrix} 1 & 0 \\ 1 & 1 \end{bmatrix}$$

(b)

METHOD FOR RECEIVING DOWNLINK SIGNAL BY TERMINAL IN WIRELESS COMMUNICATION SYSTEM, AND TERMINAL USING SAME METHOD

CROSS-REFERENCE TO RELATED APPLICATIONS

This application is a National Stage application under 35 U.S.C. § 371 of International Application No. PCT/KR2019/010135, filed on Aug. 9, 2019, which claims the benefit of Korean Patent Application No. 10-2018-0092932 filed on Aug. 9, 2018. The disclosures of the prior applications are incorporated by reference in their entirety.

BACKGROUND OF THE DISCLOSURE

Field of the Disclosure

The present disclosure relates to wireless communication and, more particularly, to a method for receiving downlink signals performed by a user equipment in a wireless communication system and a user equipment using the method.

Related Art

As a larger number of communication devices require greater communication capacity than before, a requirement for efficient utilization of limited frequency bands becomes more and more important in the next-generation wireless communication system. Furthermore, cellular communication systems such as the LTE/NR system are considering using an unlicensed band such as the 2.4 GHz band mostly used for the conventional WiFi systems and unlicensed bands such as the 5 GHz and 60 GHz bands recently receiving attention for traffic offloading.

Since operating a wireless system in an unlicensed band basically assumes wireless transmission and reception through contention among communication nodes, each communication node is requested to confirm, before transmitting its signal by performing channel sensing, that other communication nodes are not transmitting a signal. For the sake of convenience, the aforementioned operation is referred to as Listen Before Talk (LBT) or Channel Access Procedure (CAP); particularly, the operation of checking whether another communication node is transmitting a signal is referred to as Carrier Sensing (CS), and a case where other communication nodes are not transmitting a signal is defined as being confirmed by Clear Channel Assessment (CCA).

Meanwhile, devices performing LBT may be divided into Frame Based Equipment (FBE) and Load Based Equipment (LBE) depending on their mechanism employed. More specifically, FBE refers to the device of which the transmit/receive structure has periodic timing that is the same as a fixed frame period, and LBE refers to the device of which the transmit/receive structure is not fixed on the time domain but is demand-driven.

A base station or a user equipment of the LTE/NR system also has to perform LBT to transmit a signal in an unlicensed band (for the sake of convenience, it is referred to as a U-band), and when the base station or the user equipment of the LTE/NR system transmits a signal, other communication nodes such as Wi-Fi nodes also have to perform LBT to avoid causing interference. At this time, different from the conventional LTE-LAA, as introduction of FBE-based LBT technique to the NR system is considered, a new technology is required for communication using the unlicensed bands.

SUMMARY

An object of the present disclosure is to provide a method for receiving downlink signals performed by a UE in a wireless communication system and a UE using the method.

In one aspect, provided is method for receiving a downlink signal performed by a user equipment (UE) in a wireless communication system. The method comprises receiving a Synchronization Signal Block (SSB) from an initiating device; and receiving the downlink signal from the initiating device, wherein the SSB is transmitted periodically on every N-th Fixed Frame Period (FFP), wherein the N is an integer larger than or equal to 1, and wherein a transmission start position of the SSB is a first time resource included in every N-th FFP.

Herein, at least one of the SSB and the downlink signal may be transmitted on an unlicensed band.

Herein, the initiating device may be a base station.

Herein, the FFP may be determined by the base station.

Herein, the FFP may be less than or equal to 10 milliseconds (ms).

Herein, a transmission period of the SSB may be the same as a measurement period related to cell measurement.

Herein, the cell measurement may be a measurement of a serving cell or a neighboring cell.

Herein, the FFP may include a channel occupancy time and an idle period, and the idle period may include an observation slot.

Herein, the UE may receive the SSB and the downlink signal within a specific channel occupancy time.

Herein, based on the downlink signal including an uplink grant, the UE may perform uplink transmission to the initiating device from the time at which the uplink grant is received to the end time of the specific channel occupancy time.

Herein, the uplink transmission may include transmission related to a Random Access Channel (RACH).

Herein, a first parameter configured for a first operator related to the initiating device may be different from a second parameter configured for a second operator, and the first parameter may be at least one of the length of an observation slot, a contention window size, and a Clear Channel Assessment (CCA) threshold.

In another aspect, provided is a user equipment, comprising: a transceiver transmitting and receiving a radio signal; and a processor operating by being combined with the transceiver, wherein the processor is configured to: receive a Synchronization Signal Block (SSB) from an initiating device; and receive the downlink signal from the initiating device, wherein the SSB is transmitted periodically on every N-th Fixed Frame Period (FFP), wherein the N is an integer larger than or equal to 1, and wherein a transmission start position of the SSB is a first time resource included in every N-th FFP.

Herein, the UE may communicate with at least one of a mobile terminal, a network, and a self-driving vehicle other than the UE.

The present disclosure proposes a new unlicensed band-based communication method according to the introduction of an FBE-based LBT technique. Furthermore, communication operations may be performed more resource-efficiently according to the present disclosure.

DESCRIPTION OF EXEMPLARY EMBODIMENTS

In what follows, "/" and "," used in the present disclosure should be interpreted to mean "and/or". For example, "A/B" may mean "A and/or B". Furthermore, "A, B" may mean "A and/or B". Furthermore, "A/B/C" may mean "at least one of A, B and/or C". Furthermore, "A, B, C" may mean "at least one of A, B and/or C".

Furthermore, in what follows, "or" used in the present disclosure should be interpreted to mean "and/or". For example, "A or B" may include "only A", "only B", and/or "both of A and B". In other words, in what follows, "or" in the present disclosure should be interpreted to mean "additionally or alternatively".

Figure 1:
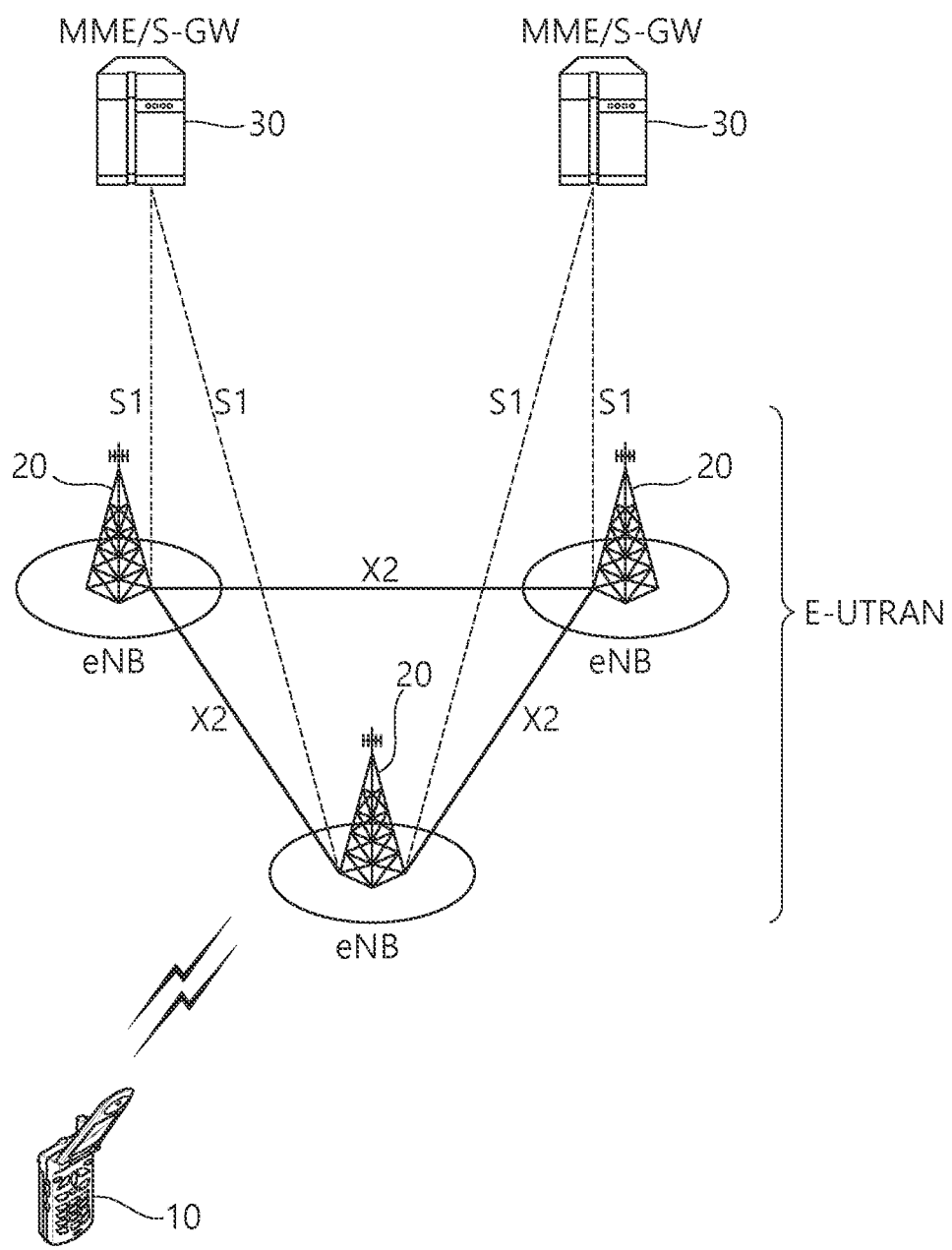
FIG. 1 shows a wireless communication system to which the present description may be applied.

FIG. 1 shows a wireless communication system to which the present description may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
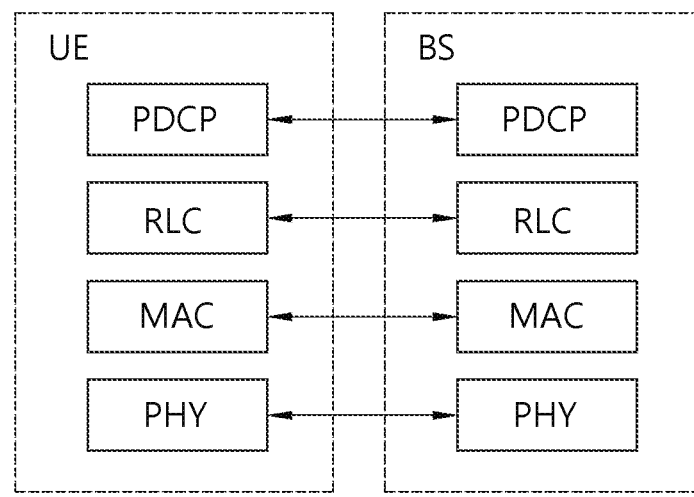
FIG. 2 is a diagram showing a wireless protocol architecture for a user plane.
Figure 3:
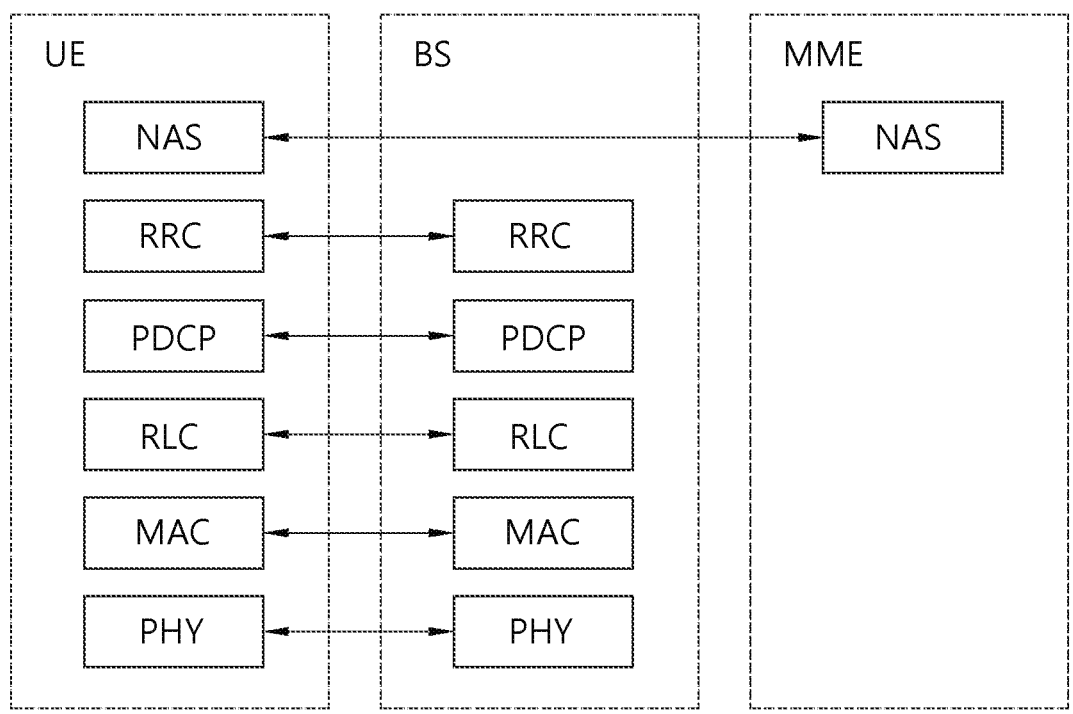
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present description for convenience.

Figure 4:
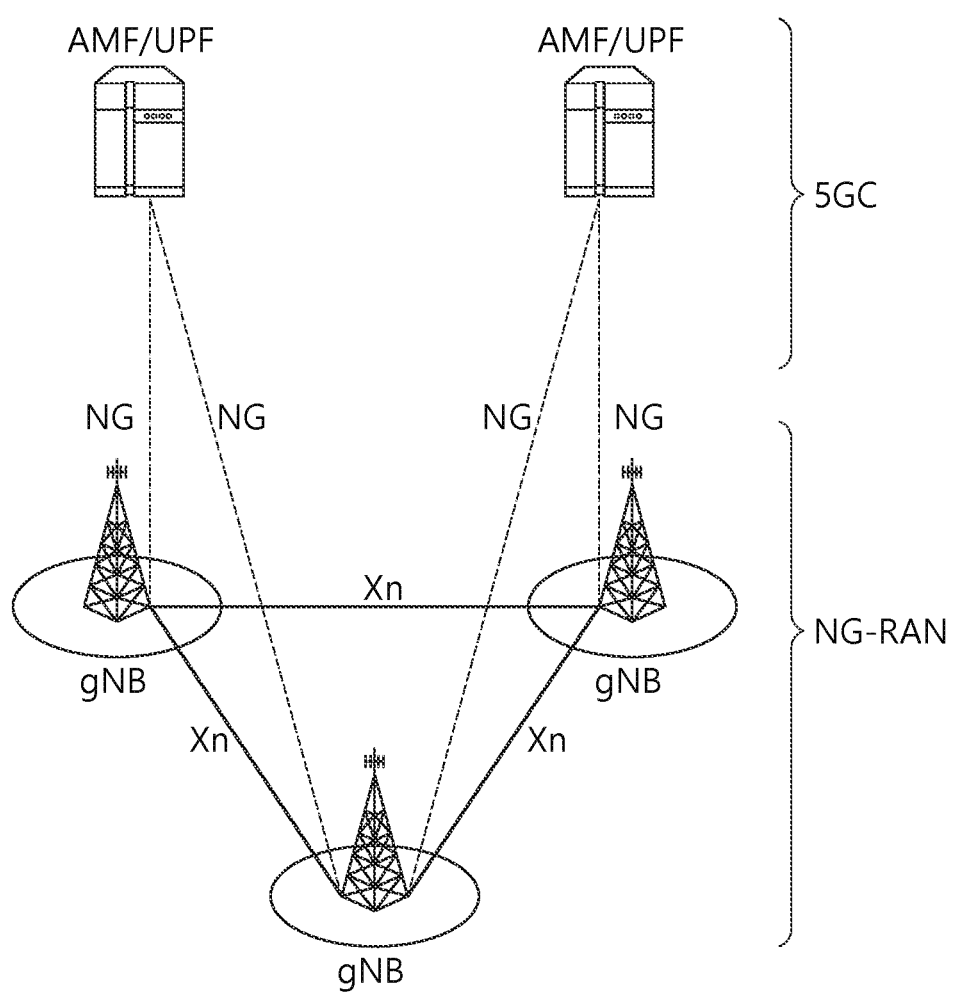
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
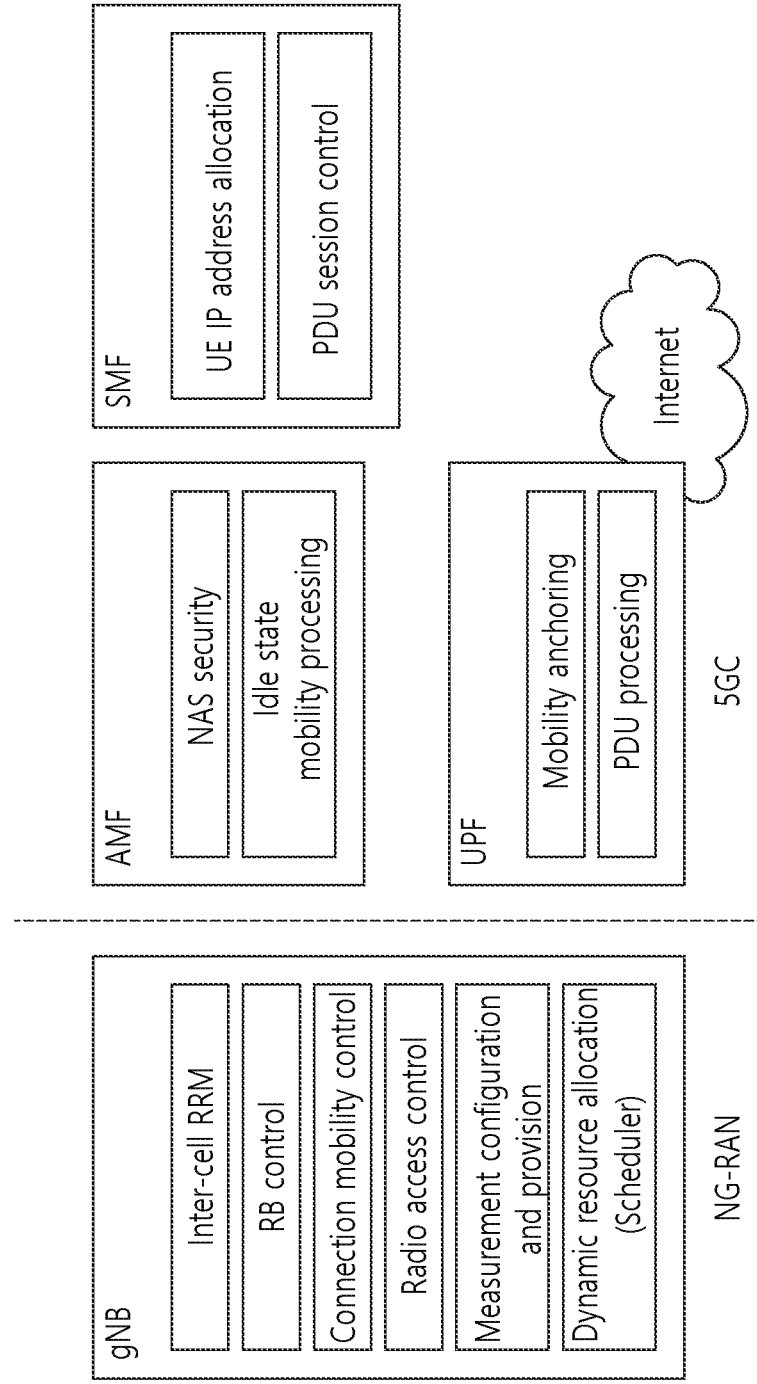
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
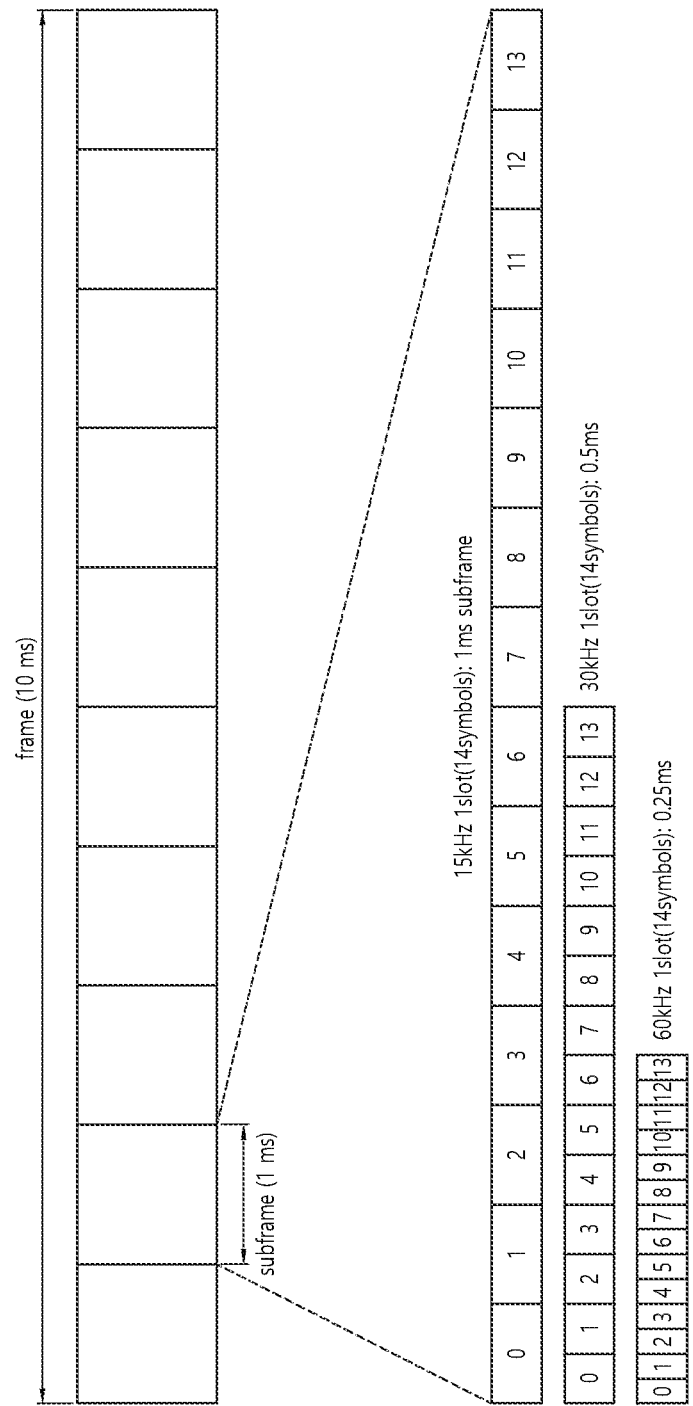
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration p.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 7:
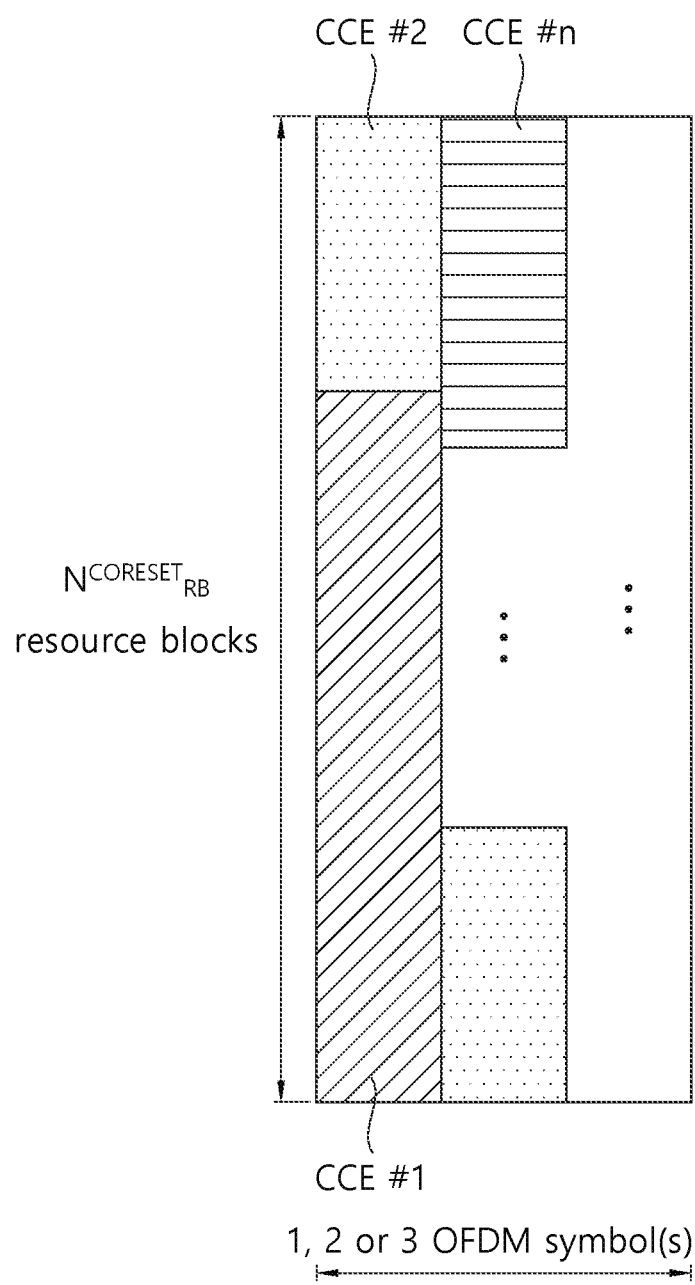
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal/UE.

Figure 8:
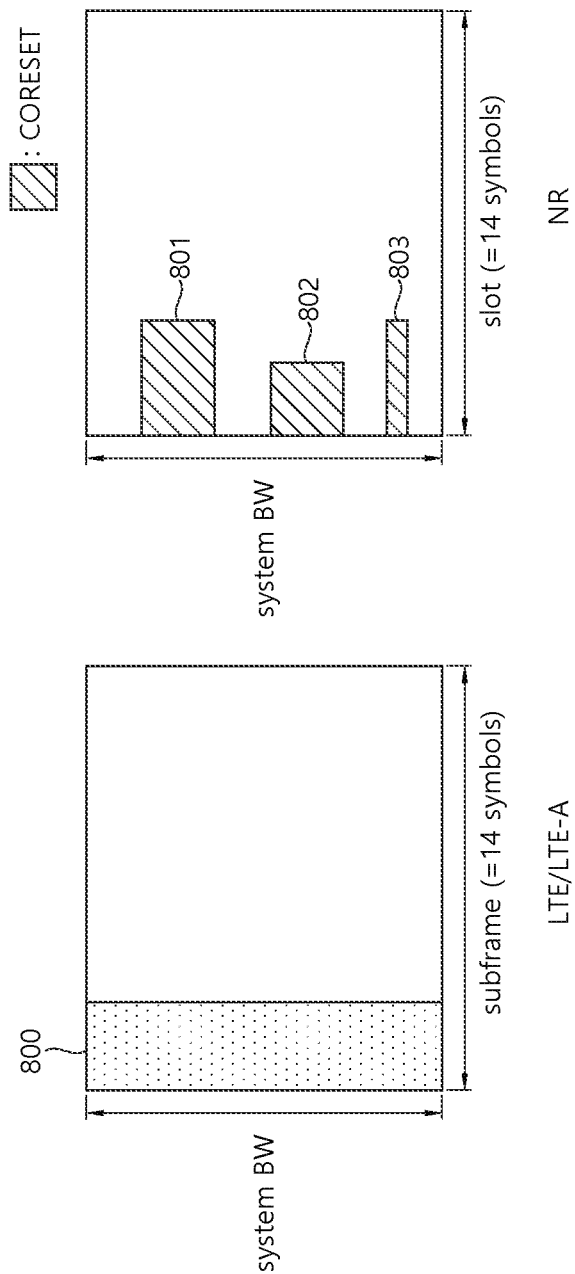
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
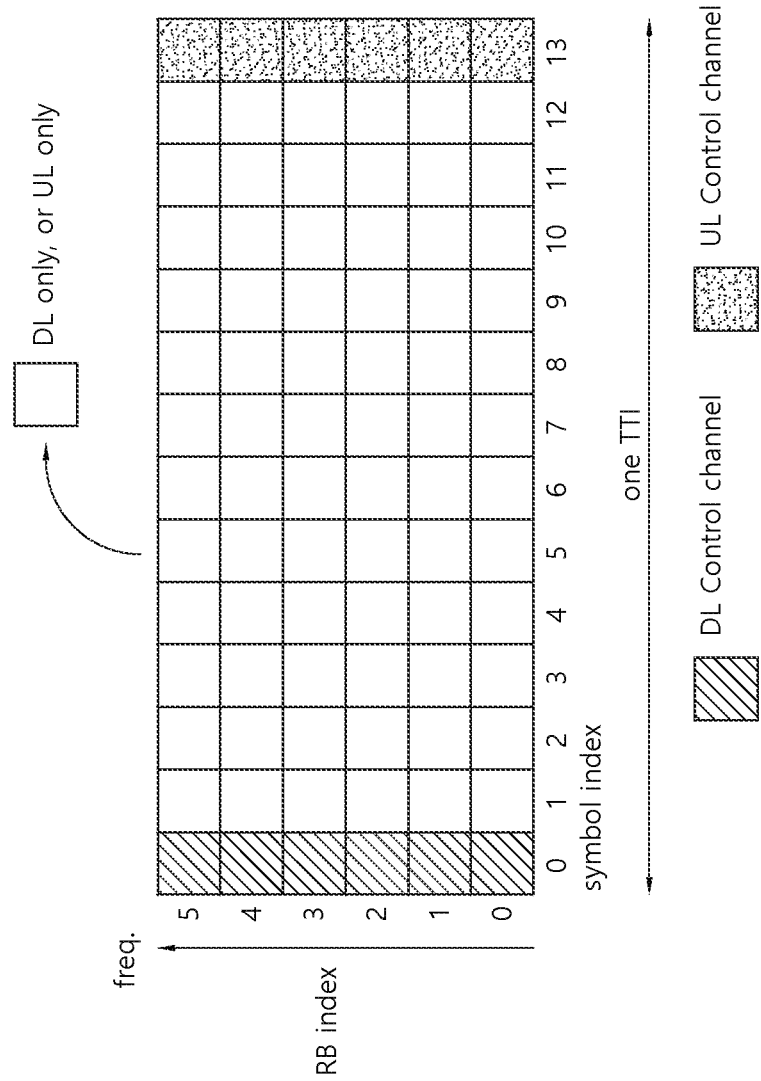
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
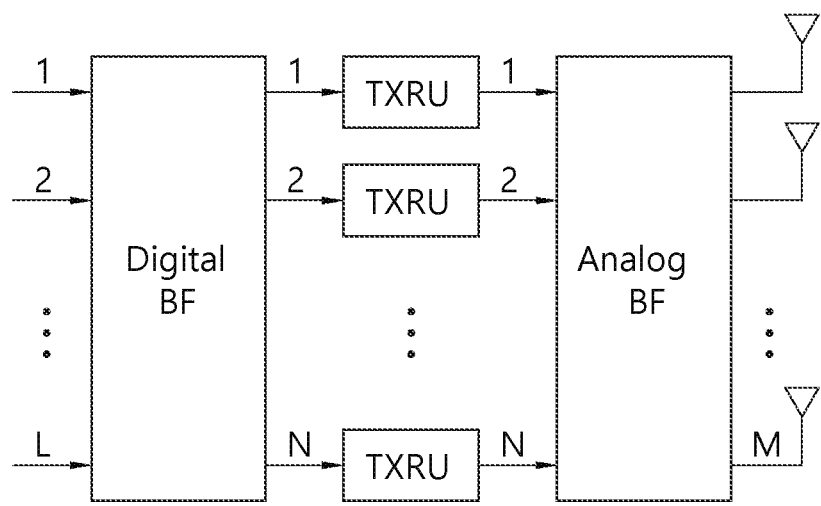
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 10, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
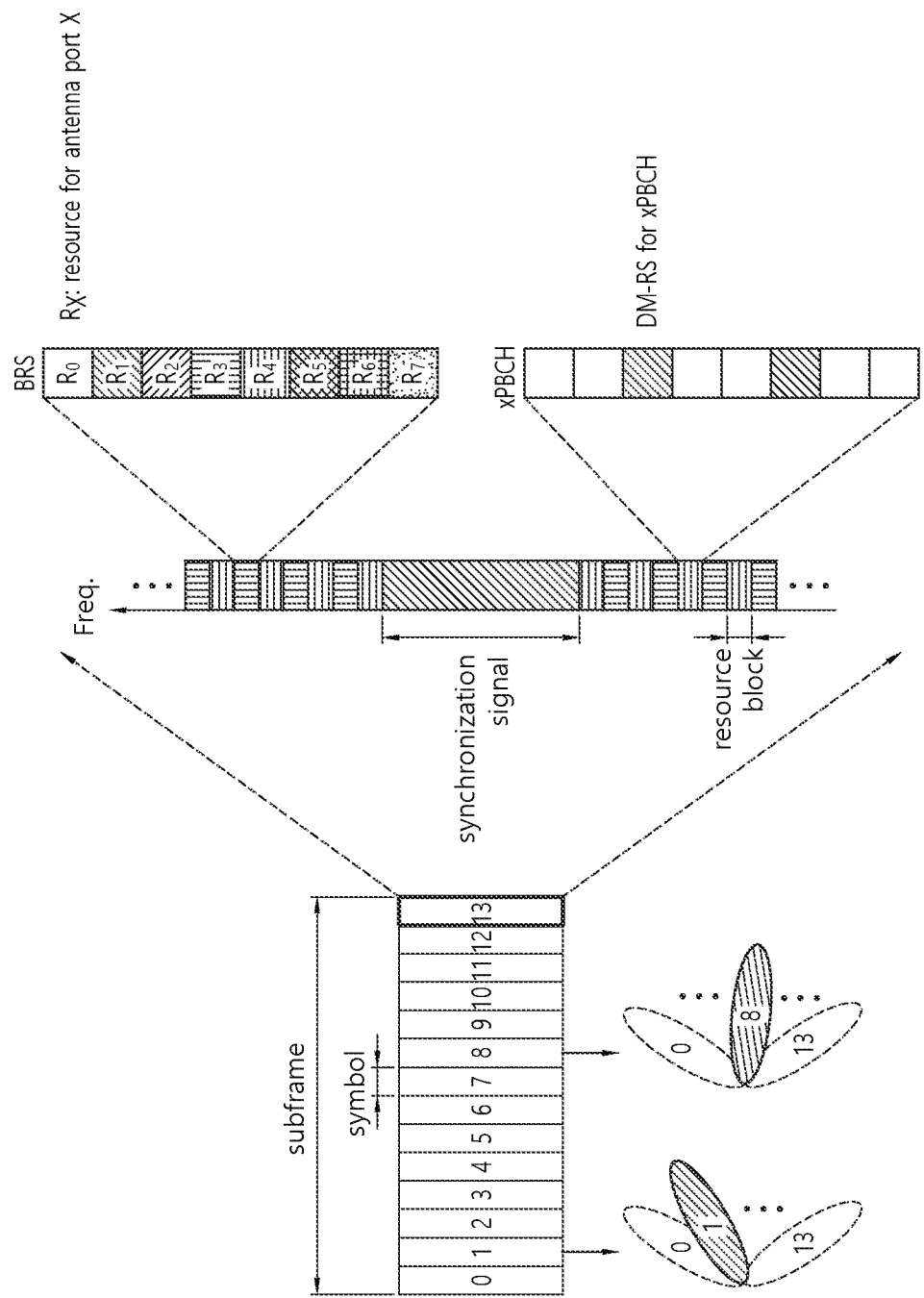
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

Figure 12:
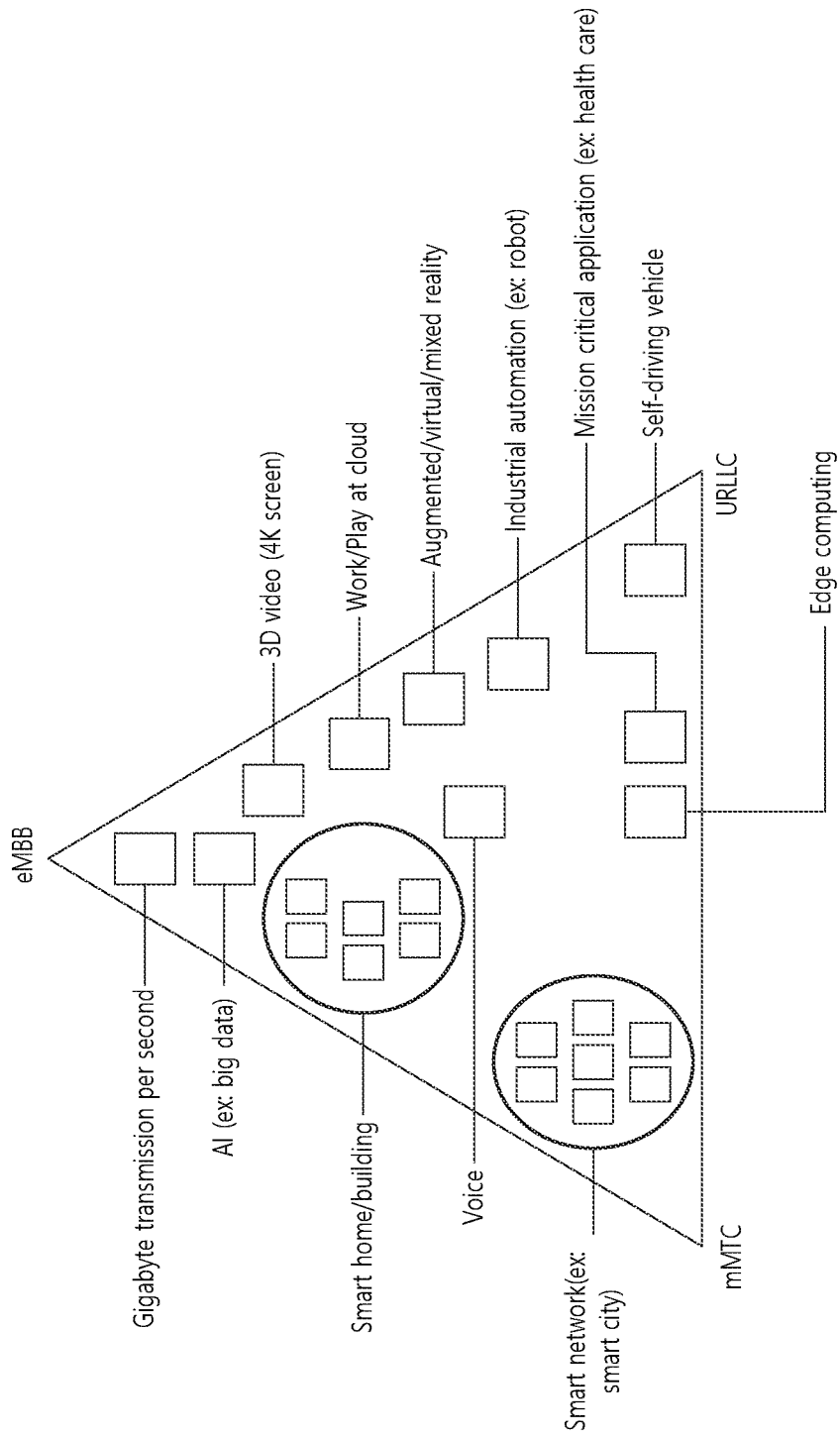
FIG. 12 shows examples of 5G usage scenarios to which the technical features of the present disclosure can be applied.

FIG. 12 shows examples of 5G usage scenarios to which the technical features of the present disclosure can be applied. The 5G usage scenarios shown in FIG. 12 are only exemplary, and the technical features of the present disclosure can be applied to other 5G usage scenarios which are not shown in FIG. 12.

Referring to FIG. 12, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities.

Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 12 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Hereinafter, a channel access procedure according to Licensed-Assisted Access (LAA) will be described. Herein, LAA may mean a method of performing data transmission/reception in an unlicensed band in combination with an unlicensed band (e.g., WiFi band). Also, herein, the cell accessed in the unlicensed band may be referred to as a USCell (or LAA SCell), and the cell accessed in the licensed band may be referred to as a PCell.

First, downlink channel access procedures will be described.

An eNB operating LAA Scell(s) shall perform the channel access procedures for accessing the channel(s) on which the LAA Scell(s) transmission(s) are performed.

Hereinafter, channel access procedure for transmission(s) including PDSCH/PDCCH/EPDCCH will be described.

The eNB may transmit a transmission including PDSCH/PDCCH/EPDCCH on a carrier on which LAA Scell(s) transmission(s) are performed, after first sensing the channel to be idle during the slot durations of a defer duration $T_d$; and after the counter N is zero in step 4. The counter N is adjusted by sensing the channel for additional slot duration(s) according to the steps below:

1) set $N=N_{init}$, where $N_{init}$ is a random number uniformly distributed between 0 and $CW_p$, and go to step 4;
2) if N>0 and the eNB chooses to decrement the counter, set N=N−1;
3) sense the channel for an additional slot duration, and if the additional slot duration is idle, go to step 4; else, go to step 5;
4) if N=0, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5;

If an eNB has not transmitted a transmission including PDSCH/PDCCH/EPDCCH on a carrier on which LAA Scell(s) transmission(s) are performed after step 4 in the procedure above, the eNB may transmit a transmission including PDSCH/PDCCH/EPDCCH on the carrier, if the channel is sensed to be idle at least in a slot duration $T_{sl}$ when the eNB is ready to transmit PDSCH/PDCCH/EPDCCH and if the channel has been sensed to be idle during all the slot durations of a defer duration $T_d$ immediately before this transmission. If the channel has not been sensed to be idle in a slot duration $T_{sl}$ when the eNB first senses the channel after it is ready to transmit or if the channel has been sensed to be not idle during any of the slot durations of a defer duration $T_d$ immediately before this intended transmission, the eNB proceeds to step 1 after sensing the channel to be idle during the slot durations of a defer duration $T_d$.

The defer duration $T_d$ consists of duration $T_f=16$ us immediately followed by $m_p$ consecutive slot durations where each slot duration is $T_{sl}=9$ us, and $T_f$ includes an idle slot duration $T_{sl}$ at start of $T_f$.

A slot duration $T_{sl}$ is considered to be idle if the eNB senses the channel during the slot duration, and the power detected by the eNB for at least 4 us within the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_p$ adjustment will be described in the contention window adjustment procedure.

$CW_{min,p}$ and $CW_{max,p}$ are chosen before step 1 of the procedure above.

$m_p$, $CW_{min,p}$, and $CW_{max,p}$ are based on channel access priority class associated with the eNB transmission, as shown in Table 4.

$X_{Thresh}$ adjustment is described in energy detection threshold adaptation procedure.

If the eNB transmits discovery signal transmission(s) not including PDSCH/PDCCH/EPDCCH when N>0 in the procedure above, the eNB shall not decrement N during the slot duration(s) overlapping with discovery signal transmission.

The eNB shall not continuously transmit on a carrier on which the LAA Scell(s) transmission(s) are performed, for a period exceeding $T_{mcot,p}$ as given in Table 4.

For p=3 and p=4, if the absence of any other technology sharing the carrier can be guaranteed on a long term basis (e.g. by level of regulation), $T_{mcot,p}=10$ ms, otherwise, $T_{mcot,p}=8$ ms.

Table 4 is a table related to channel access priority class.

TABLE 4

| Channel Access Priority Class (P) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Hereinafter, channel access procedure for transmissions including discovery signal transmission(s) and not including PDSCH will be described.

An eNB may transmit a transmission including discovery signal but not including PDSCH on a carrier on which LAA Scell(s) transmission(s) are performed immediately after sensing the channel to be idle for at least a sensing interval $T_{drs}=25$ us and if the duration of the transmission is less than 1 ms. $T_{drs}$ consists of a duration $T_f=16$ us immediately followed by one slot duration $T_{sl}=9$ us and $T_f$ includes an idle slot duration $T_{sl}$ at start of $T_f$. The channel is considered to be idle for $T_{drs}$ if it is sensed to be idle during the slot durations of $T_{drs}$.

Hereinafter, contention window adjustment procedure will be described.

If the eNB transmits transmissions including PDSCH that are associated with channel access priority class p on a carrier, the eNB maintains the contention window value $CW_p$ and adjusts $CW_p$ before step 1 of the procedure described above for those transmissions using the following steps:

1) for every priority class $p \in \{1, 2, 3, 4\}$ set $CW_p=CW_{min,p}$
2) if at least Z=80% of HARQ-ACK values corresponding to PDSCH transmission(s) in reference subframe k are determined as NACK, increase $CW_p$ for every priority class $p \in \{1, 2, 3, 4\}$ to the next higher allowed value and remain in step 2; otherwise, go to step 1.

Reference subframe k is the starting subframe of the most recent transmission on the carrier made by the eNB, for which at least some HARQ-ACK feedback is expected to be available.

The eNB shall adjust the value of $CW_p$ for every priority class $p \in \{1, 2, 3, 4\}$ based on a given reference subframe k only once.

If $CW_p=CW_{max,p}$, the next higher allowed value for adjusting $CW_p$ is $CW_{max,p}$.

For determining Z,
if the eNB transmission(s) for which HARQ-ACK feedback is available start in the second slot of subframe k, HARQ-ACK values corresponding to PDSCH transmission(s) in subframe k+1 are also used in addition to the HARQ-ACK values corresponding to PDSCH transmission(s) in subframe k.
if the HARQ-ACK values correspond to PDSCH transmission(s) on an LAA SCell that are assigned by (E)PDCCH transmitted on the same LAA SCell, if no HARQ-ACK feedback is detected for a PDSCH transmission by the eNB, or if the eNB detects 'DTX', 'NACK/DTX' or 'any' state, it is counted as NACK.

if the HARQ-ACK values correspond to PDSCH transmission(s) on an LAA SCell that are assigned by (E)PDCCH transmitted on another serving cell, if the HARQ-ACK feedback for a PDSCH transmission is detected by the eNB, 'NACK/DTX' or 'any' state is counted as NACK, and 'DTX' state is ignored.

if no HARQ-ACK feedback is detected for a PDSCH transmission by the eNB if PUCCH format 1b with channel selection is expected to be used by the UE, 'NACK/DTX' state corresponding to 'no transmission' is counted as NACK, and 'DTX' state corresponding to 'no transmission' is ignored. Otherwise, the HARQ-ACK for the PDSCH transmission is ignored.

if a PDSCH transmission has two codewords, the HARQ-ACK value of each codeword is considered separately.

bundled HARQ-ACK across M subframes is considered as M HARQ-ACK responses.

If the eNB transmits transmissions including PDCCH/EPDCCH with DCI format 0A/0B/4A/4B and not including PDSCH that are associated with channel access priority class p on a channel starting from time $t_0$, the eNB maintains the contention window value $CW_p$ and adjusts $CW_p$ before step 1 of the procedure described above for those transmissions using the following steps:

1) for every priority class $p \in \{1, 2, 3, 4\}$ set $CW_p = CW_{min,p}$ 2) if less than 10% of the UL transport blocks scheduled by the eNB using Type 2 channel access procedure in the time interval between $t_0$ and $t_0 + T_{CO}$ To have been received successfully, increase $CW_p$ for every priority class $p \in \{1, 2, 3, 4\}$ to the next higher allowed value and remain in step 2; otherwise, go to step 1.

Here, $T_{CO}$ is computed as described in channel access procedure for Uplink transmission(s).

If the $CW_p = CW_{max,p}$ is consecutively used K times for generation of $N_{init}$, $CW_p$ is reset to $CW_{min,p}$ only for that priority class p for which $CW_p = CW_{max,p}$ is consecutively used K times for generation of $N_{init}$. K is selected by eNB from the set of values $\{1, 2, \ldots, 8\}$ for each priority class $p \in \{1, 2, 3, 4\}$.

Hereinafter, energy detection threshold adaptation procedure will be described.

An eNB accessing a carrier on which LAA Scell(s) transmission(s) are performed, shall set the energy detection threshold ($X_{Thresh}$) to be less than or equal to the maximum energy detection threshold $X_{Thresh\_max}$.

$X_{Thresh\_max}$ is determined as follows:

If the absence of any other technology sharing the carrier can be guaranteed on a long term basis (e.g. by level of regulation) then:

$$X_{Thresh\_max} = \min\left\{ \begin{array}{l} T_{max} + 10 \text{ dB,} \\ X_r \end{array} \right\}$$

$X_r$ is Maximum energy detection threshold defined by regulatory requirements in dBm when such requirements are defined, otherwise $X_r = T_{max} + 10$ dB.

Otherwise, $$X_{Thres\_max} = \max\left\{ \begin{array}{l} -72 + 10 \cdot \log 10(BWMHz/20 \text{ MHz})\text{dBm,} \\ \min\left\{ \begin{array}{l} T_{max}, \\ T_{max} - T_A + (P_H + 10 \cdot \log 10(BWMHz/20 \text{ MHz}) - P_{TX}) \end{array} \right\} \end{array} \right\}$$

herein,
$T_A = 10$ dB for transmission(s) including PDSCH;
$T_A = 5$ dB for transmissions including discovery signal transmission(s) and not including PDSCH;
$P_H = 23$ dBm;
$P_{TX}$ is the set maximum eNB output power in dBm for the carrier;
eNB uses the set maximum transmission power over a single carrier irrespective of whether single carrier or multi-carrier transmission is employed
$T_{max}$ (dBm) = $10 \cdot \log 10(3.16228 \cdot 10^{-8}$ (mW/MHz)$\cdot$ BWMHz (MHz))

BWMHz is the single carrier bandwidth in MHz.

Hereinafter, a channel access procedure for transmission(s) on multiple carriers will be described.

An eNB can access multiple carriers on which LAA Scell(s) transmission(s) are performed, according to one of the Type A or Type B procedures described below.

Hereinafter, Type A multi-carrier access procedures will be described.

The eNB shall perform channel access on each carrier $c_i \in C$, according to the channel access procedure for transmission(s) including PDSCH/PDCCH/EPDCCH, where C is a set of carriers on which the eNB intends to transmit, and $i = 0, 1, \ldots q-1$, and q is the number of carriers on which the eNB intends to transmit.

The counter N described in the channel access procedure for transmission(s) including PDSCH/PDCCH/EPDCCH is determined for each carrier $c_i$ and is denoted as $N_{c_i}$. $N_{c_i}$ is maintained according to Type A1 or Type A2.

Hereinafter, Type A1 will be described.

Counter N as described in the channel access procedure for transmission(s) including PDSCH/PDCCH/EPDCCH is independently determined for each carrier $c_i$ and is denoted as $N_{c_i}$.

If the absence of any other technology sharing the carrier cannot be guaranteed on a long term basis (e.g. by level of regulation), when the eNB ceases transmission on any one carrier $c_j \in C$, for each carrier $c_i \neq c_j$, the eNB can resume decrementing $N_{c_i}$ when idle slots are detected either after waiting for a duration of $4 \cdot T_{sl}$, or after reinitialising $N_{c_i}$.

Hereinafter, Type A2 will be described.

Counter N is determined as described in the channel access procedure for transmission(s) including PDSCH/PDCCH/EPDCCH for carrier $c_j \in C$, and is denoted as $N_{c_j}$, where $c_j$ is the carrier that has the largest $CW_p$ value. For each carrier $c_i$, $N_{c_i} = N_{c_j}$. When the eNB ceases transmission on any one carrier for which $N_{c_j}$ is determined, the eNB shall reinitialise $N_{c_i}$ for all carriers.

Hereinafter, Type B multi-carrier access procedure will be described.

A carrier $c_j \in C$ is selected by the eNB as follows.

the eNB selects $c_j$ by uniformly randomly choosing $c_j$ from C before each transmission on multiple carriers $c_i \in C$, or the eNB selects $c_j$ no more frequently than once every 1 second, Here, C is a set of carriers on which the eNB intends to transmit, $i = 0, 1, \ldots q-1$, and q is the number of carriers on which the eNB intends to transmit.

To transmit on carrier $c_j$ the eNB shall perform channel access on carrier $c_j$ according to the procedures described in the channel access procedure for transmission(s) including PDSCH/PDCCH/EPDCCH with the modifications described in Type B1 or Type B2.

To transmit on carrier $c_i \neq c_j$, $c_i \in C$ for each carrier $c_i$, the eNB shall sense the carrier $c_i$ for at least a sensing interval $T_{mc}=25$ us immediately before the transmitting on carrier $c_j$, and the eNB may transmit on carrier $c_i$ immediately after sensing the carrier $c_i$ to be idle for at least the sensing interval $T_{mc}$. The carrier $c_i$ is considered to be idle for $T_{mc}$ if the channel is sensed to be idle during all the time durations in which such idle sensing is performed on the carrier $c_j$ in given interval $T_{mc}$.

The eNB shall not continuously transmit on a carrier $c_i \neq c_j$, $c_i \in C$, for a period exceeding $T_{mcot,p}$ as given in Table 4, where the value of $T_{mcot,p}$ is determined using the channel access parameters used for carrier $c_j$.

Hereinafter, Type B1 will be described.

A single $CW_p$ value is maintained for the set of carriers C. For determining $CW_p$ for channel access on carrier $c_j$, step 2 of the procedure described in the contention window adjustment procedure is modified as follows.

if at least Z=80% of HARQ-ACK values corresponding to PDSCH transmission(s) in reference subframe k of all carriers $c_i \in C$ are determined as NACK, increase $CW_p$ for each priority class $p \in \{1, 2, 3, 4\}$ to the next higher allowed value; otherwise, go to step 1.

Hereinafter, Type B2 will be described.

A $CW_p$ value is maintained independently for each carrier $c_i \in C$ using the procedure described in the contention window adjustment procedure.

For determining $N_{init}$ for carrier $c_j$, $CW_p$ value of carrier $c_{j1} \in C$ is used, where $c_{j1}$ is the carrier with largest $CW_p$ among all carriers in set C.

Hereinafter, uplink channel access procedures will be described.

A UE and a eNB scheduling UL transmission(s) for the UE shall perform the procedures described in this sub clause for the UE to access the channel(s) on which the LAA Scell(s) transmission(s) are performed.

Hereinafter, a channel access procedure for uplink transmission(s) will be described.

The UE can access a carrier on which LAA Scell(s) UL transmission(s) are performed according to one of Type 1 or Type 2 UL channel access procedures. Type 1 channel access procedure and Type 2 channel access procedure will be described later.

If an UL grant scheduling a PUSCH transmission indicates Type 1 channel access procedure, the UE shall use Type 1 channel access procedure for transmitting transmissions including the PUSCH transmission unless stated otherwise.

If an UL grant scheduling a PUSCH transmission indicates Type 2 channel access procedure, the UE shall use Type 2 channel access procedure for transmitting transmissions including the PUSCH transmission unless stated otherwise.

The UE shall use Type 1 channel access procedure for transmitting SRS transmissions not including a PUSCH transmission. UL channel access priority class p=1 is used for SRS transmissions not including a PUSCH.

Table 5 is a table related to channel access priority class for uplink.

TABLE 5

| Channel Access Priority Class (P) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms..

If the 'UL configuration for LAA' field configures an 'UL offset' l and an 'UL duration' d for subframe $r_i$, then, the UE may use channel access Type 2 for transmissions in subframes n+l+i where i=0, 1, . . . d−1, irrespective of the channel access Type signalled in the UL grant for those subframes, if the end of UE transmission occurs in or before subframe n+l+d−1.

If the UE scheduled to transmit transmissions including PUSCH in a set subframes $n_0, n_1, \ldots, n_{w-1}$ using PDCCH DCI Format 0B/4B, and if the UE cannot access the channel for a transmission in subframe $n_k$, the UE shall attempt to make a transmission in subframe $n_{k+1}$ according to the channel access type indicated in the DCI, where $k \in \{0, 1, \ldots w-2\}$, and w is the number of scheduled subframes indicated in the DCI.

If the UE is scheduled to transmit transmissions without gaps including PUSCH in a set of subframes $n_0, n_1, \ldots, n_{w-1}$ using one or more PDCCH DCI Format 0A/0B/4A/4B and the UE performs a transmission in subframe $n_k$ after accessing the carrier according to one of Type 1 or Type 2 UL channel access procedures, the UE may continue transmission in subframes after $n_k$ where $k \in \{0, 1, \ldots w-1\}$.

If the beginning of UE transmission in subframe n+1 immediately follows the end of UE transmission in subframe $r_i$, the UE is not expected to be indicated with different channel access types for the transmissions in those subframes.

If the UE is scheduled to transmit without gaps in subframes $n_0, n_1, \ldots, n_{w-1}$ using one or more PDCCH DCI Format 0A/0B/4A/4B, and if the UE has stopped transmitting during or before subframe $n_{k1}$, $k1 \in \{0, 1, \ldots w-2\}$, and if the channel is sensed by the UE to be continuously idle after the UE has stopped transmitting, the UE may transmit in a later subframe $n_{k2}$, $k2 \in \{1, \ldots w-1\}$ using Type 2 channel access procedure. If the channel sensed by the UE is not continuously idle after the UE has stopped transmitting, the UE may transmit in a later subframe $n_{k2}$, $k2 \in \{1, \ldots w-1\}$ using Type 1 channel access procedure with the UL channel access priority class indicated in the DCI corresponding to subframe $n_{k2}$.

If the UE receives an UL grant and the DCI indicates a PUSCH transmission starting in subframe $r_i$ using Type 1 channel access procedure, and if the UE has an ongoing Type 1 channel access procedure before subframe $r_i$.

if the UL channel access priority class value $p_1$ used for the ongoing Type 1 channel access procedure is same or larger than the UL channel access priority class value $p_2$ indicated in the DCI, the UE may transmit the PUSCH transmission in response to the UL grant by accessing the carrier by using the ongoing Type 1 channel access procedure.

if the UL channel access priority class value $p_1$ used for the ongoing Type 1 channel access procedure is smaller than the UL channel access priority class value $p_2$ indicated in the DCI, the UE shall terminate the ongoing channel access procedure.

If the UE is scheduled to transmit on a set of carriers C in subframe $r_i$, and if the UL grants scheduling PUSCH transmissions on the set of carriers C indicate Type 1 channel access procedure, and if the same 'PUSCH starting position' is indicated for all carriers in the set of carriers C, and if the carrier frequencies of set of carriers C is a subset of one of the predefined sets of carrier frequencies, the UE may transmit on carrier $c_i \in C$ using Type 2 channel access procedure,
if Type 2 channel access procedure is performed on carrier $c_i$ immediately before the UE transmission on carrier $c_j \in C$, $i \neq j$, and
if the UE has accessed carrier $c_j$ using Type 1 channel access procedure,
where carrier $c_j$ is selected by the UE uniformly randomly from the set of carriers C before performing Type 1 channel access procedure on any carrier in the set of carriers C.

A eNB may indicate Type 2 channel access procedure in the DCI of an UL grant scheduling transmission(s) including PUSCH on a carrier in subframe $r_i$ when the eNB has transmitted on the carrier according to the channel access procedure described in the channel access procedure for transmission(s) including PDSCH/PDCCH/EPDCCH, or an eNB may indicate using the 'UL Configuration for LAA' field that the UE may perform a Type 2 channel access procedure for transmissions(s) including PUSCH on a carrier in subframe $r_i$ when the eNB has transmitted on the carrier according to the channel access procedure described in the channel access procedure for transmission(s) including PDSCH/PDCCH/EPDCCH, or an eNB may schedule transmissions including PUSCH on a carrier in subframe $r_i$, that follows a transmission by the eNB on that carrier with a duration of $T_{short\_ul}$=25 us, if subframe $r_i$ occurs within the time interval starting at $t_0$ and ending at $t_0+T_{CO}$, where $T_{CO}=T_{mcot,p}+T_g$, where $t_0$ is the time instant when the eNB has started transmission, $T_{mcot,p}$ value is determined by the eNB as described in the downlink channel access procedure, $T_g$ is the total duration of all gaps of duration greater than 25 us that occur between the DL transmission of the eNB and UL transmissions scheduled by the eNB, and between any two UL transmissions scheduled by the eNB starting from $t_0$.

The eNB shall schedule UL transmissions between $t_0$ and $t_0+T_{CO}$ in contiguous subframes if they can be scheduled contiguously.

For an UL transmission on a carrier that follows a transmission by the eNB on that carrier within a duration of $T_{short\_ul}$=25 us, the UE may use Type 2 channel access procedure for the UL transmission.

If the eNB indicates Type 2 channel access procedure for the UE in the DCI, the eNB indicates the channel access priority class used to obtain access to the channel in the DCI.

Hereinafter, Type 1 uplink channel access procedure will be described.

The UE may transmit the transmission using Type 1 channel access procedure after first sensing the channel to be idle during the slot durations of a defer duration $T_d$; and after the counter N is zero in step 4. The counter N is adjusted by sensing the channel for additional slot duration(s) according to the steps described below.

1) set $N=N_{init}$, where $N_{init}$ is a random number uniformly distributed between 0 and $CW_p$, and go to step 4;

2) if N>0 and the UE chooses to decrement the counter, set N=N−1;

3) sense the channel for an additional slot duration, and if the additional slot duration is idle, go to step 4; else, go to step 5;

4) if N=0, stop; else, go to step 2.

5) sense the channel until either a busy slot is detected within an additional defer duration $T_d$ or all the slots of the additional defer duration $T_d$ are detected to be idle;

6) if the channel is sensed to be idle during all the slot durations of the additional defer duration $T_d$, go to step 4; else, go to step 5;

If the UE has not transmitted a transmission including PUSCH on a carrier on which LAA Scell(s) transmission(s) are performed after step 4 in the procedure above, the UE may transmit a transmission including PUSCH on the carrier, if the channel is sensed to be idle at least in a slot duration $T_{sl}$ when the UE is ready to transmit the transmission including PUSCH, and if the channel has been sensed to be idle during all the slot durations of a defer duration $T_d$ immediately before the transmission including PUSCH. If the channel has not been sensed to be idle in a slot duration $T_{sl}$ when the UE first senses the channel after it is ready to transmit, or if the channel has not been sensed to be idle during any of the slot durations of a defer duration $T_d$ immediately before the intended transmission including PUSCH, the UE proceeds to step 1 after sensing the channel to be idle during the slot durations of a defer duration $T_d$.

The defer duration $T_d$ consists of duration $T_f$=16 us immediately followed by consecutive slot durations where each slot duration is $T_{sl}$=9 us, and $T_f$ includes an idle slot duration $T_{sl}$ at start of $T_f$;

A slot duration $T_{sl}$ is considered to be idle if the UE senses the channel during the slot duration, and the power detected by the UE for at least 4 us within the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_p$ adjustment will be described in the contention window adjustment procedure.

$CW_{min,p}$ and $CW_{max,p}$ are chosen before step 1 of the procedure above.

$m_p$, $CW_{min,p}$, and $CW_{max,p}$ are based on channel access priority class signalled to the UE, as shown in Table 5.

$X_{Thresh}$ adjustment is described in the energy detection threshold adaptation procedure.

Hereinafter, Type 2 uplink channel access procedure will be described.

If the UL UE uses Type 2 channel access procedure for a transmission including PUSCH, the UE may transmit the transmission including PUSCH immediately after sensing the channel to be idle for at least a sensing interval $T_{short\_ul}$=25 us. $T_{short\_ul}$ consists of a duration $T_f$=16 us immediately followed by one slot duration $T_{sl}$=9 us and $T_f$ includes an idle slot duration $T_{sl}$ at start of $T_f$. The channel is considered to be idle for $T_{short\_ul}$ if it is sensed to be idle during the slot durations of $T_{short\_ul}$.

Hereinafter, contention window adjustment procedure will be described.

If the UE transmits transmissions using Type 1 channel access procedure that are associated with channel access priority class p on a carrier, the UE maintains the contention window value $CW_p$ and adjusts $CW_p$ for those transmissions before step 1 of the procedure described in Type 1 uplink channel access procedure, using the following procedure if the NDI value for at least one HARQ process associated with HARQ_ID_ref is toggled,
for every priority class p∈{1, 2, 3, 4} set $CW_p=CW_{min,p}$
otherwise, increase $CW_p$ for every priority class p∈{1, 2, 3, 4} to the next higher allowed value;

HARQ_ID_ref is the HARQ process ID of UL-SCH in reference subframe $n_{ref}$. The reference subframe $n_{ref}$ is determined as follows If the UE receives an UL grant in subframe $n_g$, subframe $n_w$ is the most recent subframe before subframe $n_g-3$ in which the UE has transmitted UL-SCH using Type 1 channel access procedure.

If the UE transmits transmissions including UL-SCH without gaps starting with subframe $n_0$ and in subframes $n_0, n_1, \ldots, n_w$, reference subframe $n_{ref}$ is subframe $n_0$, otherwise, reference subframe $n_{ref}$ is subframe $n_w$, The UE may keep the value of $CW_p$ unchanged for every priority class p∈{1, 2, 3, 4}, if the UE scheduled to transmit transmissions without gaps including PUSCH in a set subframes $n_0, n_1, \ldots, n_{w-1}$ using Type 1 channel access procedure, and if the UE is not able to transmit any transmission including PUSCH in the set of subframes.

The UE may keep the value of $CW_p$ for every priority class p∈{1, 2, 3, 4} the same as that for the last scheduled transmission including PUSCH using Type 1 channel access procedure, if the reference subframe for the last scheduled transmission is also $n_{ref}$.

If $CW_p=CW_{max,p}$, the next higher allowed value for adjusting $CW_p$ is $CW_{max,p}$.

If the $CW_p=CW_{max,p}$, is consecutively used K times for generation of $N_{init}$, $CW_p$ is reset to $CW_{min,p}$ only for that priority class p for which $CW_p=CW_{max,p}$ is consecutively used K times for generation of $N_{init}$. K is selected by UE from the set of values {1, 2, . . . , 8} for each priority class p∈{1, 2, 3, 4}.

Hereinafter, energy detection threshold adaptation procedure will be described.

A UE accessing a carrier on which LAA Scell(s) transmission(s) are performed, shall set the energy detection threshold ($X_{Thresh}$) to be less than or equal to the maximum energy detection threshold $X_{Thresh\_max}$.

$X_{Thresh\_max}$ is determined as follows:

If the UE is configured with higher layer parameter 'maxEnergyDetectionThreshold-r14',
$X_{Thresh\_max}$ is set equal to the value signalled by the higher layer parameter.

otherwise,
the UE shall determine $X'_{Thresh\_max}$ according to the procedure described in default maximum energy detection threshold computation procedure
if the UE is configured with higher layer parameter 'energyDetectionThresholdOffset-r14'
$X_{Thresh\_max}$ is set by adjusting $X'_{Thresh\_max}$ according to the offset value signalled by the higher layer parameter otherwise,
The UE shall set $X_{Thresh\_max}=X'_{Thresh\_max}$ Hereinafter, default maximum energy detection threshold computation procedure will be described.

If the higher layer parameter 'absenceOfAnyOtherTechnology-r14' indicates TRUE:

$$X'_{Thresh\_max} = \min\left\{\begin{array}{l} T_{max} + 10 \text{ dB,} \\ X_r \end{array}\right\} \text{ where}$$

where
$X_r$ is Maximum energy detection threshold defined by regulatory requirements in dBm when such requirements are defined, otherwise $X_r=T_{max}+10$ dB
Otherwise, $$X'_{Thres\_max} = \max\left\{\begin{array}{l} -72 + 10\cdot\log10(BW\text{MHz}/20 \text{ MHz})\text{dBm,} \\ \min\left\{\begin{array}{l} T_{max}, \\ T_{max} - T_A + (P_H + 10\cdot\log10(BW\text{MHz}/20 \text{ MHz}) - P_{TX}) \end{array}\right\} \end{array}\right\}$$

Herein,
$T_A=10$ dB
$P_H=23$ dBm;
$P_{TX}$ is the set to the value of $P_{CMAX\_H,c}$
$T_{max}$ (dBm)=10·log 10(3.16228·10$^{-8}$ (mW/MHz)· BWMHz (MHz));
BWMHz is the single carrier bandwidth in MHz.

Hereinafter, demodulation reference signals (DMRSs) for PBCH will be described.

First, sequence generation will be described.

The UE shall assume the reference-signal sequence r(m) for an SS/PBCH block is defined by the below equation.

$$r(m) = \frac{1}{\sqrt{2}}(1 - 2\cdot c(2m)) + j\frac{1}{\sqrt{2}}(1 - 2\cdot c(2m + 1)) \quad \text{[Equation 1]}$$

Herein, c(n) is a given value. The scrambling sequence generator shall be initialized at the start of each SS/PBCH block occasion with the below equation.

$c_{init}=2^{11}(\bar{i}_{SSB}+1)(\lfloor N_{ID}^{cell}/4 \rfloor+1)+2^6(\bar{i}_{SSB}+1)+(N_{ID}^{cell}$ mod 4) [Equation 2]

Herein,
for L=4, $\bar{i}_{SSB}=i_{SSB}+4n_{hf}$ where $n_{hf}$ is the number of the half-frame in which the PBCH is transmitted in a frame with $n_{hf}=0$ for the first half-frame in the frame and $n_{hf}=1$ for the second half-frame in the frame, and $i_{SSB}$ is the two least significant bits of the SS/PBCH block index.
for L=8 or L=64, $\bar{i}_{SSB}=i_{SSB}$ where $i_{SSB}$ is the three least significant bits of the SS/PBCH block index.

Meanwhile, L is the maximum number of SS/PBCH beams in an SS/PBCH period for a particular band.

Hereinafter, synchronization signals will be described.
First, physical layer cell identities will be described.
There are 1008 unique physical-layer cell identities given by the below equation.

$N_{ID}^{cell}=3N_{ID}^{(1)}+N_{ID}^{(2)}$ [Equation 3]

Here, $N_{ID}^{(1)}\in\{0, 1, \ldots, 335\}$ and $N_{ID}^{(2)}\in\{0, 1, 2\}$.

Hereinafter, primary synchronization signal (PSS) will be described.

First, sequence generation will be described.

The sequence $d_{PSS}(n)$ for the primary synchronization signal is defined by the below equation.

$d_{PSS}(n)=1-2\times(m)$ [Equation 4]

$M=(n+43N_{ID}^{(2)})\mod 127$
$0\leq n<127$

Herein, x(i+7)=(x(i+4)+x(i))mod 2 and [x(6) x(5) x(4) x(3) x(2) x(1) x(0)]=[1 1 1 0 1 1 0].

Hereinafter, secondary synchronization signal (SSS) will be described.

First, sequence generation will be described.

The sequence $d_{SSS}(n)$ for the secondary synchronization signal is defined by the below equations.

$$d_{SSS}(n) = [1 - 2x_0((n + m_0)\mathrm{mod}127)][1 - 2x_1((n + m_1)\mathrm{mod}127)]$$

$$m_0 = 15\left\lfloor \frac{N_{ID}^{(1)}}{112} \right\rfloor + 5N_{ID}^{(2)}$$

$$m_1 = N_{ID}^{(1)} \mathrm{mod} 112$$

$$0 \le n < 127$$

Herein, $$x_0(i+7) = (x_0(i+4) + x_0(i))\mathrm{mod} 2$$
$$x_1(i+7) = (x_1(i+1) + x_1(i))\mathrm{mod} 2 \text{ and}$$

$$[x_0(6)\ x_0(5)\ x_0(4)\ x_0(3)\ x_0(2)\ x_0(1)\ x_0(0)] = [0\ 0\ 0\ 0\ 0\ 0\ 1]$$
$$[x_1(6)\ x_1(5)\ x_1(4)\ x_1(3)\ x_1(2)\ x_1(1)\ x_1(0)] = [0\ 0\ 0\ 0\ 0\ 0\ 1].$$

Hereinafter, SS/PBCH block will be described. Herein, SS/PBCH block may be a synchronization signal block (SSB).

First, time-frequency structure of an SS/PBCH block will be described.

In the time domain, an SS/PBCH block consists of 4 OFDM symbols, numbered in increasing order from 0 to 3 within the SS/PBCH block, where PSS, SSS, and PBCH with associated DM-RS are mapped to symbols as given by the below table.

In the frequency domain, an SS/PBCH block consists of 240 contiguous subcarriers with the subcarriers numbered in increasing order from 0 to 239 within the SS/PBCH block. The quantities k and l represent the frequency and time indices, respectively, within one SS/PBCH block. The UE may assume that the complex-valued symbols corresponding to resource elements denoted as 'Set to 0' in Table 7.4.3.1-1 are set to zero. The quantity v in the below table is given by $v=N_{ID}^{cell}$ mod 4. The quantity $k_{SSB}$ is the subcarrier offset from subcarrier 0 in common resource block $N_{CRB}^{SSB}$ to subcarrier 0 of the SS/PBCH block, where the 4 least significant bits of $k_{SSB}$ are given by the higher-layer parameter ssb-SubcarrierOffset and for SS/PBCH block type A the most significant bit of $k_{SSB}$ is given by $a_{\bar{A}+5}$ in the PBCH payload. If ssb-SubcarrierOffset is not provided, $k_{SSB}$ is derived from the frequency difference between the SS/PBCH block and Point A.

The UE may assume that the complex-valued symbols corresponding to resource elements that are part of a common resource block partially or fully overlapping with an SS/PBCH block and not used for SS/PBCH transmission are set set to zero in the OFDM symbols where SS/PBCH block is transmitted.

For an SS/PBCH block, the UE shall assume
antenna port p=4000 is used for transmission of PSS, SSS and PBCH,
the same cyclic prefix length and subcarrier spacing for the PSS, SSS, and PBCH,
for SS/PBCH block type A, $\mu \in \{0, 1\}$ and $k_{SSB} \in \{0, 1, 2, \ldots, 23\}$ with the quantities $k_{SSB}$, and $N_{CRB}^{SSB}$ expressed in terms of 15 kHz subcarrier spacing, and
for SS/PBCH block type B, $\mu \in \{3, 4\}$ and $k_{SSB} \in \{0, 1, 2, \ldots, 11\}$ with the quantity $k_{SSB}$, expressed in terms of the subcarrier spacing provided by the higher-layer parameter subCarrierSpacingCommon and $N_{CRB}^{SSB}$ is expressed in terms of 60 kHz subcarrier spacing.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

Table 6 is a table related to resources within an SS/PBCH block for PSS, SSS, PBCH, and DM-RS for PBCH.

TABLE 6

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | $0 + v, 4 + v, 8 + v, \ldots, 236 + v$ |
|  | 2 | $0 + v, 4 + v, 8 + v, \ldots, 44 + v$ $192 + v, 196 + v, \ldots, 236 + v$ |

Hereinafter, mapping of PSS within an SS/PBCH block will be described.

The UE shall assume the sequence of symbols $d_{PSS}(0), \ldots, d_{PSS}(126)$ constituting the primary synchronization signal to be scaled by a factor $\beta_{PSS}$ to conform to the PSS power allocation and mapped to resource elements (k,l)p,µ in increasing order of k where k and l are given by the above table and represent the frequency and time indices, respectively, within one SS/PBCH block.

Hereinafter, mapping of SSS within an SS/PBCH block will be described.

The UE shall assume the sequence of symbols $d_{SSS}(0), \ldots, d_{SSS}(126)$ constituting the secondary synchronization signal to be scaled by a factor $\beta_{SSS}$ and mapped to resource elements (k,l)p,µ in increasing order of k where k and l are given by the above table and represent the frequency and time indices, respectively, within one SS/PBCH block.

Hereinafter, mapping of PBCH and DM-RS within an SS/PBCH block will be described.

The UE shall assume the sequence of complex-valued symbols $d_{PBCH}(0), \ldots, d_{PBCH}(M_{symb}-1)$ constituting the physical broadcast channel to be scaled by a factor $\beta_{PBCH}$ to conform to the PBCH power allocation and mapped in sequence starting with $d_{PBCH}(0)$ to resource elements (k,l)p,µ which meet all the following criteria:
they are not used for PBCH demodulation reference signals.

The mapping to resource elements (k,l)p,µ not reserved for PBCH DM-RS shall be in increasing order of first the index k and then the index l, where k and l represent the frequency and time indices, respectively, within one SS/PBCH block and are given by the above table.

The UE shall assume the sequence of complex-valued symbols r(0), . . . , r(143) constituting the demodulation reference signals for the SS/PBCH block to be scaled by a factor of $\beta_{PBCH}^{DM-RS}$ to conform to the PBCH power allocation and to be mapped to resource elements (k,l)p,µ in increasing order of first k and then l where k and l are given by the above table and represent the frequency and time indices, respectively, within one SS/PBCH block.

Hereinafter, NR-based channel access schemes will be described.

The channel access schemes for NR-based access for unlicensed spectrum can be classified into the following categories:

Category 1 (Immediate transmission after a short switching gap): This is used for a transmitter to immediately transmit after a switching gap inside a COT. The switching gap from reception to transmission is to accommodate the transceiver turnaround time and is no longer than 16 μs.

Category 2 (LBT without random back-off): The duration of time that the channel is sensed to be idle before the transmitting entity transmits is deterministic.

Category 3 (LBT with random back-off with a contention window of fixed size): The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4 (LBT with random back-off with a contention window of variable size): The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

In what follows, the present disclosure will be described.

As a larger number of communication devices require greater communication capacity than before, a requirement for efficient utilization of limited frequency bands becomes more and more important in the next-generation wireless communication system. Furthermore, cellular communication systems such as the LTE/NR system is considering using an unlicensed band such as the 2.4 GHz band mostly used for the conventional WiFi systems and unlicensed bands such as the 5 GHz and 60 GHz bands recently receiving attention for traffic offloading.

Since operating a wireless system in an unlicensed band basically assumes wireless transmission and reception through contention among communication nodes, each communication node is requested to confirm before transmitting its signal by performing channel sensing that other communication nodes are not transmitting a signal. For the sake of convenience, the aforementioned operation is referred to as Listen Before Talk (LBT) or Channel Access Procedure (CAP); particularly, the operation of checking whether another communication node is transmitting a signal is referred to as Carrier Sensing (CS), and a case where other communication nodes are not transmitting a signal is defined as being confirmed by Clear Channel Assessment (CCA). Meanwhile, in the present disclosure, devices performing LBT are divided into Frame Based Equipment (FBE) and Load Based Equipment (LBE) depending on their mechanism employed. More specifically, FBE refers to the device of which the transmit/receive structure has periodic timing that is the same as a fixed frame period, and LBE refers to the device of which the transmit/receive structure is not fixed on the time domain but is demand-driven. Also, each of the FBE and the LBE may be a UE or a base station.

A base station or a user equipment of the LTE/NR system also has to perform LBT to transmit a signal in an unlicensed band (for the sake of convenience, it is referred to as a U-band), and when the base station or the user equipment of the LTE/NR system transmits a signal, other communication nodes such as Wi-Fi nodes also have to perform LBT to avoid causing interference. As one example, in the WiFi standard (801.11ac), the CCA threshold is specified as −62 dBm for non-WiFi signals and −82 dBm for WiFi signals, which indicates, for example, that a Station (STA) or an Access Point (AP) does not transmit a signal so as to avoid causing interference when a signal other than a WiFi signal is received with a power of more than −62 dBm.

In the NR system, system information required for initial access, such as RACH configuration, may be transmitted via Remaining Minimum System Information (RMSI), and PDSCH, which is scheduled by PDCCH, carries the corresponding RMSI. Meanwhile, the time/frequency resource where a PDCCH scheduling the PDSCH carrying RMSI is located may be associated with a Synchronization Signal Block (SSB) index. More specifically, when the time/frequency resource (or CORESET) where the PDCCH may be located and the number of blind detections for each aggregation level are defined as a Search Space (SS) set, the SS set may be linked to the SSB index, and specific SS set information may be configured by PBCH for each SSB.

Figure 13:
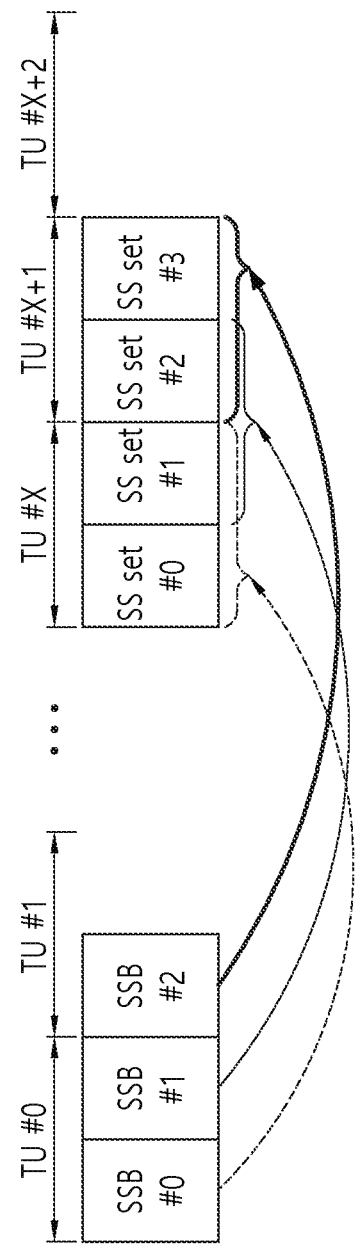
FIG. 13 illustrates one example of multiplexing among SSBs and SS sets in the time domain.

FIG. 13 illustrates one example of multiplexing among SSBs and SS sets in the time domain.

The method used for multiplexing among SSBs and SS sets may be Time Domain Multiplexing (TDM) or Frequency Domain Multiplexing (FDM). As one example, as shown in FIG. 13, SSBs and SS sets may be TDMed, where signaling is transmitted to indicate that Transmission Unit (TU) #X is linked to two SS sets #0/1 (or SS set #1/2 on TU #0/1 or SS set #2/3 on TU #1) through PBCH of the SSB index #0 (or SSB index #1 or SSB index #2), and a UE performs PDCCH monitoring on the two SS sets and receives RMSI through the PDSCH scheduled by the detected PDCCH.

For the sake of convenience, although the present disclosure is described with reference to the example of FIG. 13, one or more SS sets may be associated with one SSB index, and SS sets associated with different SSB indexes may be configured to or not to overlap with each other on the time axis. Depending on the cases, the whole (or part) of the SS set associated with an SSB transmitted on TU #0 may be transmitted on the same TU (or a TU preceding TU #0), one or more SSBs or SS sets may exist within one TU, or a TU may correspond to one or more slots.

An operating principle similar to the above may be applied between an SSB and a RACH occasion (RO). More specifically, an RO may be composed of one or more symbol regions and a plurality of resource blocks (RBs); mapping between an SSB and an RO may be one-to-one, one-to-many, many-to-one, or many-to-many; and the corresponding mapping method may be configured by the RACH configuration on the system information.

Frame Based Equipment (FBE) refers to a device operating at a periodic timing having the same period as a fixed frame period based on a transmit and receive structure. FBE should implement a channel access mechanism based on the Listen Before Talk (LBT) feature to support channel access in an unlicensed band channel. LBT refers to a mechanism of performing Clear Channel Assessment (CCA) before connecting to a channel and is performed in a single observation slot. Here, an observation slot refers to a time period during which transmission from a different Radio Local Area Network (RLAN) exists on an operating channel and may be at least 9 μs or more. A device initiating one or more transmissions is called an initiating UE/initiating device, or a responding UE/responding device otherwise. FBE may be referred to as an initiating device or a responding device or both.

In what follows, FBE will be described in more detail.

FBE should implement a channel access mechanism based on the Listen Before Talk (LBT) feature to detect existence of another RLAN transmission on an operating channel.

FBE refers to a device operating at a periodic timing having the same period as a fixed frame period based on a transmit and receive structure. The single observation slot should have duration not shorter than 9 μs.

In what follows, a channel access procedure for an initiating UE will be described.

An initiating UE (FBE) should implement a channel access mechanism compliant with the following requirements.

1) The fixed frame period supported by a device should be declared by the manufacturer. The range of the fixed frame period should be from 1 ms to 10 ms. Transmission may be initiated only at the start point of the fixed frame period. The device may change the fixed frame period but the change rate may not exceed once every 200 ms.

2) Right before transmission is started on the operating channel at the start point of the fixed frame period, an initiating device has to perform Clear Channel Assessment (CCA) check for a single observation slot. The operating channel should be considered occupied if the energy level of the operating channel exceeds the ED Threshold Level (TL) given by the requirement (6) below. If the initiating device discovers that the operating channel(s) are clear, transmission may be started immediately.

If the initiating device discovers that the operating channel is occupied, no transmission should be performed during the next fixed frame period. If this requirement is met, the FBE is allowed to continue short control signaling transmission on this channel.

For a device performing simultaneous transmission on a plurality of (adjacent or non-adjacent) operating channels, the device is allowed to continue transmission on different operating channels if no signal is detected on the different operating channels from a CCA check.

Channel Occupancy Time (COT) is defined as the total time for which the FBE may perform transmission on a given channel without reassessing availability of the channel.

If transmission gap does not exceed 16 μs, the device may perform multiple transmissions within the COT without performing additional CCA on the operating channel.

If the transmission gap exceeds 16 μs, and additional CCA does not detect RLAN transmission that exceeds a threshold defined in the requirement (6) below, the device may continue transmission. The additional CCA has to be performed within the transmission gap and within an observation slot right before transmission. All of the transmission gaps are counted as part of the COT.

3) An initiating device may authorize one or more associated responding devices to perform transmission on a current operating channel within a current COT. An authorized responding device has to follow the procedure described below.

4) The COT should not exceed 95% of the fixed frame period defined in the requirement (1) above, and since an idle period has to follow until the next fixed frame period is started, the idle period lasts at least 100 μs and amounts to at least 5% of the COT.

5) When a packet intended for a device is received correctly, the device may skip CCA and proceed immediately with transmission of management and control frames (for example, ACK and block ACK frames). A consecutive sequence of these transmissions by the device without involving new CCA should not exceed the maximum COT defined in the requirement (4) above.

6) The ED Threshold Level (TL) measured at the input of a receiver has to be proportional to the maximum transmit power $P_H$ according to an equation that specifies the maximum transmit power in terms of dBm Effective Isotropically Radiated Power (EIRP) when a 0 dBi receive antenna is employed.

When $P_H$ is less than or equal to 13 dBm, TL=−75 dBm/MHz; when $P_H$ exceeds 13 dBm and less than 23 dBm, TL=−85 dBm/NMHz+(23 dBm−$P_H$); and when $P_H$ is greater than or equal to 23 dBm, TL=−85 dBm/MHz.

In what follows, a channel access procedure for a responding UE will be described.

The requirement (3) above describes a possibility that an initiating UE may authorize one or more associated responding UEs to perform transmission on a current operating channel within a current fixed frame period. The authorized responding UE has to follow the procedure described below.

1) A responding UE which has received a transmission grant from an associated initiating UE may proceed with transmission on a current operating channel.

a) If transmission is started at a maximum of 16 $\mu_s$ after a final transmission by the initiating UE which has provided a grant, a responding UE may proceed with the transmission without performing CCA.

b) A responding UE that does not start transmission within 16 $\mu_s$ after a final transmission from the initiating UE which has provided a grant has to perform CCA on the operating channel during a single observation slot within 25 $\mu_s$ which ends right after an allowed transmission time. If energy exceeding the ED TL defined in the requirement (6) above is detected, the responding UE proceeds with the step (3) described below. Otherwise, the responding UE proceeds with the step (2) described below.

2) A responding UE may perform transmission on a current operating channel during the remaining COT of a current fixed frame period. The responding UE may perform multiple transmissions, and the gap between transmissions should not exceed 16 $\mu_s$. When transmission due to the responding UE is completed, the responding UE has to proceed with the step (3).

3) A transmission grant for a receiving UE is withdrawn.

Figure 14:
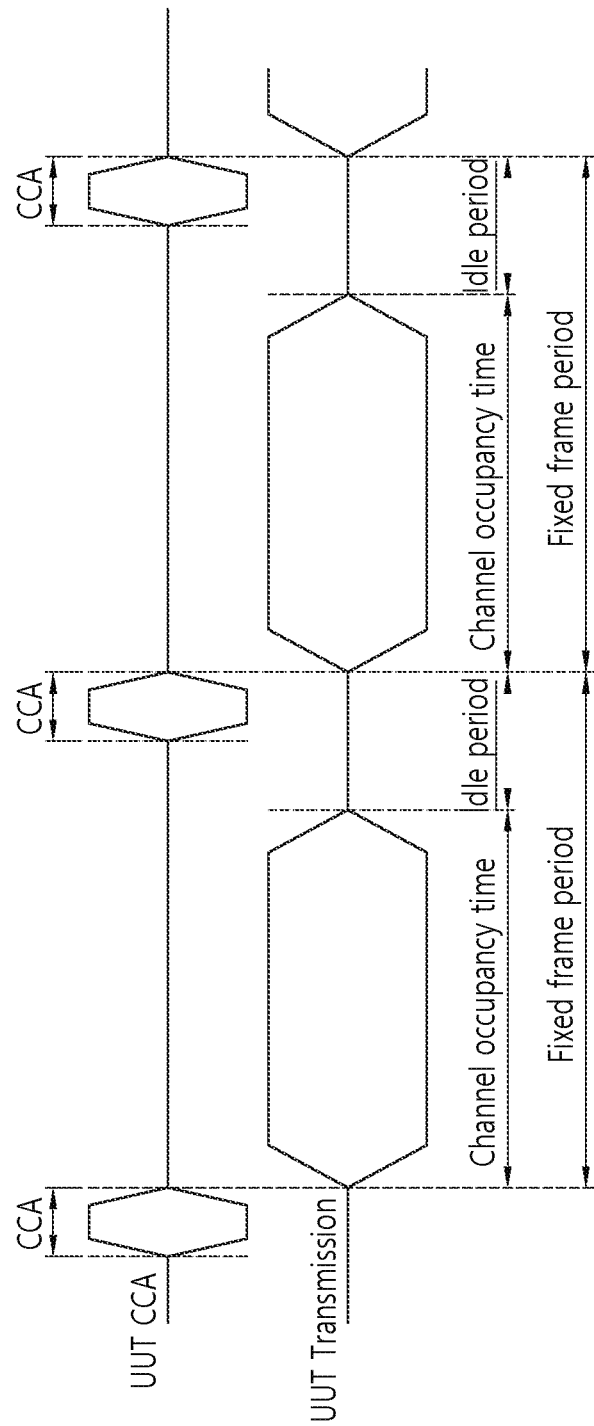
FIG. 14 illustrates one example of timing for FBE.

FIG. 14 illustrates one example of timing for FBE.

According to FIG. 14, a structure is shown, where a fixed frame period consisting of a Channel Occupancy Time (COT) occupying a predetermined time period and an idle period is repeated periodically. CCA is performed on an observation slot within the idle period. In FIG. 14, when CCA is performed on an observation slot within the idle period of the N-th fixed frame period and no other RLAN transmission is present on the operating channel, namely, when the energy value measured over the observation slot is smaller than a CCA threshold value, transmission may be started in the COT within the (N+1)-th fixed frame period.

In other words, a UE performs a CCA check around the end of the idle period before starting transmission on the operating channel. In other words, the CCA check is performed as long as the CCA execution time within the idle period to determine the occupied state of a channel. The CCA check may be performed using a threshold value based on the energy detection during the CCA time lasting for more than 20 $\mu_s$. Here, the threshold value may be defined in advance.

When a packet intended for the corresponding device is received correctly on the channel occupied already through previous CCA execution, the UE may skip CCA and proceed immediately with transmission of management and control frames (for example, ACK and block ACK frames). A consecutive sequence of these transmissions performed without involving new CCA should not exceed the maximum COT. In this case, for multicast transmission, ACK transmissions of individual UEs/devices (associated with the same data packet) may be allowed to be executed sequentially.

Meanwhile, different from the FBE, LBE may perform the CCA check any time there is demand for data transmission. When a UE discovers that an operating channel is occupied or has to use the channel continuously during the maximum channel occupancy time, the UE may perform an extended CCA check without performing transmission on the corresponding channel. When the extended CCA check is performed, the operating channel is monitored for the duration of a CCA execution time multiplied by a random factor N. Here, N represents the number of clear idle slots. Clear idle slots eventually result in a total idle period, and it is necessary that the corresponding idle period is monitored before transmission is started.

As described above, according as whether to introduce FBE-based LBT to the NR system is considered, a method for performing LBT, different from the conventional methods, is required. Accordingly, the present disclosure proposes a method for configuring a CCA threshold value, the length of an observation slot, and a Contention Window Size (CWS) differently for each operator or RAT and configuring a channel access probability differently for a specific frame by setting a high priority to LBT. Also, the present disclosure proposes a method for configuring a transmission position and period within the frame of an SSB that has to be transmitted periodically, a method for transmitting RACH for initial access, and a method for AUL transmission and configuration that allows uplink transmission without involving a grant from a base station or an initiating device once a resource is pre-configured for a UE or a responding device and LBT is successfully performed.

In what follows, a method for setting a priority to LBT for each operator and/or RAT will be described.

[Proposed method #1] Method for setting a priority of channel access within a given frame structure by configuring LBT parameters such as a CCA threshold value, the length of an observation slot, and CWS differently for each operator or Radio Access Technology (RAT).

As one example, in the case of two different operators A and B, a probability of successful execution of LBT may be configured differently for each frame by giving high priority to the operator A for odd-numbered frames from consecutive periodic frames and giving high priority to the operator B for even-numbered frames from the consecutive periodic frames.

More specifically, a method forgiving priority may be implemented by configuring a CCA threshold value, the length of an observation slot, and Contention Window Size (CWS) differently for each operator/RAT.

As one example, when it is desired to give a higher probability of accessing a channel to operator A than operator B at an odd-numbered fixed frame period, the CCA threshold value PA of the operator A may be configured to be higher than the CCA threshold value PB of the operator B. Then, when the energy value PM measured over an observation slot within the odd-numbered fixed frame period is such that PB<PM<PA, operator B determines that the channel is occupied since an energy value higher than the operator B's CCA threshold value is measured while operator A may take the measurement as successful LBT and start transmission.

Similarly, when it is desired to give a higher probability of accessing a channel to operator A than operator B, the length of an observation slot for operator A may be configured to be shorter than the length of an observation slot for operator B. With this configuration, when a CCA check is performed, the probability for a UE related to operator B to determine that the channel is occupied within an observation slot is increased relatively more than that for a UE related to operator A, and as a result, a channel access probability for operator A may be increased.

However, the proposed method above may be applicable in a situation in which a fixed frame period is synchronized between devices through GPS or the like and thus, the devices are set to the absolute time.

In what follows, a method for configuring an SSB transmission position and period considering a frame period will be described.

[Proposed method #2] A method for configuring a transmission period and a frame period of an SSB to have a divisor relationship and transmitting the SSB by placing the SSB at the front of the frame; and a method for transmitting RACH by a UE (or a responding device) within a COT that a base station (or an initiating device) has obtained within a frame through LBT.

Since an SSB is in a fixed order and has to be transmitted periodically, it may be advantageous in terms of resource utilization to configure the SSB to be transmitted at the beginning of a frame period. As one example, if an SSB is configured to be placed in the middle of the frame period, a waste of resources may occur such that even when there is no data to be transmitted at a specific frame period, only for the purpose of transmitting the SSB, a reservation signal has to be transmitted up to the transmission position of the SSB at the corresponding frame period after execution of LBT.

To solve the problem above, if the frame period is configured to be a divisor of the SSB transmission period, resources may be utilized efficiently. As one example, when the SSB transmission period is 20 ms and the frame period is 8 ms, there occur cases in which the SSB has to be transmitted in the middle of a frame; therefore, if the frame period is set to 10 ms, which is a divisor of the SSB transmission period, the SSB may be transmitted periodically at the beginning of a frame.

In other words, a base station may configure a fixed frame period for a UE to have a divisor relationship with a transmission period of the SSB transmitted to the UE. As one example, the base station may configure a UE to have a fixed frame period of X ms and transmit an SSB periodically every 4x ms (in other words, with a period of 4 times the fixed frame period).

Furthermore, the base station may change the length of a fixed frame period, and in this case, the SSB transmission period may also be changed based on the changed fixed frame period. Also, the base station may change the SSB transmission period, and in this case, if the changed SSB transmission period is not a multiple of the fixed frame period, the base station may also change the fixed frame period so that the fixed frame period becomes a multiple of the changed SSB transmission period.

Characteristically, the corresponding SSB transmission period may be a transmission period configured for the use of neighboring cell (and/or serving cell) measurement. Also, the corresponding method may be applied not only for SSB transmission but also for a downlink signal (for example, CSI-RS for measurement) configured to be used for measurement (for example, RRM and/or RLM and/or beam management) and transmitted periodically, and/or a broadcast downlink control/data channel (for example, system information or paging).

Furthermore, RACH transmission may be performed within the Channel Occupancy Time (COT) obtained by a base station or an initiating UE/initiating device after successful execution of LBT. As one example, when the base station or the initiating device succeeds in LBT at the N-th frame, data transmission may be performed within the COT, and an uplink (UL) grant (or cell-specific DCI or UE-group common DCI) may be transmitted to a UE or a responding device so that RACH may be transmitted by sharing the remaining COT.

As one example, if an initiating device succeeds in LBT at the N-th fixed frame period (namely, on an observation slot within an idle period of the N-th fixed frame period), the initiating device may perform downlink transmission to a UE at the (N+1)-th fixed frame period (namely, during the COT within the (N+1)-th fixed frame period). Here, the initiating device may perform the downlink transmission operation only during part of the COT within the (N+1)-th fixed frame period. In this case, the initiating device may transmit an uplink grant to the UE after completion of a downlink transmission operation and/or simultaneously with the end of the operation. Here, the uplink grant is only an example, and a signal/message may also be transmitted, which includes an indication for the UE that uplink transmission is possible.

A UE which has received an uplink grant may perform uplink transmission on the initiating device from the time the uplink grant is received within the (N+1)-th fixed frame period (namely, during the COT within the (N+1)-th fixed frame period). Here, the uplink transmission may include RACH transmission.

Figure 15:
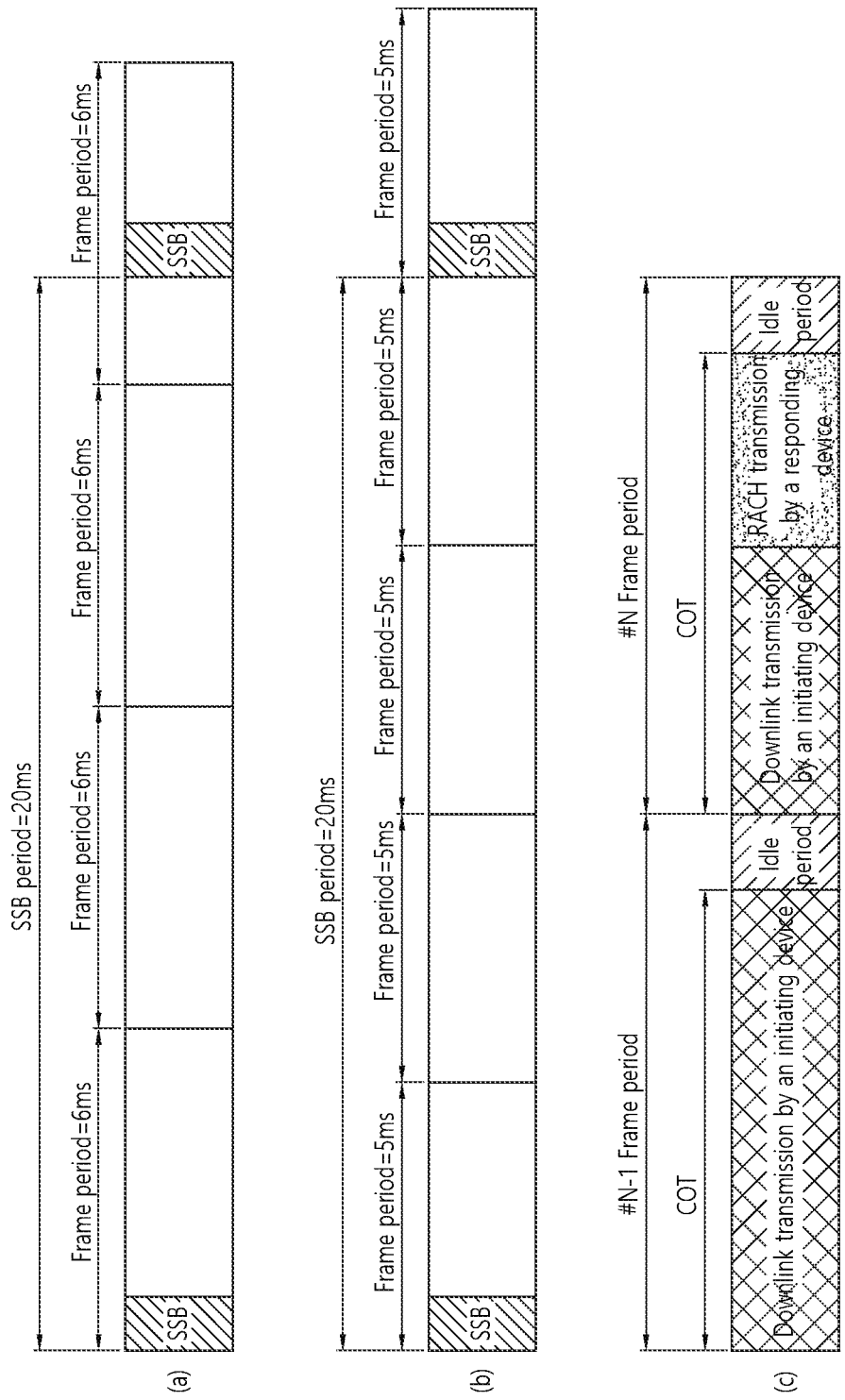
FIG. 15 illustrates one example of SSB transmission position according to a frame period when an SSB period is 10 ms.

FIG. 15 illustrates one example of SSB transmission position according to a frame period when an SSB period is 10 ms. More specifically, FIG. 15(a) shows a case in which the frame period is configured to be 6 ms and does not establish a divisor relationship with the SSB period, and FIG. 15(b) shows a case in which the frame period is configured to be 6 ms and establishes a divisor relationship with the SSB period. Also, FIG. 15(c) shows a case in which, after a base station performs LBT on an observation slot of the (N−1)-th frame period, the base station transmits RACH within the remaining COT after downlink transmission within the COT of the N-th frame period.

As shown in FIG. 15(a), when the frame period does not establish a divisor relationship with the SSB transmission period, there occur cases in which the SSB is placed in the middle of the frame period, but as shown in FIG. 15(b), when the frame period forms a divisor relationship with the SSB transmission period, the SSB may always be transmitted at the beginning of the frame period.

Meanwhile, as shown in FIG. 15(b), an SSB has to be transmitted at the beginning of the frame period. In other words, even when the frame period forms a divisor relationship with the SSB transmission period, if the start position of SSB transmission is in the middle of the frame period rather than the beginning of the frame period, the SSB may always be transmitted in the middle of the frame period. In this case, as described above, a waste of resources may occur such that even when there is no data to be transmitted at a specific frame period, only for the purpose of transmitting the SSB, a reservation signal has to be transmitted up to the transmission position of the SSB at the corresponding frame period after execution of LBT.

FIG. 15(c) illustrates an example in which downlink transmission of an initiating device and uplink transmission of a responding device are performed in one COT. As one example, when the initiating device succeeds in LBT within the (N−1)-th frame period (more specifically, over an observation slot within an idle period included in the frame period), the initiating device obtains COT within the N-th frame period. At this time, the initiating device may perform downlink transmission to the responding device.

Here, when the initiating device performs downlink transmission only during part of the COT rather than the whole COT within the N-th frame period, the initiating device may transmit an uplink grant to the responding device. The responding device which has received the uplink grant may perform uplink transmission on the initiating device from the time the uplink grant is received to the end point of the COT.

Therefore, since the initiating device may not perform unnecessary downlink transmission during the remaining COT period, and the responding device may perform uplink transmission without involving separate execution of LBT in a different frame period, a more resource-efficient communication operation may be achieved.

Figure 16:
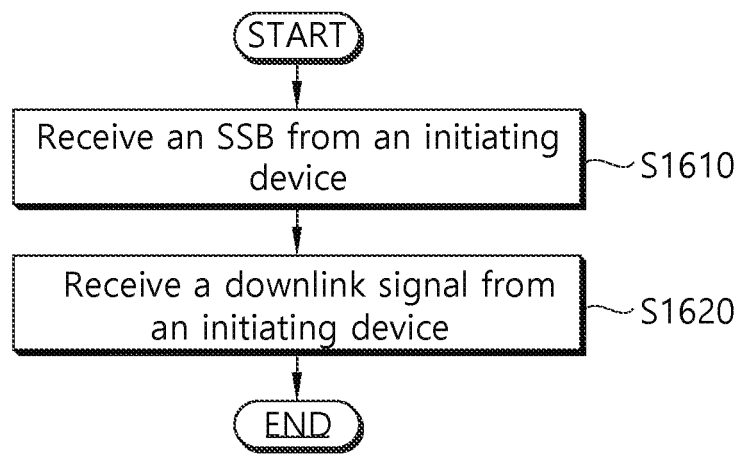
FIG. 16 is a flow diagram illustrating a method for receiving a downlink signal performed by a UE according to one embodiment of the present disclosure.

FIG. 16 is a flow diagram illustrating a method for receiving a downlink signal performed by a UE according to one embodiment of the present disclosure.

According to FIG. 16, a UE receives an SSB from a base station S1610.

Afterwards, the UE receives a downlink signal from an initiating device S1620.

Here, the SSB may be transmitted periodically on one fixed frame period per N (where N is an integer larger than or equal to 1) fixed frame periods. In other words, the SSB may be transmitted periodically on every N-th fixed frame period, or as described in the proposed method #2 and FIG. 15(b), the SSB transmission period and the frame period may form a divisor relationship with each other.

Also, the start position of the SSB transmission may be a first time resource included in every N-th fixed frame period. In other words, as described in FIG. 15(b), if a frame on which the SSB is transmitted is referred to as an SSB-frame, the SSB may be transmitted at the start position of each SSB frame or at the first time resource.

Figure 17:
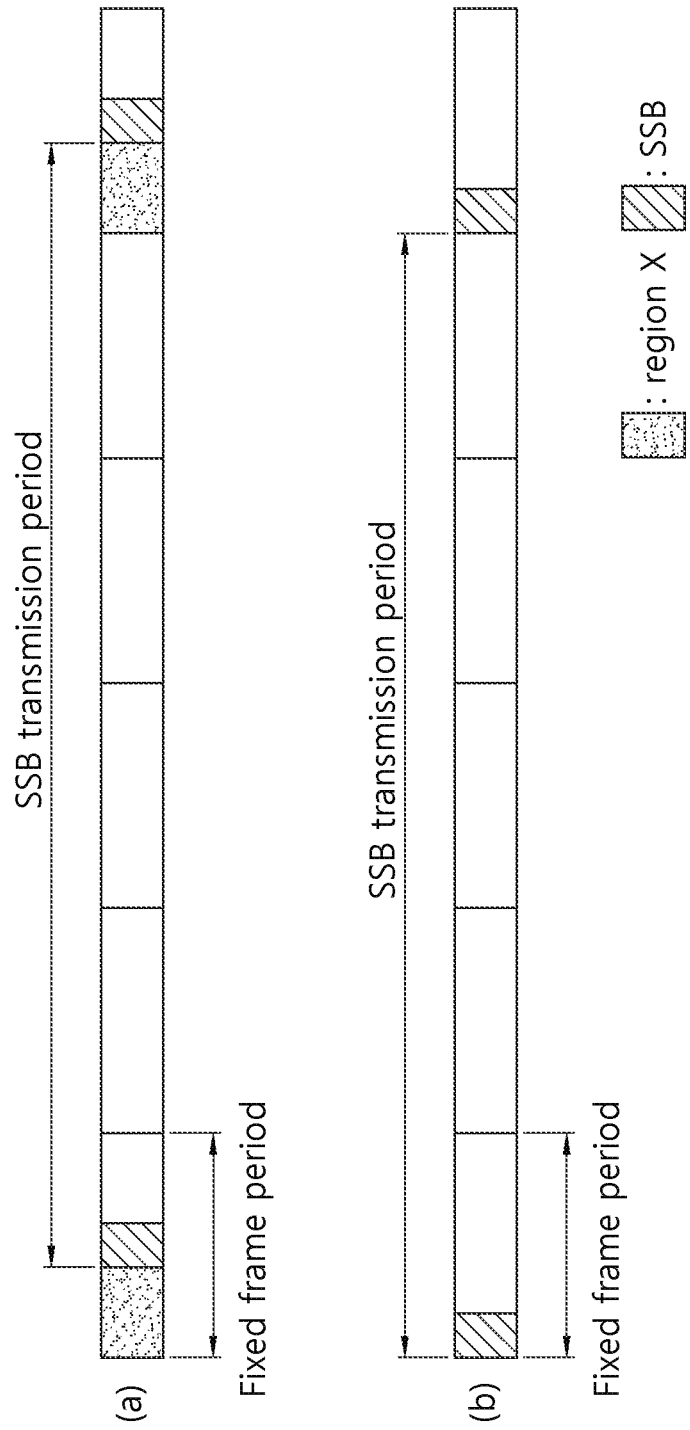
FIG. 17 illustrates one example of a transmission position of an SSB when an SSB transmission period and a frame period forms a divisor relationship with each other.

FIG. 17 illustrates one example of a transmission position of an SSB when an SSB transmission period and a frame period forms a divisor relationship with each other. More specifically, FIG. 17(a) shows one example in which the SSB is transmitted periodically at a position rather than the frame start position, and FIG. 17(b) shows one example in which the SSB is transmitted periodically at the frame start position.

According to FIG. 17(a), the SSB is transmitted periodically after the region X from the start of a frame period. Here, after performing LBT, the base station may have to transmit a reservation signal up to the SSB transmission position (for example, the region X) of the corresponding frame period. In this case, transmission of the reservation signal by the base station may cause a waste of transmission resources.

Meanwhile, according to FIG. 17(b), SSBs are transmitted at the beginning of a frame period. In this case, different from FIG. 17(a), the region X does not exist, and thus, a base station does not have to transmit a reservation signal.

Therefore, when SSBs are transmitted as shown in FIG. 17(b), relatively resource-efficient SSB transmission, and what is more, resource efficient communication may be made possible.

In what follows, a method for configuring and performing Autonomous Uplink (AUL) transmissions will be proposed.

[Proposed method #3] A method for performing AUL transmissions setting up a gap between frame periods of a base station (or an initiating device) and a UE (or a responding device).

As one example, suppose a base station and a UE are configured to have a gap of 1 ms between the respective frame periods of [N, N+8 ms] and [N+1 ms, N+9 ms]; when the base station does not perform transmission on its own frame period, the UE may confirm through LBT after the gap of 1 ms that no downlink transmission exists and perform AUL transmission on the UE's own frame period by using pre-configured resources. Meanwhile, in the description above, it is assumed that frames of the base station and the UE are overlapped with each other by 1 ms gap; however, it is only an example, and the proposed method #3 may also be applied to the case in which the frames of the base station and the UE are configured not to overlap each other.

Figure 18:
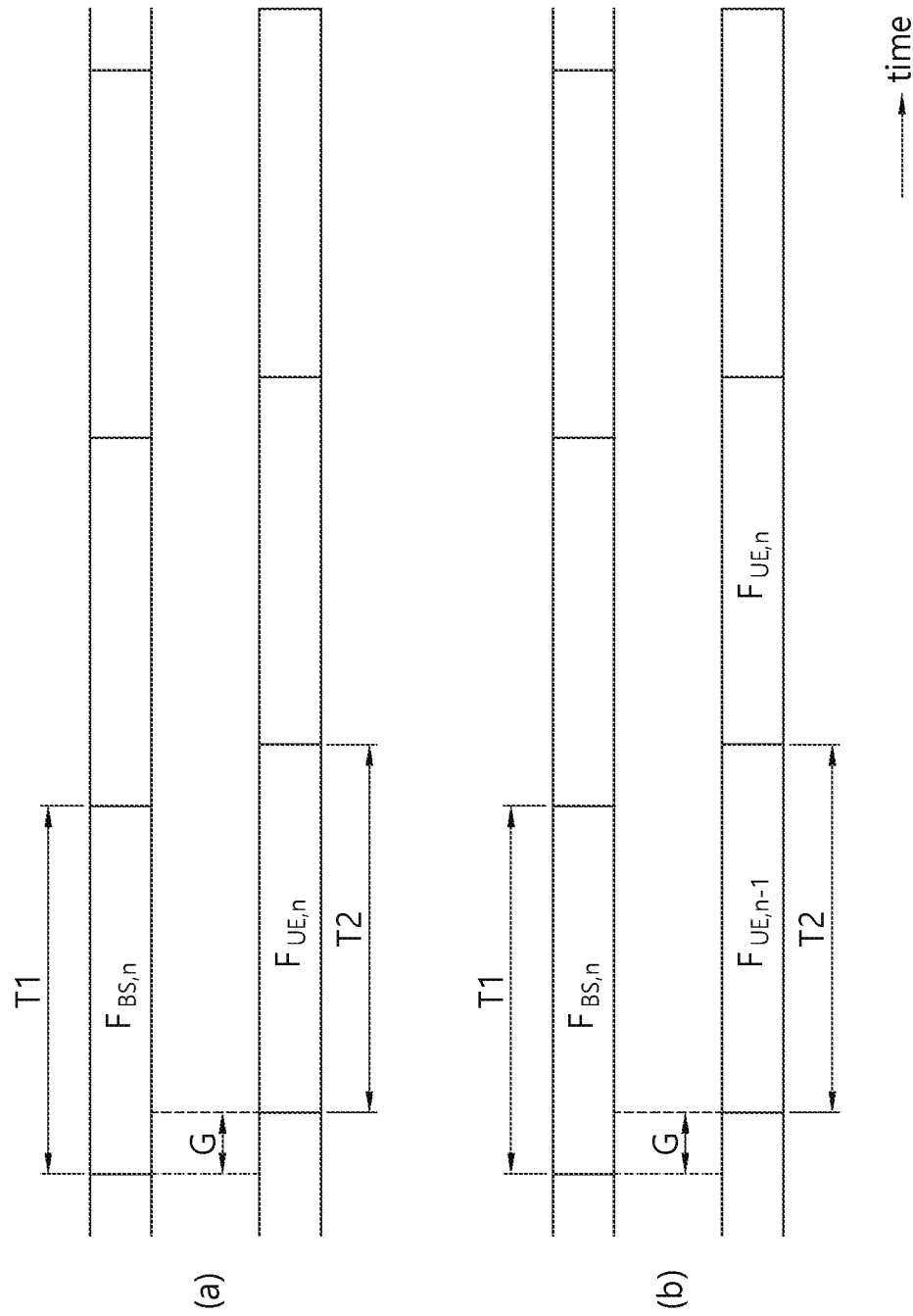
FIG. 18 illustrates one example in which a gap is set between a frame period of a base station and a frame period of a UE.

FIG. 18 illustrates one example in which a gap is set between a frame period of a base station and a frame period of a UE.

According to FIG. 18, when the frame period of the base station is denoted by T1, and the frame period of the UE is denoted by T2, the gap between T1 and T2 may be configured to be G. Here, the lengths of T1 and T2 may be the same or different from each other in the time domain; however, FIG. 18 illustrates only the case where the length of T1 is the same as the length of T2.

Here, according to FIG. 18(a), the gap between T1 and T2 may be configured to be smaller than the lengths of T1 and T2. In this case, according to the proposed method #3, when the base station does not perform transmission on its n-th frame period $F_{BS,n}$, the UE may confirm the current status and perform autonomous uplink transmission on its n-th frame period $F_{UE,n}$.

Also, according to FIG. 18(b), the gap between T1 and T2 may be configured to be longer than the lengths of T1 and T2. In this case, according to the proposed method #3, when the base station does not perform transmission on its n-th frame period $F_{BS,n}$, the UE may confirm the current status and perform autonomous uplink transmission on its n-th frame period $F_{UE,n}$.

Another method is to set the priority of AUL to be lower than downlink transmission so as to slightly push back the frame period of a UE, which may configure the channel occupancy probability of AUL transmission to be lower than that of downlink transmission by setting priorities between LBTs of the base station and the UE using a CCA threshold value or the length of an observation slot as used in the proposed method #1. Also, the Channel Occupancy Time (COT) obtained by the UE may be shared with the base station so that the remaining COT may be used for downlink transmission.

Meanwhile, the present proposed method may configure the gap between the base station's transmission and the UE's AUL transmission by using RRC or MAC or L1 signaling, and the corresponding gap (and/or LBT parameter such as the CCA threshold value or the length of an observation slot) may be configured/indicated not only between the base station and the UE but also differently among UEs so that priorities for AUL transmission may be configured for the respective UEs.

Meanwhile, the present disclosure is not limited to direct communication between UEs but may also be used for uplink or downlink transmission, where, in this case, a base station or a relay node may use the proposed method.

Since examples of the proposed method above may be included as methods for implementing the present disclosure, it is obvious that the examples may be regarded as some sort of proposed methods. Although the proposed methods described above may be implemented independently, they may still be implemented in the form of a combination (or merging) of some of the proposed methods. A rule may be defined so that information about whether the proposed methods are applied (or information about the rules of the proposed methods) is informed using a pre-defined signal (for example, a physical layer signal or an upper layer signal) by a base station to a UE or by a transmit UE to a receive UE.

The appended claims of the present disclosure may be combined in various ways. For example, technical features of method claims of the present disclosure may be combined to be implemented as an apparatus, and technical features of apparatus claims of the present disclosure may be combined to be implemented as a method. Also, technical features of method claims and technical features of apparatus claims of the present disclosure may be combined to be implemented as an apparatus, and technical features of method claims and technical features of apparatus claims of the present disclosure may be combined to be implemented as a method.

Hereinafter, devices to which the present description may be applied will be described.

Figure 19:
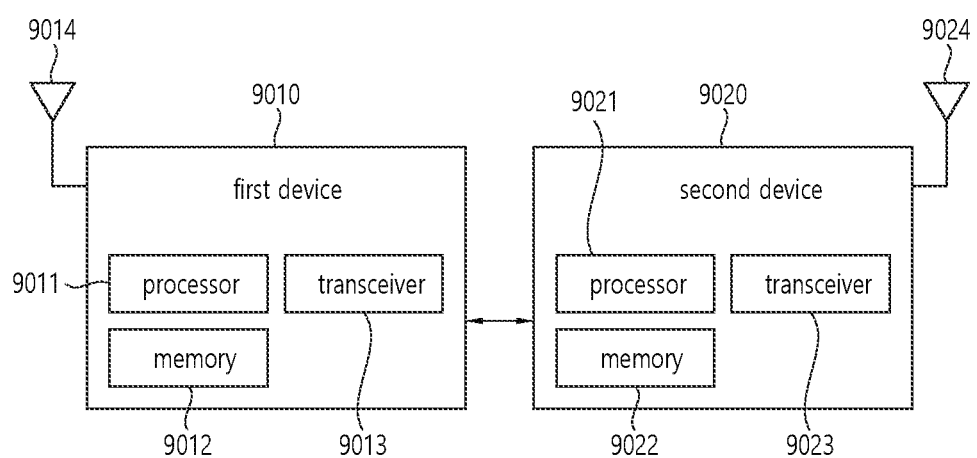
FIG. 19 illustrates a wireless communication device according to one embodiment of the present disclosure.

FIG. 19 illustrates a wireless communication device according to one embodiment of the present disclosure.

Referring to FIG. 19, a wireless communication device may comprise a first device 9010 and a second device 9020.

The first device 9010 may be a base station, a network node, a transmit UE, a receive UE, a wireless device, a wireless communication device, a vehicle, a vehicle with an autonomous navigation function, a connected car, an Unmanned Aerial Vehicle (UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a fintech device (or financial device), a security device, a weather/environment device, a device related to 5G services or a device related to the fields of the 4th industrial revolution.

The second device 9020 may be a base station, a network node, a transmit UE, a receive UE, a wireless device, a wireless communication device, a vehicle, a vehicle with an autonomous navigation function, a connected car, an Unmanned Aerial Vehicle (UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a fintech device (or financial device), a security device, a weather/environment device, a device related to 5G services or a device related to the fields of the 4th industrial revolution.

For example, a UE may include a mobile phone, a smart phone, a laptop computer, a digital broadcast terminal, a Personal Digital Assistant (PDA), a Portable Multimedia Player (PMP), a navigation terminal, a slate PC, a tablet PC, an ultrabook, and a wearable device (for example, a smart watch, a smart glass, or a Head Mounted Display (HMD)). The HMD may be a display device worn on the head. For example, the HMD may be used to implement VR, AR, or MR.

For example, a drone may be an unmanned flying vehicle whose flight is controlled by a wireless control signal. For example, a VR device may include a device implementing objects or background of a virtual world. For example, an AR device may include a device that implements an augmented world by connecting objects or background of the real world to the objects or background of a virtual world. For example, an MR device may include a device that implements a mixed world by merging objects and background of the real world with the objects or background of a virtual world. For example, a hologram device may include a device that implements 360-degree stereoscopic images by recording and reproducing stereoscopic information based on interference of light generated when two laser lights meet, which is called holography. For example, a public safety device may include an image relay device or an imaging device worn on the user's body. For example, an MTC device and an IoT device may be a device that does not require direct intervention or manipulation of a human. For example, MTC devices and IoT devices may include a smart meter, a vending machine, a thermometer, a smart light bulb, a door lock, or various types of sensors. For example, a medical device may be a device used for diagnosis, treatment, alleviation, prescription, or prevention of illness. For example, a medical device may be a device used to diagnose, treat, alleviate or correct injury or disorder. For example, a medical device may be a device used to examine, replace or modify a structure or a function. For example, a medical device may be device used to controlling pregnancy. For example, a medical device may include a device for treatment, a device for surgery, a device for (extracorporeal) diagnosis, a hearing aid or a device for medical procedure. For example, a security device may be a device installed to prevent a possible danger and maintain safety. For example, a security device may include a camera, CCTV, a recorder or a blackbox. For example, a fintech device may be a device that provides financial services such as mobile payment. For example, a fintech device may include a payment device or a Point Of Sales (POS) device. For example, a weather/environment device may include a device that monitors or predicts weather/environment.

The first device 9010 may include at least one or more processors such as the processor 9011, at least one or more memories such as the memory 9012, and at least one or more transceivers such as the transceiver 9013. The processor 9011 may perform the functions, procedures and/or methods described above. The processor 9011 may perform one or more protocols. For example, the processor 9011 may perform one or more layers of a wireless interface protocol. The memory 9012 may be connected to the processor 9011 and store various types of information and/or commands. The transceiver 9013 may be connected to the processor 9011 and controlled to transmit and receive a wireless signal.

The second device 9020 may include at least one or more processors such as the processor 9021, at least one or more memories such as the memory 9022, and at least one or more transceivers such as the transceiver 9023. The processor 9021 may perform the functions, procedures and/or methods described above. The processor 9021 may perform one or more protocols. For example, the processor 9021 may perform one or more layers of a wireless interface protocol. The memory 9022 may be connected to the processor 9021 and store various types of information and/or commands. The transceiver 9023 may be connected to the processor 9021 and controlled to transmit and receive a wireless signal.

The memory 9012 and/or the memory 9022 may be connected to the processor 9011 and/or the processor 9021 inside or outside of the respective processors or may be connected to another processor through various technologies such as wired or wireless connection.

The first device 9010 and/or the second device 9020 may have one or more antennas. For example, the antenna 9014 and/or the antenna 9024 may be configured to transmit and receive a wireless signal.

Figure 20:
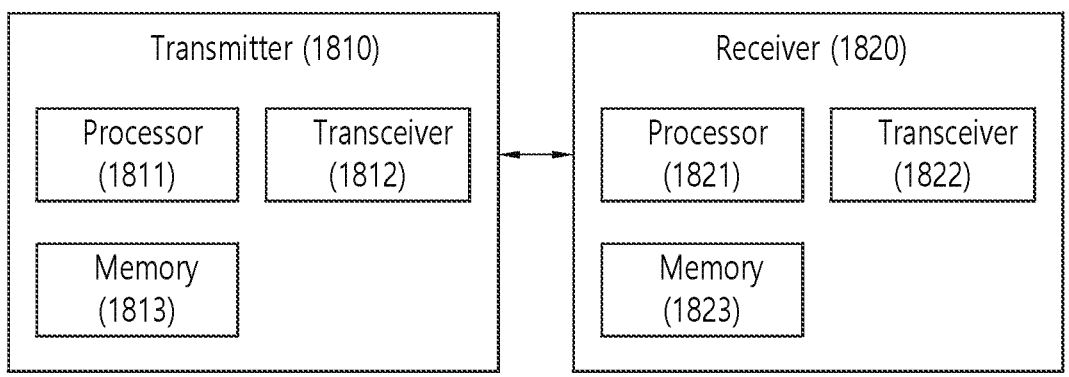
FIG. 20 is a block diagram showing components of a transmission device 1810 and a reception device 1820 which perform the present disclosure.

FIG. 20 is a block diagram showing components of a transmission device 1810 and a reception device 1820 which perform the present disclosure. Herein, each of the transmission device and the reception device may be a BS or a UE.

The transmission device 1810 and the reception device 1820 may respectively include transceivers 1812 and 1822 capable of transmitting or receiving radio signals carrying information and/or data, signals, messages, and the like, memories 1813 and 1823 storing various types of information related to communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of the aforementioned embodiments of the present disclosure. Herein, a transmitter/receiver may be called a transceiver.

The memories 1813 and 1823 may store programs for processing and control of the processors 1811 and 1821 and temporarily store input/output information. The memories 1813 and 1823 may be used as buffers.

The processors 1811 and 1821 generally control overall operations of various modules in the transmission device and the reception device. Particularly, the processors 1811 and 1821 may execute various control functions for performing the present disclosure. The processors 1811 and 1821 may also be called controllers, microcontrollers, microprocessors, microcomputers, and the like. The processors 1811 and 1821 may be implemented by hardware, firmware, software or a combination thereof. When the present disclosure is implemented using hardware, ASICs (application specific integrated circuits), DSPs (digital signal processors), DSPDs (digital signal processing devices), PLDs (programmable logic devices), FPGAs (field programmable gate arrays), or the like configured to perform the present disclosure may be included in the processors 1811 and 1821. Meanwhile, when the present disclosure is implemented using firmware or software, firmware or software may be configured to include modules, procedures, functions, or the like which perform functions or operations of the present disclosure, and the firmware or software configured to perform the present disclosure may be included in the processors 1811 and 1821 or stored in the memories 1813 and 1823 and driven by the processors 1811 and 1821.

The processor 1811 of the transmission device 1810 may perform predetermined coding and modulation on a signal and/or data which will be transmitted to the outside and then transmit the coded and modulated signal or data to the transceiver 1812. For example, the processor 1811 may generate a codeword by performing demultiplexing, channel coding, scrambling, and modulation on a data string to be transmitted. The codeword may include information equivalent to transport blocks that are data blocks provided by a MAC layer. One transport block (TB) may be coded into one codeword. Each codeword may be transmitted to the reception device through one or more layers. For frequency up-conversion, the transceiver 1812 may include an oscillator. The transceiver 1812 may include one or a plurality of transmission antennas.

A signal processing procedure of the reception device 1820 may be reverse to the signal processing procedure of the transmission device 1810. The transceiver 1822 of the reception device 1820 may receive radio signals transmitted from the transmission device 1810 under the control of the processor 1821. The transceiver 1822 may include one or a plurality of reception antennas. The transceiver 1822 may restore each signal received through the reception antenna to a baseband signal by performing frequency down-conversion. The transceiver 1822 may include an oscillator for frequency down-conversion. The processor 1821 may restore data intended to be transmitted by the transmission device 1810 by performing decoding and demodulation on radio signals received through the reception antenna.

The transceivers 1812 and 1822 may include one or a plurality of antennas. The antennas may serve to transmit signals processed by the transceivers 1812 and 1822 to the outside or receive external radio signals and transmit the radio signals to the transceivers 1812 and 1822 according to an embodiment under the control of the processors 1811 and 1821. The antennas may also be called antenna ports. Each antenna may correspond to one physical antenna or may be configured by a combination of two or more physical antennas. A signal transmitted from each antenna cannot be decomposed any more by the reception device 1820. A reference signal (RS) transmitted in association with an antenna defines the antenna from a perspective of the reception device 1820 and enables the reception device 1820 to perform channel estimation for the antenna irrespective of whether a channel is a single radio channel from a physical antenna or a composite channel from a plurality of physical antenna elements including the antenna. That is, an antenna may be defined such that a channel carrying symbols on the antenna can be derived from a channel carrying other symbols on the same antenna. A transceiver which supports a multi-input multi-output (MIMO) function for transmitting/receiving data using a plurality of antennas may be connected to two or more antennas.

Figure 21:
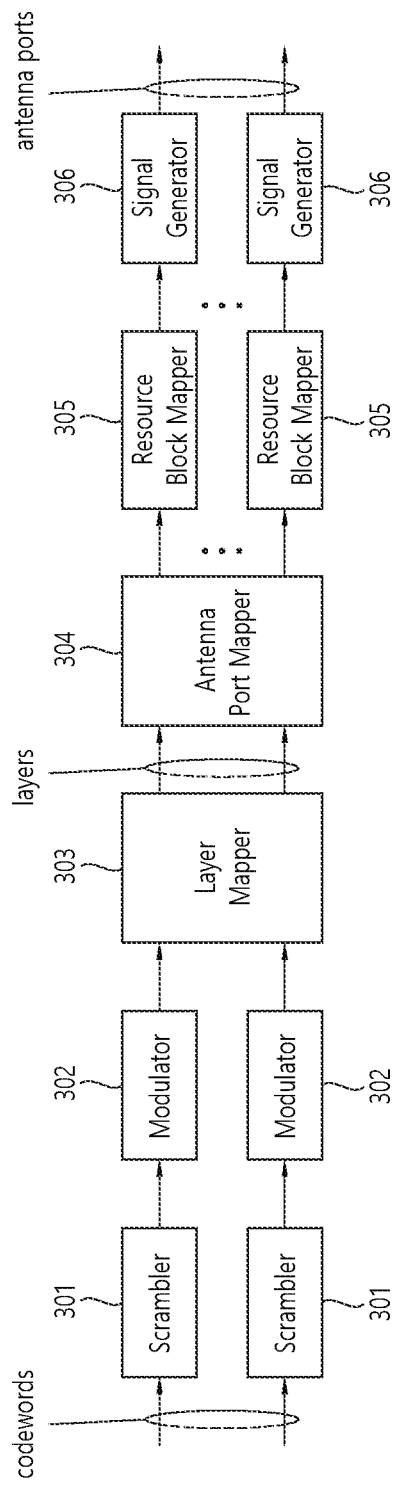
FIG. 21 shows an example of a signal processing module structure in the transmission device 1810.

FIG. 21 shows an example of a signal processing module structure in the transmission device 1810. Herein, signal processing may be performed by a processor of a BS/UE such as the processors 1811 and 1821 of FIG. 20.

Referring to FIG. 21, the transmission device 1810 in the UE or the BS may include a scrambler 301, a modulator 302, a layer mapper 303, an antenna port mapper 304, a resource block mapper 305 and a signal generator 306.

The transmission device 1810 may transmit one or more codewords. Coded bits in each codeword are scrambled by the scrambler 301 and transmitted on a physical channel. A codeword may also be referred to as a data string and may be equivalent to a transport block that is a data block provided by a MAC layer.

The scrambled bits are modulated into complex-valued modulation symbols by the modulator 302. The modulator 302 may modulate the scrambled bits according to a modulation scheme and arrange the scrambled bits as complex-valued symbols representing positions on a signal constellation. The modulation scheme is not limited, and m-phase shift keying (m-PSK) or m-quadrature amplitude modulation (m-QAM) may be used to module the coded data. The modulator may also be referred to as a modulation mapper.

The complex-valued modulation symbols may be mapped to one or more transport layers by the layer mapper 303. The complex-valued modulation symbols on the layers may be mapped by the antenna port mapper 304 for transmission on antenna ports.

The resource block mapper 305 may map complex-valued modulation symbols for respective antenna ports to appropriate resource elements in a virtual resource block allocated for transmission. The resource block mapper may map the virtual resource block to a physical resource block according to an appropriate mapping scheme. The resource block mapper 305 may allocate the complex-valued modulation symbols for the respective antenna ports to appropriate subcarriers and multiplex the same according to a user.

The signal generator 306 may modulate the complex-valued modulation symbols for the respective antenna ports, that is, antenna-specific symbols according to a specific modulation scheme, for example, orthogonal frequency division multiplexing (OFDM) to generate a complex-valued time domain OFDM symbol signal. The signal generator may perform inverse fast Fourier transform (IFFT) on the antenna-specific symbols, and a cyclic prefix (CP) may be inserted into time domain symbols on which IFFT has been performed. OFDM symbols are subjected to digital-to-analog conversion, frequency up-conversion, and the like and transmitted to a reception device through respective transmission antennas. The signal generator may include an IFFT module, a CP insertion device, a digital-to-analog converter (DAC), a frequency uplink converter, and the like.

Figure 22:
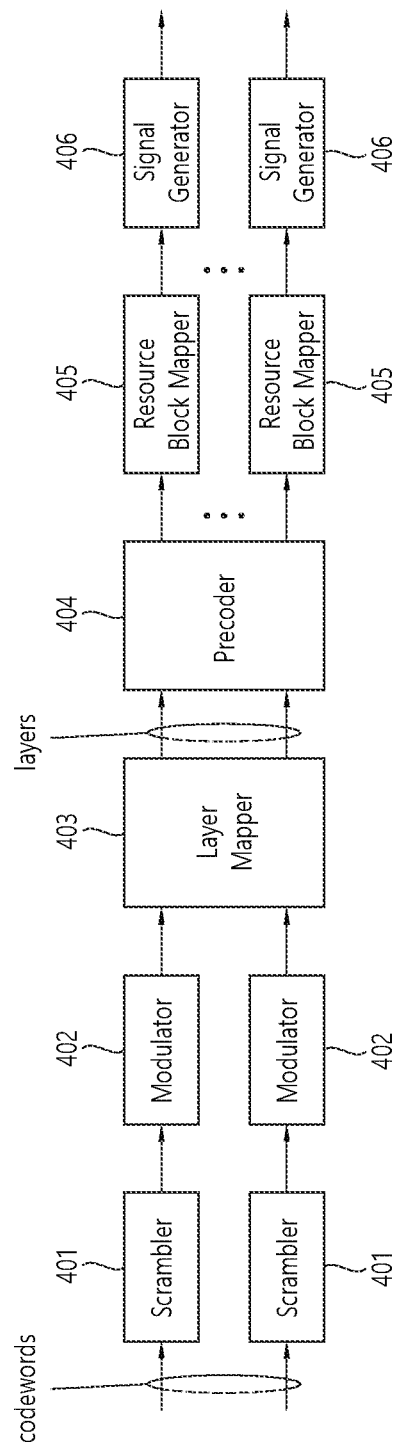
FIG. 22 shows another example of the signal processing module structure in the transmission device 1810.

FIG. 22 shows another example of the signal processing module structure in the transmission device 1810. Herein, signal processing may be performed by a processor of a UE/BS such as the processors 1811 and 1821 of FIG. 20.

Referring to FIG. 22, the transmission device 1810 in the UE or the BS may include a scrambler 401, a modulator 402, a layer mapper 403, a precoder 404, a resource block mapper 405, and a signal generator 406.

For a codeword, the transmission device 1810 may scramble coded bits in the codeword through the scrambler 401 and then transmit the scrambled bits through a physical channel.

The scrambled bits are modulated into complex-valued modulation symbols by the modulator 402. The modulator may modulate the scrambled bits according to a predetermined modulation scheme and arrange the scrambled bits as complex-valued symbols representing positions on a signal constellation. The modulation scheme is not limited, and pi/2-binary phase shift keying (pi/2-BPSK), m-phase shift keying (m-PSK) or m-quadrature amplitude modulation (m-QAM) may be used to modulate the coded data.

The complex-valued modulation symbols may be mapped to one or more transport layers by the layer mapper 403.

The complex-valued modulation symbols on the layers may be precoded by the precoder 404 for transmission through antenna ports. Herein, the precoder may perform precoding after performing transform precoding for the complex-valued modulation symbols. Alternatively, the precoder may perform precoding without performing transform precoding. The precoder 404 may process the complex-valued modulation symbols according to MIMO using multiple transmission antennas to output antenna-specific symbols and distribute the antenna-specific symbols to the corresponding resource block mapper 405. An output z of the precoder 404 may be obtained by multiplying output y of the layer mapper 403 by an N×M precoding matrix W. Herein, N is the number of antenna ports, and M is the number of layers.

The resource block mapper 405 maps complex-valued modulation symbols for respective antenna ports to appropriate resource elements in a virtual resource block allocated for transmission.

The resource block mapper 405 may allocate the complex-valued modulation symbols to appropriate subcarriers and multiplex the same according to a user.

The signal generator 406 may modulate the complex-valued modulation symbols according to a specific modulation scheme, for example, OFDM to generate a complex-valued time domain OFDM symbol signal. The signal generator 406 may perform inverse fast Fourier transform (IFFT) on the antenna-specific symbols, and a cyclic prefix (CP) may be inserted into time domain symbols on which IFFT has been performed. OFDM symbols are subjected to digital-to-analog conversion, frequency up-conversion, and the like and transmitted to a reception device through respective transmission antennas. The signal generator 406 may include an IFFT module, a CP insertion device, a digital-to-analog converter (DAC), a frequency uplink converter, and the like.

A signal processing procedure of a reception device 1820 may be reverse to the signal processing procedure of the transmission device. Specifically, the processor 1821 of the transmission device 10 decodes and modulates a radio signal received from the outside through antenna ports of the transceiver 1822. The reception device 1820 may include multiple reception antennas, and signals received through the reception antennas are restored into baseband signals and then restored into data strings intended to be transmitted by the transmission device 10 through multiplexing and MIMO demodulation. The reception device 1820 may include a signal restoration device for restoring a received signal into a baseband signal, a multiplexer for combining and multiplexing received signals, and a channel demodulator for demodulating multiplexed signal strings into corresponding codewords. The signal restoration device, the multiplexer, and the channel demodulator may be configured as an integrated module for executing functions thereof or as independent modules. More specifically, the signal restoration device may include an analog-to-digital converter (ADC) for converting an analog signal into a digital signal, a CP remover for removing a CP from the digital signal, an FFT module for applying fast Fourier transform (FFT) to the CP-removed signal to output frequency domain symbols, and a resource element demapper/equalizer for restoring the frequency domain symbols into antenna-specific symbols. The antenna-specific symbols are restored into a transport layer through the multiplexer, and the transport layer is restored into a codeword intended to be transmitted by the transmission device through the channel demodulator.

Figure 23:
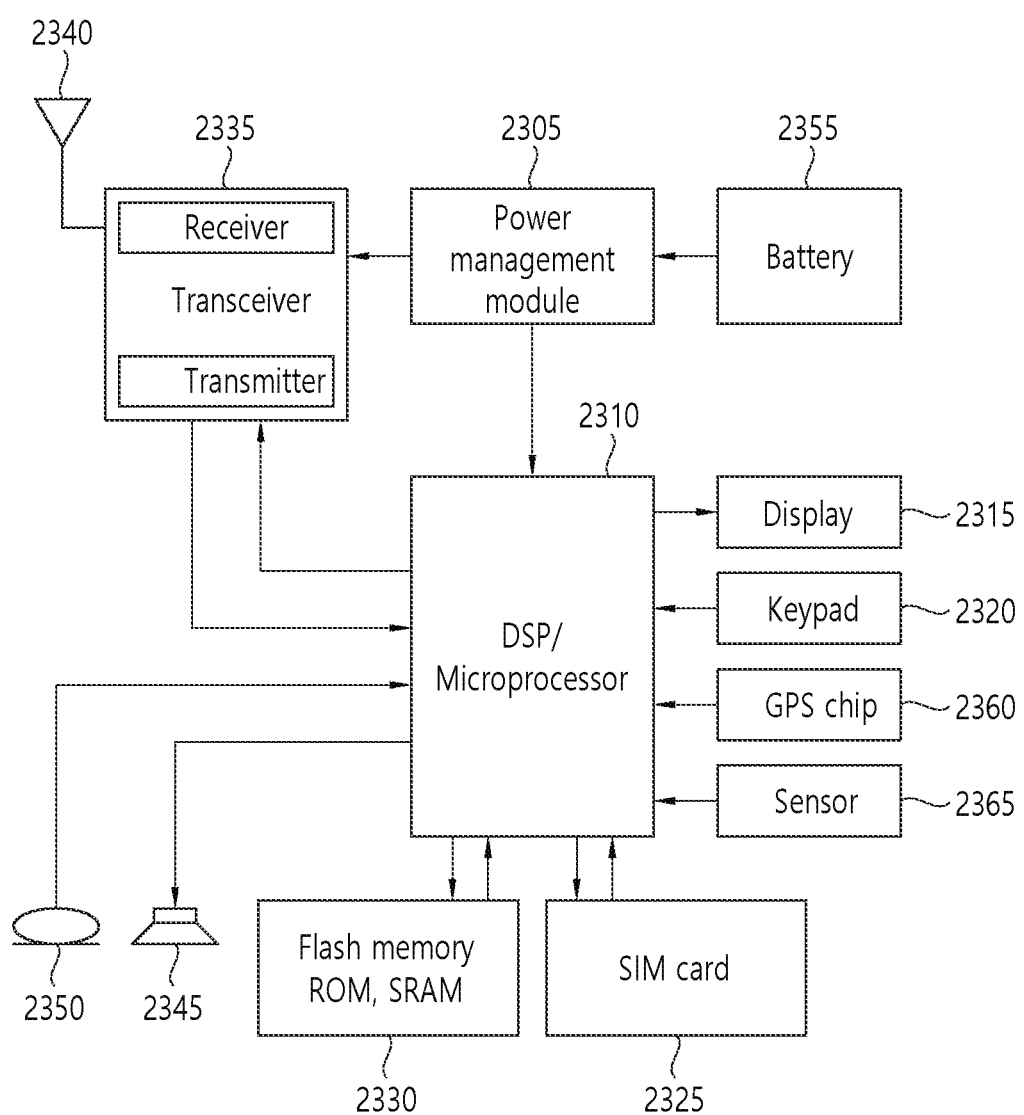
FIG. 23 shows an example of a wireless communication device according to an implementation example of the present disclosure.

FIG. 23 shows an example of a wireless communication device according to an implementation example of the present disclosure.

Referring to FIG. 23, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345, and a microphone 2350. A plurality of antennas and a plurality of processors may be provided.

The processor 2310 may implement functions, procedures, and methods described in the present specification. The processor 2310 of FIG. 23 may be the processors 1811 and 1821 of FIG. 20.

The memory 2330 is connected to the processor 2310 and stores information related to operation of the processor. The memory may be located inside or outside the processor and connected to the processor through various techniques such as wired connection and wireless connection. The memory 2330 of FIG. 23 may be the memories 1813 and 1823 of FIG. 20.

A user may input various types of information such as telephone numbers using various techniques such as pressing buttons of the keypad 2320 and activating sound using the microphone 2350. The processor 2310 may receive user information, process the user information, and execute an appropriate function such as making a call using an input telephone number. In some scenarios, data may be retrieved from the SIM card 2325 or the memory 2330 in order to execute an appropriate function. In some scenarios, the processor 2310 may display various types of information and data on the display 2315 for user convenience.

The transceiver 2335 is connected to the processor 2310 and transmit/receive radio signals such as radio frequency (RF) signals. The processor may control the transceiver in order to start communication or transmit radio signals including various types of information or data such as audio communication data. The transceiver includes a transmitter and a receiver for transmitting and receiving radio signals. The antenna 2340 may facilitate transmission and reception of radio signals. In some implementation examples, when the transceiver receives a radio signal, the transceiver may forward and convert the signal into a baseband frequency for processing by the processor. The processed signal may be processed through various techniques such as conversion into audible or readable information such that it is output through the speaker 2345. The transceiver of FIG. 23 may be the transceivers 1812 and 1822 of FIG. 19.

Although not shown in FIG. 23, the UE may additionally include various components such as a camera and a universal serial bus (USB) port. For example, the camera may be connected to the processor 2310.

FIG. 23 is only one implementation example for the UE, and the implementation example is not limited thereto. It is not necessary for the UE to include all components of FIG. 22. That is, some components, for example, the keypad 2320, the GSP chip 2360, the sensor 2365, and the SIM card may not be essential components, and in this case, they may not be included in the UE.

The embodiments of the present disclosure described above may be applied to the following technologies.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value.

An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse.

Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc.

The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method.

Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot.

Robots can be classified into industrial, medical, household, military, etc., depending on the purpose and field of use.

The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user.

For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set.

The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc.

The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world.

MR technology is similar to AR technology in that it shows real and virtual objects together. However, in the AR technology, the virtual object is used as a complement to the real object, whereas in the MR technology, the virtual object and the real object are used in an equal manner.

XR technology can be applied to HMD, head-up display (HUD), mobile phone, tablet PC, laptop, desktop, TV, digital signage. A device to which the XR technology is applied may be referred to as an XR device.

Figure 24:
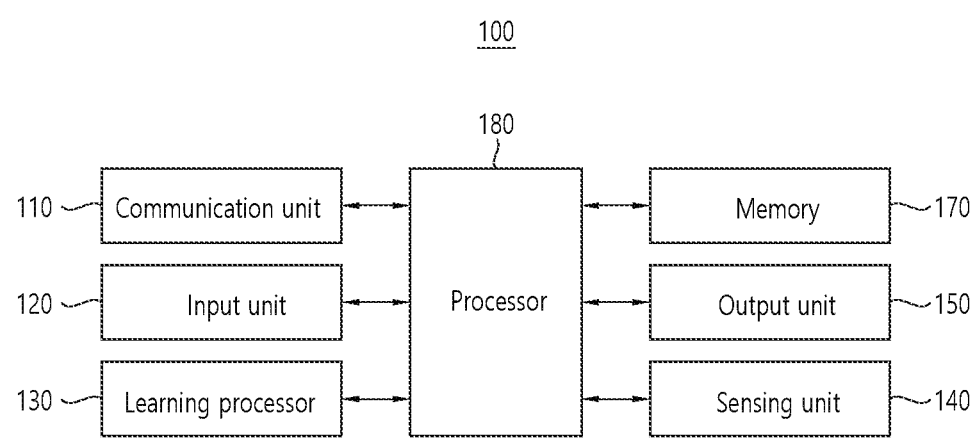
FIG. 24 shows an example of an AI device to which the technical features of the present disclosure can be applied.

FIG. 24 shows an example of an AI device to which the technical features of the present disclosure can be applied.

The AI device 100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 24, the AI device 100 may include a communication part 110, an input part 120, a learning processor 130, a sensing part 140, an output part 150, a memory 170, and a processor 180.

The communication part 110 can transmit and/or receive data to and/or from external devices such as the AI devices 100a to 100e and the AI server 200 using wire and/or wireless communication technology. For example, the communication part 110 can transmit and/or receive sensor information, a user input, a learning model, and a control signal with external devices.

The communication technology used by the communication part 110 may include a global system for mobile communication (GSM), a code division multiple access (CDMA), an LTE/LTE-A, a 5G, a WLAN, a Wi-Fi, a Bluetooth™, radio frequency identification (RFID), infrared data association (IrDA), ZigBee, and/or near field communication (NFC).

The input part 120 can acquire various kinds of data.

The input part 120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information.

The input part 120 can acquire input data to be used when acquiring an output using learning data and a learning model for model learning. The input part 120 may obtain raw input data, in which case the processor 180 or the learning processor 130 may extract input features by preprocessing the input data.

The learning processor 130 may learn a model composed of an ANN using learning data. The learned ANN can be referred to as a learning model. The learning model can be used to infer result values for new input data rather than learning data, and the inferred values can be used as a basis for determining which actions to perform.

The learning processor 130 may perform AI processing together with the learning processor 240 of the AI server 200.

The learning processor 130 may include a memory integrated and/or implemented in the AI device 100. Alternatively, the learning processor 130 may be implemented using the memory 170, an external memory directly coupled to the AI device 100, and/or a memory maintained in an external device.

The sensing part 140 may acquire at least one of internal information of the AI device 100, environment information of the AI device 100, and/or the user information using various sensors.

The sensors included in the sensing part 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 150 may generate an output related to visual, auditory, tactile, etc.

The output part 150 may include a display unit for outputting visual information, a speaker for outputting auditory information, and/or a haptic module for outputting tactile information.

The memory 170 may store data that supports various functions of the AI device 100. For example, the memory 170 may store input data acquired by the input part 120, learning data, a learning model, a learning history, etc.

The processor 180 may determine at least one executable operation of the AI device 100 based on information determined and/or generated using a data analysis algorithm and/or a machine learning algorithm. The processor 180 may then control the components of the AI device 100 to perform the determined operation.

The processor 180 may request, retrieve, receive, and/or utilize data in the learning processor 130 and/or the memory 170, and may control the components of the AI device 100 to execute the predicted operation and/or the operation determined to be desirable among the at least one executable operation.

The processor 180 may generate a control signal for controlling the external device, and may transmit the generated control signal to the external device, when the external device needs to be linked to perform the determined operation.

The processor 180 may obtain the intention information for the user input and determine the user's requirements based on the obtained intention information.

The processor 180 may use at least one of a speech-to-text (STT) engine for converting speech input into a text string and/or a natural language processing (NLP) engine for acquiring intention information of a natural language, to obtain the intention information corresponding to the user input.

At least one of the STT engine and/or the NLP engine may be configured as an ANN, at least a part of which is learned according to a machine learning algorithm. At least one of the STT engine and/or the NLP engine may be learned by the learning processor 130 and/or learned by the learning processor 240 of the AI server 200, and/or learned by their distributed processing.

The processor 180 may collect history information including the operation contents of the AI device 100 and/or the user's feedback on the operation, etc. The processor 180 may store the collected history information in the memory 170 and/or the learning processor 130, and/or transmit to an external device such as the AI server 200. The collected history information can be used to update the learning model.

The processor 180 may control at least some of the components of AI device 100 to drive an application program stored in memory 170. Furthermore, the processor 180 may operate two or more of the components included in the AI device 100 in combination with each other for driving the application program.

Figure 25:
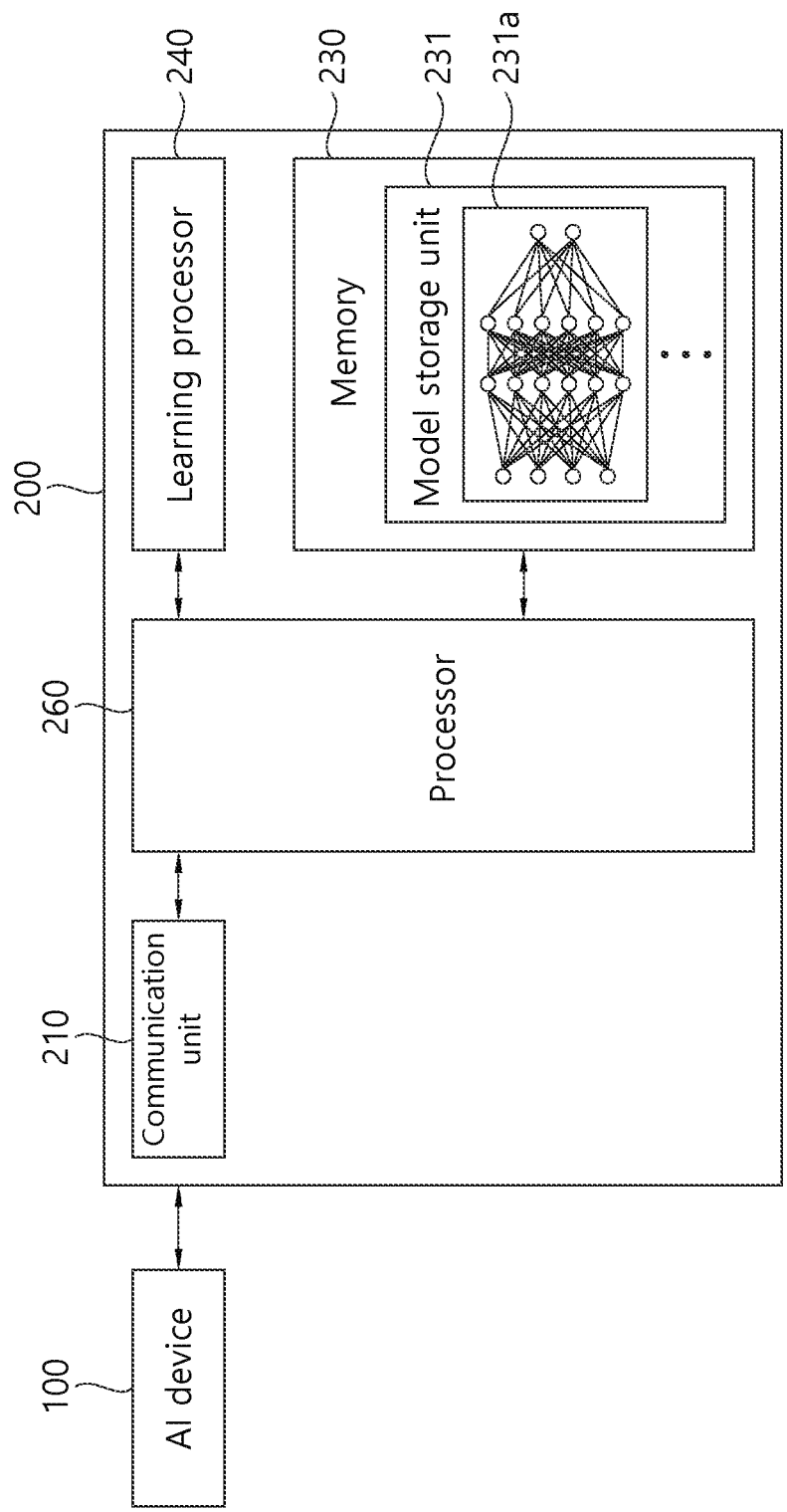
FIG. 25 illustrates an AI server 200 according to one embodiment of the present disclosure.

FIG. 25 illustrates an AI server 200 according to one embodiment of the present disclosure.

Referring to FIG. 25, the AI server 200 may refer to a device that trains an artificial neural network using a machine learning algorithm or using the trained artificial neural network. Here, the AI server 200 may be composed of a plurality of servers to perform distributed processing and defined as a 5G network. At this time, the AI server 200, being included as part of the AI device 100, may perform at least part of AI processing together.

The AI server 200 may include a communication unit 210, a memory 230, a learning processor 240, and a processor 260.

The communication unit 210 may transmit and receive data to and from an external device such as the AI device 100.

The memory 230 may include a model storing unit 231. The model storing unit 231 may store a model being trained through the learning processor 240 or a trained model (or an artificial neural network 231a).

The learning processor 240 may train the artificial neural network 231a using training data. A learning model may be used while being mounted on the AI server 200 of an artificial neural network or may be used by being mounted on an external device such as the AI device 100.

The learning model may be implemented by hardware, software or a combination of hardware and software. When the whole or part of the learning model is implemented by software, one or more instructions constituting the learning model may be stored in the memory 230.

The processor 260 may infer a resultant value with respect to new input data by using the learning model and generate a response or a control instruction based on the inferred resultant value.

Figure 26:
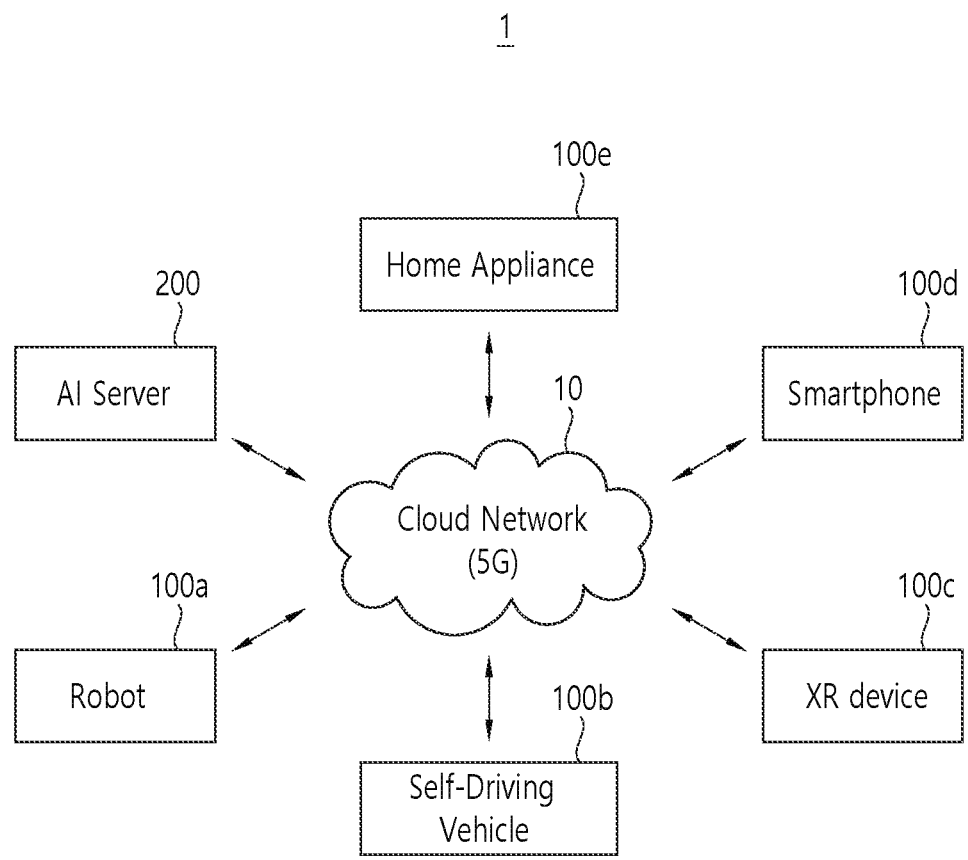
FIG. 26 shows an example of an AI system 1 to which the technical features of the present disclosure can be applied.

FIG. 26 shows an example of an AI system 1 to which the technical features of the present disclosure can be applied.

Referring to FIG. 26, in the AI system 1, at least one of an AI server 200, a robot 100a, an autonomous vehicle 100b, an XR device 100c, a smartphone 100d and/or a home appliance 100e is connected to a cloud network 10. The robot 100a, the autonomous vehicle 100b, the XR device 100c, the smartphone 100d, and/or the home appliance 100e to which the AI technology is applied may be referred to as AI devices 100a to 100e.

The cloud network 10 may refer to a network that forms part of a cloud computing infrastructure and/or resides in a cloud computing infrastructure. The cloud network 10 may be configured using a 3G network, a 4G or LTE network, and/or a 5G network.

That is, each of the devices 100a to 100e and 200 consisting the AI system 1 may be connected to each other through the cloud network 10. In particular, each of the devices 100a to 100e and 200 may communicate with each other through a base station, but may directly communicate with each other without using a base station.

The AI server 200 may include a server for performing AI processing and a server for performing operations on big data.

The AI server 200 is connected to at least one or more of AI devices constituting the AI system 1, i.e. the robot 100a, the autonomous vehicle 100b, the XR device 100c, the smartphone 100d and/or the home appliance 100e through the cloud network 10, and may assist at least some AI processing of the connected AI devices 100a to 100e.

The AI server 200 can learn the ANN according to the machine learning algorithm on behalf of the AI devices 100a to 100e, and can directly store the learning models and/or transmit them to the AI devices 100a to 100e.

The AI server 200 may receive the input data from the AI devices 100a to 100e, infer the result value with respect to the received input data using the learning model, generate a response and/or a control command based on the inferred result value, and transmit the generated data to the AI devices 100a to 100e.

Alternatively, the AI devices 100a to 100e may directly infer a result value for the input data using a learning model, and generate a response and/or a control command based on the inferred result value.

Various embodiments of the AI devices 100a to 100e to which the technical features of the present disclosure can be applied will be described. The AI devices 100a to 100e shown in FIG. 26 can be seen as specific embodiments of the AI device 100 shown in FIG. 24.

<AI+Robot>

The robot 100a may be implemented as a guide robot, a carrying robot, a cleaning robot, a wearable robot, an entertainment robot, a pet robot, an unmanned flying robot, etc., to which AI technology is applied.

The robot 100a may include a robot control module for controlling the operation, and the robot control module may refer to a software module and/or a chip implementing the software module.

The robot 100a may acquire the state information of the robot 100a using the sensor information acquired from various kinds of sensors and/or detect (recognize) the surrounding environment and/or the object, and/or generate map data, and/or determine a travel route and/or a travel plan, and/or determine a response to user interaction, and/or determine an operation.

The robot 100a can use the sensor information acquired from at least one sensor among the LIDAR, the radar, and/or the camera to determine the travel route and/or the travel plan.

The robot 100a can perform the above-described operations using a learning model composed of at least one ANN. For example, the robot 100a can recognize the surrounding environment and/or the object using the learning model, and can determine the operation using the recognized surrounding information and/or the object information. The learning model may be learned directly from the robot 100a and/or learned from an external device such as the AI server 200.

The robot 100a can directly generate a result using the learning model and perform an operation. The robot 100a may transmit sensor information to an external device such as the AI server 200 and may receive the generated result and perform an operation.

The robot 100a may determine the travel route and/or the travel plan using at least one of the map data, the object information detected from the sensor information and/or the object information acquired from the external device, and drive the robot 100a according to the determined travel route and/or travel plan by controlling the driving unit.

The map data may include object identification information on various objects arranged in a space in which the robot 100a moves. For example, the map data may include object identification information on fixed objects such as walls and doors, and/or on movable objects such as pots and desks. The object identification information may include a name, a type, a distance, and/or a position, etc.

The robot 100a can perform the operation and/or run by controlling the driving unit based on the control/interaction of the user. The robot 100a may acquire the intention information of the interaction due to the user's operation and/or voice utterance, determine the response based on the acquired intention information, and perform the operation.

<AI+Autonomous-Driving/Self-Driving>

The autonomous vehicle 100b may be implemented as a mobile robot, a vehicle, an unmanned aerial vehicle, etc., to which AI technology is applied.

The autonomous vehicle 100b may include an autonomous driving control module for controlling the autonomous driving function, and the autonomous driving control module may refer to a software module and/or a chip implementing the software module. The autonomous driving control module may be included in the autonomous vehicle 100b as a component of the autonomous vehicle 100b, but may be connected to the outside of the autonomous vehicle 100b with separate hardware.

The autonomous vehicle 100b may acquire the state information of the autonomous vehicle 100b using the sensor information acquired from various kinds of sensors and/or detect (recognize) the surrounding environment and/or the object, and/or generate map data, and/or determine a travel route and/or a travel plan, and/or determine an operation.

Like the robot 100a, the autonomous vehicle 100b can use the sensor information acquired from at least one sensor among the LIDAR, the radar, and/or the camera to determine the travel route and/or the travel plan.

In particular, the autonomous vehicle 100b can recognize an environment and/or an object for an area in which the field of view is obscured and/or over a certain distance by receiving sensor information from external devices, and/or receive the recognized information directly from external devices.

The autonomous vehicle 100b can perform the above-described operations using a learning model composed of at least one ANN. For example, the autonomous vehicle 100b can recognize the surrounding environment and/or the object using the learning model, and can determine the travel route using the recognized surrounding information and/or the object information. The learning model may be learned directly from the autonomous vehicle 100b and/or learned from an external device such as the AI server 200.

The autonomous vehicle 100b can directly generate a result using the learning model and perform an operation. The autonomous vehicle 100b may transmit sensor information to an external device such as the AI server 200 and may receive the generated result and perform an operation.

The autonomous vehicle 100b may determine the travel route and/or the travel plan using at least one of the map data, the object information detected from the sensor information and/or the object information acquired from the external device, and drive the autonomous vehicle 100b according to the determined travel route and/or travel plan by controlling the driving unit.

The map data may include object identification information on various objects arranged in a space (e.g. road) in which the autonomous vehicle 100b moves. For example, the map data may include object identification information on fixed objects such as street lamps, rocks, and buildings, and/or on movable objects such as vehicles and pedestrians. The object identification information may include a name, a type, a distance, and/or a position, etc.

The autonomous vehicle 100b can perform the operation and/or run by controlling the driving unit based on the control/interaction of the user. The autonomous vehicle 100b may acquire the intention information of the interaction due to the user's operation and/or voice utterance, determine the response based on the acquired intention information, and perform the operation.

<AI+XR>

The XR device 100c may be implemented as a HMD, a HUD, a TV, a mobile phone, a smartphone, a computer, a wearable device, a home appliance, a digital signage, a vehicle, a fixed robot, a mobile robot, etc., to which AI technology is applied.

The XR device 100c analyzes the three-dimensional point cloud data and/or image data acquired from various sensors and/or from an external device to generate position data and/or attribute data for the three-dimensional points, thereby obtaining information about the surrounding space and/or the real object, and outputting the rendered XR object. For example, the XR device 100c may output an XR object, which includes the additional information about the recognized object, by corresponding to the recognized object.

The XR device 100c can perform the above-described operations using a learning model composed of at least one ANN. For example, the XR device 100c can recognize a real object from three-dimensional point cloud data and/or image data using the learning model, and can provide information corresponding to the recognized real object. The learning model may be learned directly from the XR device 100c and/or learned from an external device such as the AI server 200.

The XR device 100c can directly generate a result using the learning model and perform an operation. The XR device 100c may transmit sensor information to an external device such as the AI server 200 and may receive the generated result and perform an operation.

<AI+Robot+Autonomous-Driving/Self-Driving>

The robot 100a may be implemented as a guide robot, a carrying robot, a cleaning robot, a wearable robot, an entertainment robot, a pet robot, an unmanned flying robot, etc., to which AI technology and autonomous-driving technology are applied.

The robot 100a to which the AI technology and autonomous-driving technology are applied may mean the robot 100a having the autonomous-driving function itself and/or the robot 100a interacting with the autonomous vehicle 100b.

The robot 100a having an autonomous-driving function can collectively refer to devices that move by themselves in accordance with a given travel route and/or move by determining the traveling route by themselves without user's control.

The robot 100a having the autonomous-driving function and the autonomous vehicle 100b can use a common sensing method to determine at least one of the travel route and/or the travel plan. For example, the robot 100a having the autonomous-driving function and the autonomous vehicle 100b can determine at least one of the travel route and/or the travel plan using the information sensed through the LIDAR, the radar, and/or the camera.

The robot 100a interacting with the autonomous vehicle 100b may exist separately from the autonomous vehicle 100b. The robot 100a interacting with the autonomous vehicle 100b may be associated with the autonomous-driving function inside and/or outside the autonomous vehicle 100b, and/or may perform an operation associated with the user aboard the autonomous vehicle 100b.

The robot 100a interacting with the autonomous vehicle 100b may acquire the sensor information on behalf of the autonomous vehicle 100b and provide it to the autonomous vehicle 100b. The robot 100a interacting with the autonomous vehicle 100b may obtain the sensor information and generate the environment information and/or the object information to provide the autonomous vehicle 100b, thereby controlling and/or assisting the autonomous-driving function of the autonomous vehicle 100b.

The robot 100a interacting with the autonomous vehicle 100b may monitor the user boarding the autonomous vehicle 100b and/or may control the functions of the autonomous vehicle 100b through interaction with the user. For example, when it is determined that the driver is in a drowsy state, the robot 100a may activate the autonomous-driving function of the autonomous vehicle 100b and/or assist the control of the driving unit of the autonomous vehicle 100b. The function of the autonomous vehicle 100b controlled by the robot 100a may include not only an autonomous-driving function but also a function provided by a navigation system and/or an audio system provided in the autonomous vehicle 100b.

The robot 100a interacting with the autonomous vehicle 100b may provide information and/or assist the function to the autonomous vehicle 100b outside the autonomous vehicle 100b. For example, the robot 100a, such as a smart traffic light, may provide traffic information including signal information, etc., to the autonomous vehicle 100b. The robot 100a, such as an automatic electric charger of an electric vehicle, may interact with the autonomous vehicle 100b to connect the electric charger to the charging hole automatically.

<AI+Robot+XR>

The robot 100a may be implemented as a guide robot, a carrying robot, a cleaning robot, a wearable robot, an entertainment robot, a pet robot, an unmanned flying robot, a drone, etc., to which AI technology and XR technology are applied.

The robot 100a to which the XR technology is applied may refer to a robot that is subject to control/interaction in the XR image. In this case, the robot 100a may be separated from the XR device 100c and can be associated with each other.

When the robot 100a that is the subject to control/interaction in the XR image acquires the sensor information from the sensors including the camera, the robot 100a and/or the XR device 100c may generate an XR image based on the sensor information and the XR device 100c can output the generated XR image. The robot 100a can operate based on a control signal and/or a user's interaction input through the XR device 100c.

For example, the user can acknowledge the XR image corresponding to the viewpoint of the robot 100a remotely linked through the external device such as the XR device 100c, and can adjust the autonomous travel path of the robot 100a, control operation and/or driving, or check the information of neighboring objects, through interaction.

<AI+Autonomous-Driving/Self-Driving+XR>

The autonomous vehicle 100b may be implemented as a mobile robot, a vehicle, an unmanned aerial vehicle, etc., to which AI technology and XR technology are applied.

The autonomous driving vehicle 100b to which the XR technology is applied may mean an autonomous vehicle having means for providing an XR image and/or an autonomous vehicle that is subject to control/interaction in the XR image. Particularly, the autonomous vehicle 100b that is subject to control/interaction in the XR image may be separated from the XR device 100c and can be associated with each other.

The autonomous vehicle 100b having the means for providing the XR image can acquire the sensor information from the sensors including the camera and output the generated XR image based on the acquired sensor information. For example, the autonomous vehicle 100b may include an HUD to output an XR image, thereby providing a passenger with a real object and/or an XR object corresponding to an object in the screen.

At this time, when the XR object is output to the HUD, at least a part of the XR object may be output so as to overlap with the actual object that the passenger's gaze is directed to. On the other hand, when the XR object is output to the display provided in the autonomous vehicle 100b, at least a part of the XR object may be output so as to overlap with the object in the screen. For example, the autonomous vehicle 100b can output XR objects corresponding to objects such as a lane, another vehicle, a traffic light, a traffic sign, a two-wheeled vehicle, a pedestrian, a building, etc.

When the autonomous vehicle 100b that is the subject to control/interaction in the XR image acquires the sensor information from the sensors including the camera, the autonomous vehicle 100b and/or the XR device 100c may generate an XR image based on the sensor information and the XR device 100c can output the generated XR image. The autonomous vehicle 100b can operate based on a control signal and/or a user's interaction input through the XR device 100c.

In what follows, described will be the technical fields to which the present disclosure may be applied.

First, in the following, a physical channel and a signal transmission procedure will be described.

Figure 27:
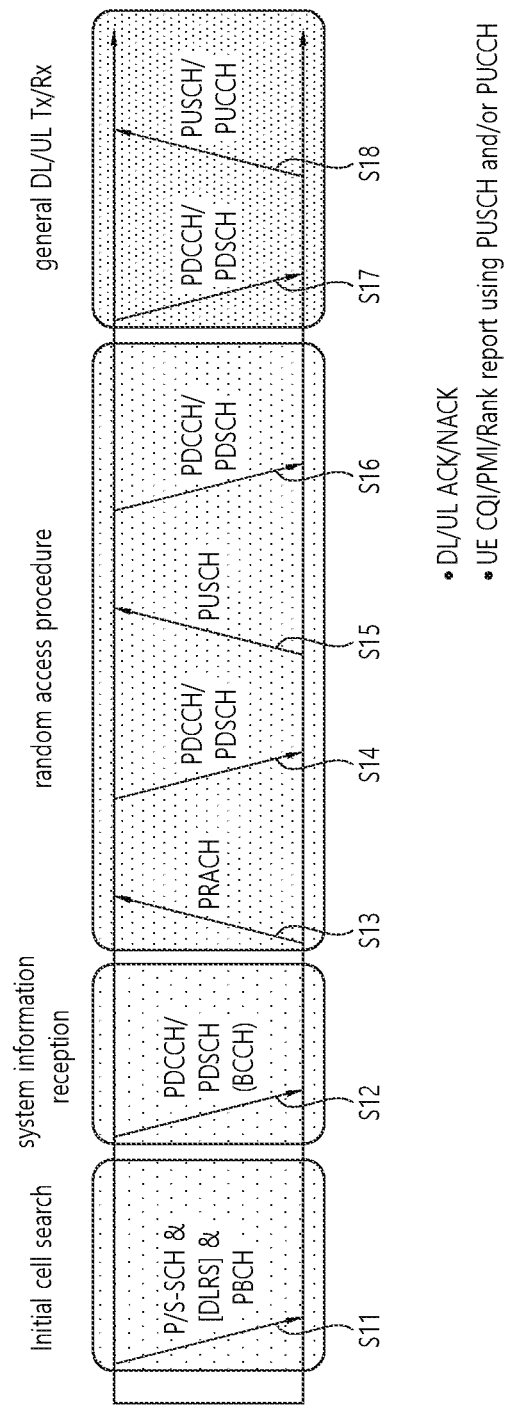
FIG. 27 illustrates physical channels used in the 3GPP system and a general signal transmission procedure.

FIG. 27 illustrates physical channels used in the 3GPP system and a general signal transmission procedure.

In a wireless communication system, a UE receives information from a base station through downlink (DL) transmission, and the UE transmits information to the base station trough uplink (UL) transmission. The information transmitted and received between the base station and the UE includes data and various types of control information, and depending on the type/use of information transmitted and received between the base station and the UE, various physical channels are employed.

The UE, which is powered on again from a state in which the power is off or which newly enters a cell, may perform an initial cell search operation such as synchronizing with the base station S11. To this end, the UE may receive a Primary Synchronization Channel (PSCH) and a Secondary Synchronization Channel (SSCH) from the base station to synchronize with the base station and obtain information such as cell identity (ID). Also, the UE may receive a Physical Broadcast Channel (PBCH) from the base station to obtain broadcast information within the cell. Also, the UE may receive a Downlink Reference Signal (DL RS) in the initial cell search phase to check the downlink channel status.

After completing the initial cell search operation, the UE may receive a Physical Downlink Control Channel (PDCCH) and a Physical Downlink Shared Channel (PDSCH) corresponding thereto to obtain more specific system information S12.

Afterwards, the UE may perform a random access procedure to complete access to the base station S13-S16. More specifically, the UE may transmit an preamble through a Physical Random Access Channel (PRACH) S13 and receive a Random Access Response (RAR) to the preamble through the PDSCH corresponding to the PDCCH S14. Next, the UE may transmit a Physical Uplink Shared Channel (PUSCH) using scheduling information within the RAR S15 and perform a contention resolution procedure on the PDCCH and the PDSCH corresponding thereto S16.

The UE which has performed the procedure above may perform PDCCH/PDSCH reception S17 and PUSCH/Physical Uplink Control Channel (PUCCH) transmission S18 as a general uplink/downlink signal transmission procedure. The control information transmitted to the base station by the UE is called Uplink Control Information (UCI). The UCI may include Hybrid Automatic Repeat and reQuest Acknowledgement/Negative-ACK (HARQ ACK/NACK), a Scheduling Request (SR), and Channel State Information (CSI). The CSI includes a Channel Quality Indicator (CQI), a Precoding Matrix Indicator (PMI), and a Rank Indication (RI). The UCI is usually transmitted through the PUCCH but may be transmitted through the PUSCH when both of control information and data have to be transmitted simultaneously. Also, according to the request/instruction from a network, the UE may transmit the UCI aperiodically through the PUSCH.

In what follows, cell search will be described.

Cell search is a procedure in which a UE obtains time and frequency synchronization to a cell and detects a physical layer cell ID of the cell. To perform the cell search, the UE receives a Primary Synchronization Signal (PSS) and a Secondary Synchronization Signal (SSS).

The cell search procedure for a UE may be summarized as shown in Table 7.

TABLE 7

| | Signal type | Operation |
|---|---|---|
| Step 1 | PSS | * Obtain SS/PBCH block (SSB) symbol timing<br>* Search cell ID group for cell ID (3 hypothesis) |
| Step 2 | SSS | * Detect cell ID group (336 hypothesis) |
| Step 3 | PBCH DMRS | * SSB index and half-frame index (detect slot and frame boundary) |
| Step 4 | PBCH | * Time information (80 ms, SFN, SSB index, HF)<br>* Configure RMSI CORESET/search space |
| Step 5 | PDCCH and PDSCH | * Cell access information |

Figure 28:
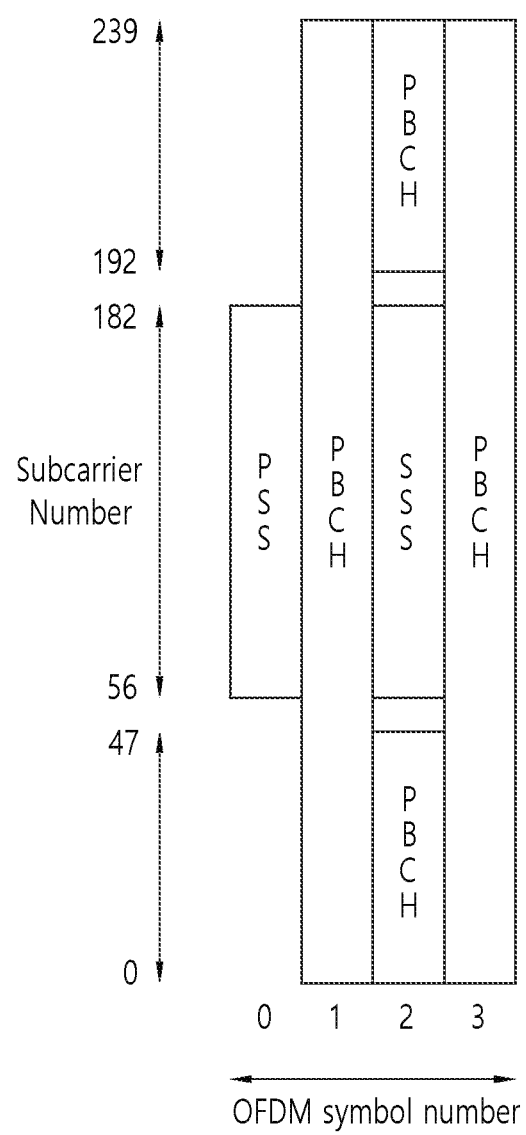
FIG. 28 illustrates a synchronization signal and PBCH (SS/PBCH) block.

FIG. 28 illustrates a synchronization signal and PBCH (SS/PBCH) block.

According to FIG. 28, an SS/PBCH block consists of a PSS and an SSS, each of which occupies one symbol and 127 subcarriers, and PBCHs occupying 3 OFDM symbols and 240 subcarriers, where one of the PBCHs has an unused region left for the SSS in the middle thereof. The periodicity of the SS/PBCH block may be configured by the network, and the time position at which the SS/PBCH block may be transmitted is determined by subcarrier spacing.

Polar coding is used for the PBCH. Unless the network configures a UE to assume a different subcarrier spacing, the UE may assume a band-specific subcarrier spacing for the SS/PBCH block.

PBCH symbols carry their frequency-multiplexed DMRS. QPSK modulation is used for the PBCH.

1008 unique physical layer cell IDs are given by Eq. 5 below.

$$N_{ID}^{cell} = 3N_{ID}^{(1)} + N_{ID}^{(2)} \quad [\text{Eq. 5}]$$

In Eq. 5, $N_{ID}^{(1)} \in \{0, 1, \ldots, 335\}$ and $N_{ID}^{(2)} \in \{0, 1, 2\}$.

Meanwhile, a PSS sequence $d_{PSS}(n)$ for PSS is defined by Eq. 6 as follows.

$$d_{PSS}(n)=1-2x(m) \quad \text{[Eq. 6]}$$

m=(n+43$N_{ID}^{(2)}$)mod 127
0≤n<127

In Eq. 6, (x(i+7)=(x(i+4)+x(i)) mod 2 and [x(6) x(5) x(4) x(3) x(2) x(1) x(0)]=[1 1 1 0 1 1 0].

The sequence may be mapped to the physical resources shown in FIG. 28.

Meanwhile, an SSS sequence $d_{SSS}(n)$ for SSS is defined by Eq. 7 as follows.

$$d_{SSS}(n) = [1 - 2x_0((n+m_0)\bmod 127)][1 - 2x_1((n+m_1)\bmod 127)] \quad \text{[Eq. 7]}$$

$$m_0 = 15\left\lfloor\frac{N_{ID}^{(1)}}{112}\right\rfloor + 5N_{ID}^{(2)}$$

$$m_1 = N_{ID}^{(1)}\bmod 112$$

$$0 \le n < 127$$

In Eq. 7, $x_0$(i+7)=($x_0$(i+4)+$x_0$(i))mod 2, $x_1$(i+7)=($x_1$(i+1)+$x_1$(i))mod 2, [$x_0$(6) $x_0$(5) $x_0$(4) $x_0$(3) $x_0$(2) $x_0$(1) $x_0$(0)]=[0 0 0 0 0 0 1], and [$x_1$(6) $x_1$(5) $x_1$(4) $x_1$(3) $x_1$(2) $x_1$(1) $x_1$(0)]=[0 0 0 0 0 0 1].

The sequence above may be mapped to the physical resources shown in FIG. 28.

For a half frame having SS/PBCH blocks, first symbol indexes for candidate SS/PBCH blocks may be determined by subcarrier spacing of the SS/PBCH blocks described later.

Case A—subcarrier spacing 15 kHz: The first symbols of candidate SS/PBCH blocks have an index of {2, 8}+14*n. For subcarrier frequencies below or equal to 3 GHz, n=0, 1. For subcarrier frequencies above 3 GHz and below or equal to 6 GHz, n=0, 1, 2, 3.

Case B—subcarrier spacing 30 kHz: The first symbols of candidate SS/PBCH blocks have an index of {4, 8, 16, 20}+28*n. For subcarrier frequencies below or equal to 3 GHz, n=0. For subcarrier frequencies above 3 GHz and below or equal to 6 GHz, n=0, 1.

Case C—subcarrier spacing 30 kHz: The first symbols of candidate SS/PBCH blocks have an index of {2, 8}+14*n. For subcarrier frequencies below or equal to 3 GHz, n=0, 1. For subcarrier frequencies above 3 GHz and below or equal to 6 GHz, n=0, 1, 2, 3.

Case D—subcarrier spacing 120 kHz: The first symbols of candidate SS/PBCH blocks have an index of {4, 8, 16, 20}+28*n. For subcarrier frequencies above 6 GHz, n=0, 1, 2, 3, 5, 6, 7, 8, 10, 11, 12, 13, 15, 16, 17, 18.

Case E—subcarrier spacing 240 kHz: The first symbols of candidate SS/PBCH blocks have an index of {8, 12, 16, 20, 32, 36, 40, 44}+56*n. For subcarrier frequencies above 6 GHz, n=0, 1, 2, 3, 5, 6, 7, 8.

The candidate SS/PBCH blocks within the half-block may be indexed on the time axis in an ascending order starting from 0 to L−1. From one-to-one mapping to the index of a DM-RS sequence transmitted within the PBCH, the UE has to determine 2 LSBs of the SS/PBCH block index for each half-frame when L=4 and 3 LSBs when L>4. When L=64, the UE has to determine 3 MSBs of the SS/PBCH block index for each half-frame according to the PBCH payload bits $\bar{a}_{\bar{A}+5}$, $\bar{a}_{\bar{A}+6}$, and $\bar{a}_{\bar{A}+7}$.

The indexes of SS/PBCH blocks in which the UE is unable to receive other signals or channels within REs overlapping the REs corresponding to the SS/PBCH blocks may be configured for the UE by the upper layer parameter 'SSB-transmitted-SIB1'. Also, the indexes of SS/PBCH blocks for each serving cell, in which the UE is unable to receive other signals or channels within REs overlapping the REs corresponding to the SS/PBCH blocks may be configured by the upper layer parameter 'SSB-transmitted'. Configuration by 'SSB-transmitted' may have a higher priority than configuration by 'SSB-transmitted-SIB1'. The UE may be configured with a periodicity of the half-frame for reception of SS/PBCH blocks for each serving cell by the upper layer parameter 'SSB-periodicityServingCell'. If the UE is not configured with a periodicity of the half-frame for reception of SS/PBCH blocks, the UE may assume a periodicity of the half-frame. The UE may assume that the periodicity is the same for all of SS/PBCH blocks within a serving cell.

Figure 29:
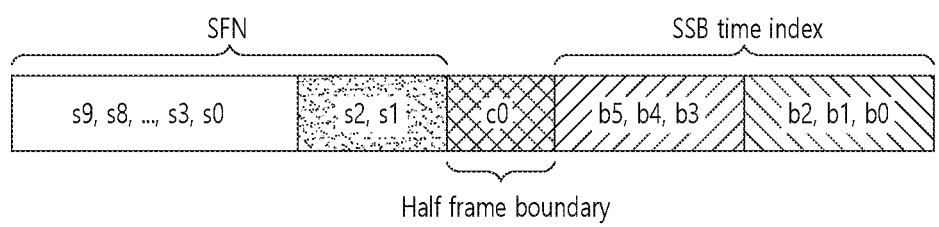
FIG. 29 illustrates a method for obtaining timing information by a UE.

FIG. 29 illustrates a method for obtaining timing information by a UE.

First, the UE may obtain 6-bit SFN information through MasterInformationBlock (MIB) received within PBCH. Also, the UE may obtain 4-bit SFN information within a PBCH transport block.

Secondly, the UE may obtain a 1-bit half-frame indicator as part of a PBCH payload. Below 3 GHz, the half-frame indicator may be signaled implicitly as part of a PBCH DMRS when $L_{max}$=4.

Lastly, the UE may obtain an SS/PBCH block index by the DMRS sequence and the PBCH payload. In other words, the UE may obtain 3-bit LSBs of the SS block index by the DMRS sequence during a period of 5 ms. Also, (above 6 GHz) 3-bit MSBs of timing information are carried explicitly within the PBCH payload.

In the initial cell selection step, the UE may assume that a half-frame having SS/PBCH blocks is generated with a periodicity of 2 frames. If an SS/PBCH block is detected, and $k_{SSB}$≤23 for FR1 and $k_{SSB}$≤11 for FR2, the UE determines that there exists a set of control resources for Type0-PDCCH common search space. If $k_{SSB}$>23 for FR1 and $k_{SSB}$>11 for FR2, the UE determines that a set of control resources for the Type0-PDCCH common search space does not exist.

For a serving cell to which no SS/PBCH block is transmitted, the UE obtains time and frequency synchronization to the serving cell based on the reception of SS/PBCH blocks on the PCell or PSCell of a cell group for the serving cell.

In what follows, acquisition of System Information (SI) is described.

The System Information (SI) is divided into MasterInformationBlock (MIB) and a plurality of SystemInformationBlocks (SIBs), where The MIB is always transmitted on the BCH with a periodicity of 80 ms and repetitions made within 80 ms, and it includes parameters needed to acquire SystemInformationBlockType1 (SIB1) from the cell;

SIB1 is transmitted on the DL-SCH with a periodicity and repetitions. SIB1 includes information about availability and scheduling (for example, periodicity and SI-window size) of other SIBs. Also, SIB1 indicates whether they (namely, other SIBs) are provided via periodic broadcast basis or only on-demand basis. If other SIBs are provided on-demand, SIB1 includes information required for the UE to perform an SI request;

SIBs other than the SIB1 are carried by SystemInformation (SI) messages transmitted on the DL-SCH. Each SI message is transmitted within periodically occurring time domain windows (which are referred to as SI-windows);

For PSCell and SCells, RAN provides the required SI by dedicated signaling. Nevertheless, the UE has to acquire the MIB of the PSCell to get SFN timing (which may be different from MCG) of the SCG. When relevant SI for SCell is changed, RAN releases and adds the concerned SCell. For PSCell, SI may only be changed only through reconfiguration with Sync.

Figure 30:
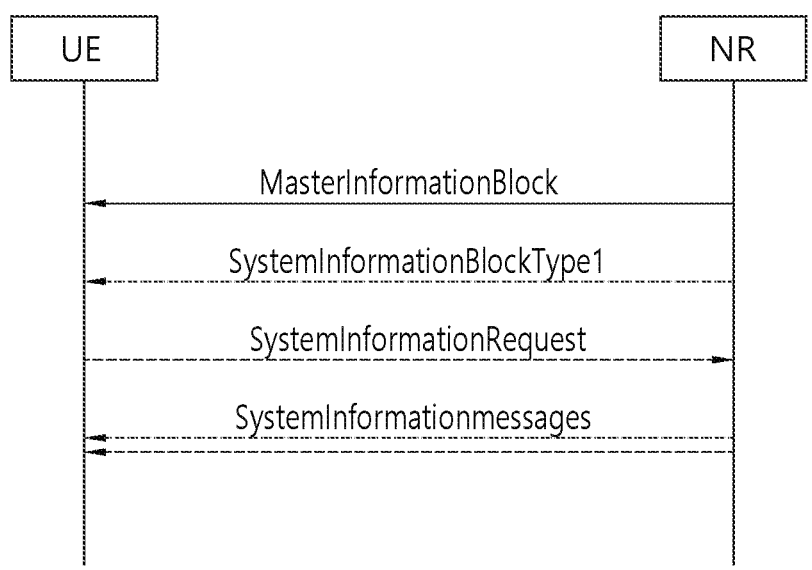
FIG. 30 illustrates one example of a system information acquisition procedure of a UE.

FIG. 30 illustrates one example of a system information acquisition procedure of a UE.

According to FIG. 30, the UE may receive MIB from the network and then may receive SIB1. Afterwards, the UE may transmit a system information request to the network and receive a SystemInformation message from the network in response to the request.

The UE may apply the system information acquisition procedure to acquire Access Stratum (AS) and Non-Access Stratum (NAS) information.

The UE in RRC_IDLE and RRC_INACTIVE state has to ensure having a valid version of (at least) the MIB, SIB1, and SystemInformationBlockTypeX (depending on the support of a concerned RAT for UE controlled mobility).

The UE in the RRC_CONNECTED state has to ensure having a valid version of the MIB, SIB1, and SystemInformationBlockTypeX (depending on the mobility support for a concerned RAT).

The UE has to store relevant SI acquired from a currently camped/serving cell. Aversion of the SI that the UE has acquired and stored remains valid only for a certain time period. The UE may use such a stored version of the SI, for example, after cell re-selection, upon return from out of coverage or after SI change indication.

In what follows, Random Access (RA) will be described.

A random access procedure for a UE may be summarized as shown in Table 8.

TABLE 8

| | Signal type | Operation/Acquired information |
|---|---|---|
| Step 1 | PRACH preamble of uplink | * Acquisition of initial beam<br>* Random election of RA-preamble ID |
| Step 2 | Random access response on DL-SCH | * Timing array information<br>* RA-preamble ID<br>* Initial uplink grant, temporary C-RNTI |
| Step 3 | Uplink transmission on UL-SCH | * RRC connection request<br>* UE identity |
| Step 4 | Contention resolution of downlink | * C-RNTI on PDCCH for initial access<br>* C-RNTI on PDCCH for UE in the RRC_CONNECTED state |

Figure 31:
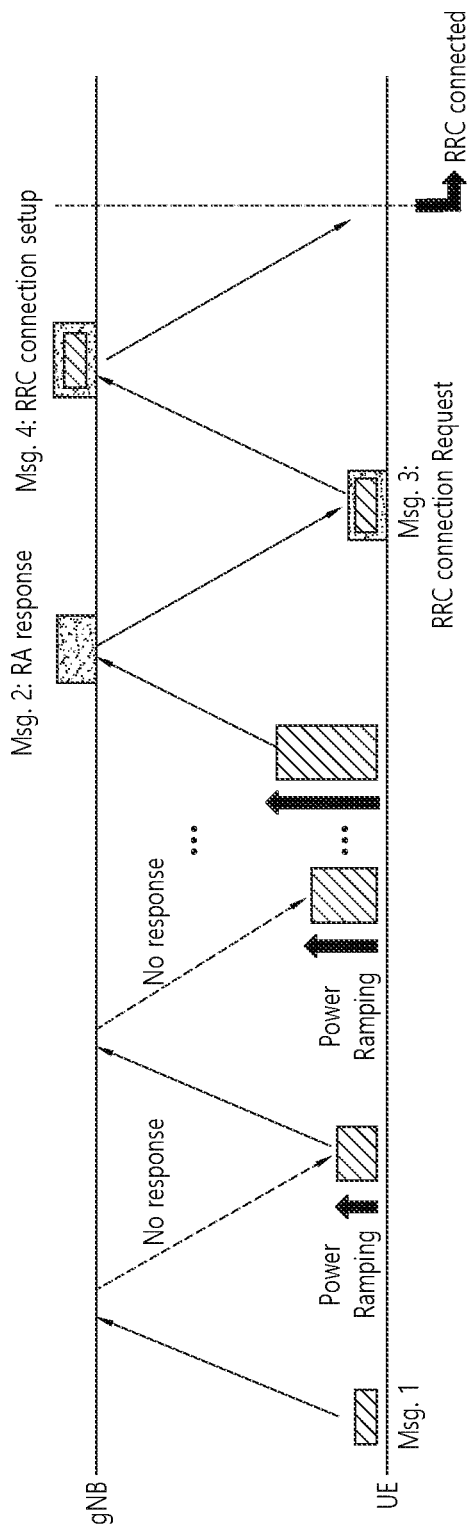
FIG. 31 illustrates a random access procedure.

FIG. 31 illustrates a random access procedure. Referring to FIG. 31, first, a UE may transmit a PRACH preamble via uplink transmission as message 1 (Msg 1) of the random access procedure.

A random access preamble sequence having two different lengths may be supported. A long sequence of length 839 is applied to the subcarrier spacing of 1.25 kHz and 5 kHz, and a short sequence of length 139 is applied to the subcarrier spacing of 15, 30, 60, and 120 kHz. A long sequence supports an unrestricted set and a restricted set of type A and type B while a short sequence may support only the unrestricted set.

A plurality of RACH preambles may be defined by one or more RACH OFDM symbols, different Cyclic Prefix (CP), and guard time. Configuration of PRACH preamble to be used may be provided to the UE as system information.

When there is no response to Msg 1, the UE may re-transmit a PRACH preamble power-ramped within a specified number of times. The UE calculates PRACH transmission power for retransmission of the preamble based on the most recent estimated path loss and a power ramping counter. If the UE performs beam switching, the power ramping counter does not change.

Figure 32:
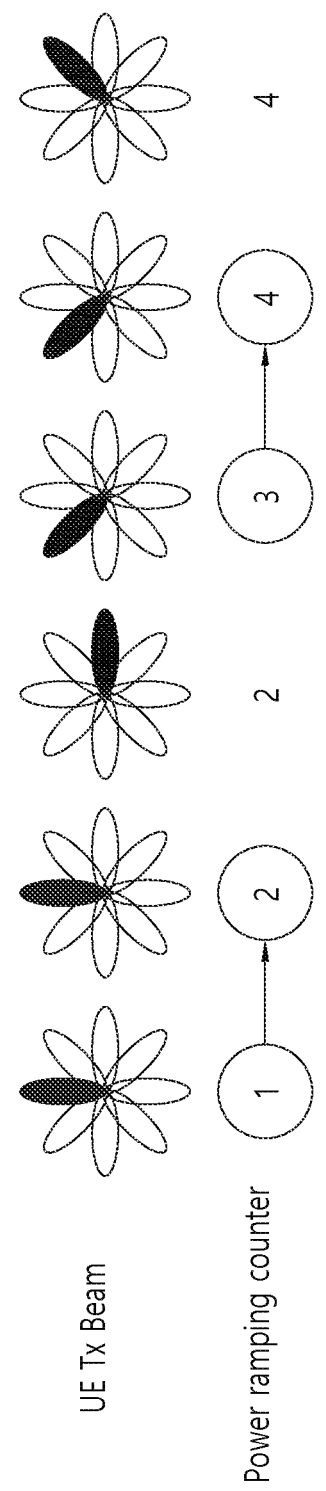
FIG. 32 illustrates a power ramping counter.

FIG. 32 illustrates a power ramping counter.

The UE may perform power ramping for retransmission of a random access preamble based on the power ramping counter. As described above, the power ramping counter does not change when the UE performs beam switching at the time of PRACH retransmission.

According to FIG. 32, when the UE retransmits a random access preamble for the same beam, such as when the power ramping counter increases from 1 to 2 and 3 to 4, the UE increases the power ramping counter by 1. However, when the beam is changed, the power ramping counter may not change at the time of PRACH retransmission.

Figure 33:
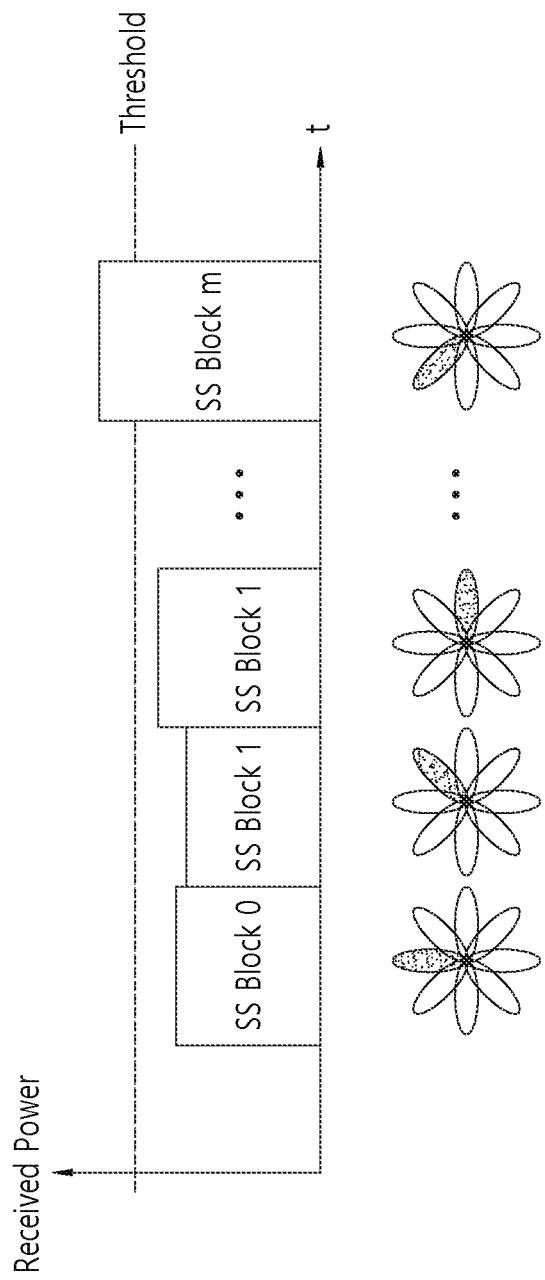
FIG. 33 illustrates a threshold of an SS block in the RACH resource relationship.

FIG. 33 illustrates a threshold of an SS block in the RACH resource relationship.

The system information may inform the UE of the relationship between SS blocks and RACH resources. The threshold of an SS block in the RACH resource relationship may be based on the RSRP and network configuration. Transmission and retransmission of the RACH preamble may be based on the SS block satisfying the threshold. Therefore, in the example of FIG. 33, since SS block m exceeds the threshold of receive power, the RACH preamble is transmitted or retransmitted based on the SS block m.

Afterwards, when the UE receives a random access response on the DL-SCH, the DL-SCH may provide timing array information, an RA-preamble ID, an initial uplink grant, and temporary C-RNTI.

Based on the information, the UE may perform uplink transmission on the UL-SCH as message 3 (Msg3) of the random access procedure. Msg3 may include an RRC connection request and a UE identity.

As a response to the uplink transmission, the network may transmit Msg4 that may be treated as a contention resolution message via downlink transmission. By receiving Msg4, the UE may enter the RRC connection state.

In what follows, the random access procedure will be described in more detail.

Before starting a physical random access procedure, layer 1 has to receive a set of SS/PBCH block indexes from the upper layer and provide a set of corresponding RSRP measurements to the upper layer.

Before starting the physical random access procedure, layer 1 has to receive the following information from the upper layer:

Configuration of PRACH transmit parameter (PRACH preamble format, time resources, and frequency resources for PRACH transmission) and Parameter for determination of a root sequence and a cyclic shift (index of a logical root sequence table, cyclic shift (NCS), and set type (unrestricted set, restricted set A or restricted set B)) within the PRACH preamble sequence set for the parameter.

From the physical layer perspective, the L1 random access procedure includes transmission of random access preamble (Msg1) in a PRACH, Random Access Response (RAR) message (Msg2) with a PDCCH/PDSCH, and when applicable, Msg3 PUSCH; and transmission of PDSCH for contention resolution.

If the random access procedure is started by a PDCCH order to the UE, random access preamble transmission may have a subcarrier spacing which is the same as the subcarrier spacing of random access preamble transmission initiated by the upper layer.

When the UE is configured with two uplink subcarriers for a serving cell and the UE detects the PDCCH order, the UE may use a UL/SUL indicator field value from the detected PDCCH order to determine the uplink subcarrier for the corresponding random access preamble transmission.

In what follows, the random access preamble will be described in more detail.

In the random access preamble transmission step, the physical random access procedure may be triggered by an upper layer, a PDCCH order, or a request for PRACH transmission. Configuration of PRACH transmission by the upper layer may include the following:

Configuration about PRACH transmission; and

Preamble index, preamble subcarrier spacing, $P_{PRACH,target}$, corresponding RA-RNTI, and PRACH resource.

The preamble may be transmitted according to a selected PRACH format having transmission power $P_{PRACH,b,f,c(i)}$ on the indicated PRACH resource.

A plurality of SS/PBCH blocks related to one PRACH occasion may be provided to the UE by the upper layer parameter SSB-perRACH-Occasion. If SSB-perRACH-Occasion is smaller than 1, one SS/PBCH block may be mapped to contiguous PRACH occasions of 1/SSB-per-RACH-Occasion. A plurality of preambles are provided to the UE for each SS/PBCH by the upper layer parameter cb-preamblePerSSB, and the UE may determine a multiple of SSB-perRACH-Occasion and the value of cb-preamblePerSSB as the total number of preambles for each PRACH and SSB.

The SS/PBCH block index may be mapped to the PRACH occasions according to the following order:

First, an ascending order of a preamble index within a single PRACH occasion,

Second, an ascending order of frequency resource index with respect to frequency multiplexed PRACH occasions, Third, an ascending order of time resource index with respect to time multiplexed PRACH occasions within the PRACH slot, and Fourth, an ascending order of index with respect to PRACH slots.

The period that starts from frame 0, at which SS/PBCH blocks are mapped to PRACH occasions, is the minimum value of the PRACH configuration periods {1, 2, 4}, which is larger than or equal to $[N_{Tx}^{SSB}/N_{PRACHperiod}^{SSB}]$; here, the UE obtains $N_{Tx}^{SSB}$ by the upper layer parameter SSB-transmitted-SIB1, and $N_{PRACHperiod}^{SSB}$ represents the number of SS/PBCH blocks that may be mapped to one PRACH configuration period.

If the random access procedure is started by the PDCCH order and is requested by the upper layer, the UE has to transmit the PRACH within the first available PRACH occasion, where the time difference between the last symbol at which the PDCCH order is received and the first symbol of PRACH transmission is larger than or equal to $N_{T,2}+\Delta_{BWPSwitching}+\Delta_{Delay}$ msec. Here, $N_{T,2}$ represents duration of $N_2$ symbols corresponding to PUSCH preparation time with respect to PUSCH processing capability 1, $\Delta_{BWPSwitching}$ is a predefined value, and $\Delta_{Delay}>0$.

In what follows, the random access response will be described in more detail.

In response to the PRACH transmission, the UE may attempt to detect a PDCCH having the corresponding RA-RNTI during a window controlled by the upper layer. The window may start from the first symbol of the earliest control resource set configured for the UE with respect to the Type 1-PDCCH common search space comprising at least $[(\Delta \cdot N_{slot}^{subframe,\mu} \cdot N_{symb}^{slot})/T_{sf}]$ symbols after the last symbol of preamble sequence transmission. The length of the window as expressed in terms of the number of slots may be provided by the upper layer parameter rar-WindowLength based on the subcarrier spacing with respect to the Type0-PDCCH common search space.

If the UE detects a PDCCH having the corresponding RA-RNTI and the corresponding PDSCH including a DL-SCH transmission block within the window, the UE may transmit the transmission block to the upper layer. The upper layer may parse the transmission block with respect to the Random Access Preamble Identity (RAPID) related to the PRACH transmission. If the upper layer identifies RAPID within an RAR message(s) of the DL-SCH transmission block, the upper layer may indicate an uplink grant to the physical layer. This may be referred to as a Random Access Response (RAR) uplink grant in the physical layer. If the upper layer fails to identify the RAPID related to the PRACH transmission, the upper layer may instruct the physical layer to transmit the PRACH. The minimum time difference between the last symbol at which the PDSCH is received and the first symbol of the PRACH transmission is the same as $N_{T,1}+\Delta_{new}+0.5$, where $N_{T,1}$ represents the duration of $N_{T,1}$ symbols corresponding to the PDSCH reception time with respect to the PDSCH processing capability 1 when an additional PDSCH DM-RS is configured, and $\Delta_{new} \geq 0$.

For a detected SS/PBCH block or a received CSI-RS, the UE may have to receive the corresponding PDSCH including a PDCCH having the corresponding RA-RNTI and a DL-SCH transmission block having the same DM-RS antenna port Quasi Co-Location (QCL) characteristics. If the UE attempts to detect a PDCCH having the corresponding RA-RNTI as a response to PRACH transmission initiated by the PDCCH order, the UE may assume that the PDCCH and PDCCH order have the same DM-RS antenna port QCL characteristics.

The RAR uplink grant schedules PUSCH transmission of the UE (Msg3 PUSCH). Configuration of the RAR uplink grant, which starts from the MSG and ends at the LSB, may be given as shown in Table 9. Table 9 shows the size of a random access response grant configuration field.

TABLE 9

| RAR grant field | Number of bits |
| --- | --- |
| Frequency hopping flag | 1 |
| Msg3 PUSCH frequency resource allocation | 14 |
| Msg3 PUSCH time resource allocation | 4 |
| MCS | 4 |
| TPC command for Msg3 PUSCH | 3 |
| CSI request | 1 |
| Reserved bits | 3 |

Msg3 PUSCH frequency resource allocation is related to uplink resource allocation type 1. In the case of frequency hopping, based on the indication of the frequency hopping flag field, the first or first two bits $N_{UL,hop}$ of the Msg3 PUSCH frequency resource allocation field may be used as hopping information bits. MCS may be determined by the first 16 indexes of the MCS index table applicable to the PUSCH.

The TPC command $\delta_{msg2,b,f,c}$ may be used for power configuration of the Msg3 PUSCH and may be interpreted according to Table 10 below.

TABLE 10

| TPC Command | Value [dB] |
|---|---|
| 0 | −6 |
| 1 | −4 |
| 2 | 2 |
| 3 | 0 |
| 4 | 2 |
| 5 | 4 |
| 6 | 6 |
| 7 | 8 |

In a non-contention based random access procedure, the CSI request field is interpreted to determine whether a non-periodic CSI report is included in the corresponding PUSCH transmission. In the contention-based random access procedure, the CSI request field may be reserved. As long as the UE does not configure the subcarrier spacing, the UE receives a subsequent PDSCH by using the subcarrier spacing that is the same as PDSCH reception that provides an RAR message.

If the UE does not detect a PDCCH having the corresponding RA-RNTI within a window and the corresponding DL-SCH transmission block, the UE performs a random access response reception failure procedure.

In what follows, the Msg3 PUSCH transmission will be described in more detail.

With respect to Msg3 PUSCH transmission, the upper layer parameter msg3-tp indicates whether the UE has to apply a transform precoding for the Msg3 PUSCH transmission. If the UE applies a transform precoding for Msg3 PUSCH transmission employing frequency hopping, the frequency offset for the second hop may be given as shown in Table 11. Table 11 illustrates a frequency offset of the second hop with respect to the Msg3 PUSCH transmission employing frequency hopping.

TABLE 11

| Number of PRBs in initial active UL BWP | Value of $N_{UL,\,hop}$ Hopping Bits | Frequency offset for 2nd hop |
|---|---|---|
| $N_{BWP}^{size} < 50$ | 0 | $N_{BWP}^{size}/2$ |
| | 1 | $N_{BWP}^{size}/4$ |
| $N_{BWP}^{size} \geq 50$ | 00 | $N_{BWP}^{size}/2$ |
| | 01 | $N_{BWP}^{size}/4$ |
| | 10 | $-N_{BWP}^{size}/4$ |
| | 11 | Reserved |

The subcarrier spacing for Msg3 PUSCH transmission may be provided by the upper layer parameter msg3-scs. The UE has to transmit the PRACH and Msg3 PUSCH on the same uplink carrier of the same serving cell. The uplink BWP for the Msg3 PUSCH transmission may be indicated by SystemInformationBlockType1. When the PDSCH and PUSCH have the same subcarrier spacing, the minimum time difference between the last symbol at which the PDSCH carrying the RAR is received and the first symbol of the corresponding Msg3 PUSCH transmission scheduled by the RAR within the PDSCH with respect to the UE may be the same as $N_{T,1}+N_{T,2}+N_{TA,max}+0.5$ msec. Here, $N_{T,1}$ represents the duration of $N_1$ symbols corresponding to the PDSCH reception with respect to the PDSCH processing capability 1 when an additional PDSCH DM-RS is configured, $N_{T,2}$ represents the duration of $N_2$ symbols corresponding to the PUSCH preparation time with respect to the PUSCH processing capability 1, and $N_{TA,max}$ represents the maximum timing adjustment value that may be provided by the TA command field within the RAR.

In what follows, contention resolution will be described in more detail.

If the UE fails to receive C-RNTI, the UE attempts to detect a PDCCH having the corresponding TC-RNTI that schedules a PDSCH including UE contention resolution identity in response to the Msg3 PUSCH transmission. In response to the reception of the PDSCH having the UE contention resolution identity, the UE transmits HARQ-ACK information within the PUCCH. The minimum time difference between the last symbol at which the PDSCH is received and the first symbol of the corresponding HARQ-ACK transmission is $N_{T,1}+0.5$ msec. $N_{T,1}$ represents the duration of $N_1$ symbols corresponding to the PDSCH reception with respect to the PDSCH processing capability 1 when an additional PDSCH DM-RS is configured.

In what follows, a channel coding scheme will be described.

A channel coding scheme according to one embodiment of the present disclosure may include a Low Density Parity Check (LDPC) coding scheme mostly for data and a polar coding scheme for control information.

The network/UE may perform the LDPC coding for a PDSCH/PUSCH having a support for two base graphs (BGs). Here, BG1 may be related to mother code rate 1/3, and BG2 may be related to mother code rate 1/5.

For coding of control information, various coding schemes such as repetition coding, simplex coding, and Reed-Muller coding may be supported. The polar coding scheme may be applied to the case where the control information has a length longer than 11 bits. For downlink transmission, the mother code size may be 512, and the mother code size for uplink transmission may be 1024. The coding schemes for uplink control information may be summarized as shown in the table below.

TABLE 12

| Uplink Control Information size including CRC, if present | Channel code |
|---|---|
| 1 | Repetition code |
| 2 | Simplex code |
| 3-11 | Reed Muller code |
| >11 | Polar code |

The polar coding scheme may be used for a PBCH. This coding scheme may be the same as used for the case of a PDCCH. In what follows, LDPC coding structure will be described.

An LDPC code is a (n, k) linear block code defined by the null-space of a (n−k)×n sparse parity check matrix H.

The LDPC code that may be applied to one embodiment of the present disclosure may be expressed as follows.

$$Hx^T = 0 \qquad [\text{Eq. 8}]$$

$$Hx^T = \begin{bmatrix} 1 & 1 & 1 & 0 & 0 \\ 1 & 0 & 0 & 1 & 1 \\ 1 & 1 & 0 & 0 & 0 \\ 0 & 1 & 1 & 1 & 0 \end{bmatrix} \begin{bmatrix} x1 \\ x2 \\ x3 \\ x4 \\ x5 \end{bmatrix} = 0$$

Figure 34:
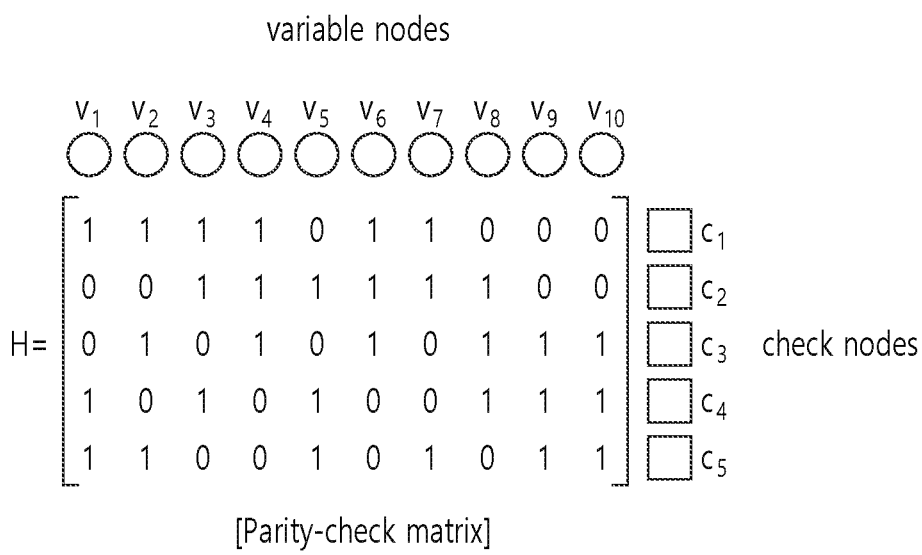
FIG. 34 illustrates a parity check matrix expressed by a protograph.
Figure 34:
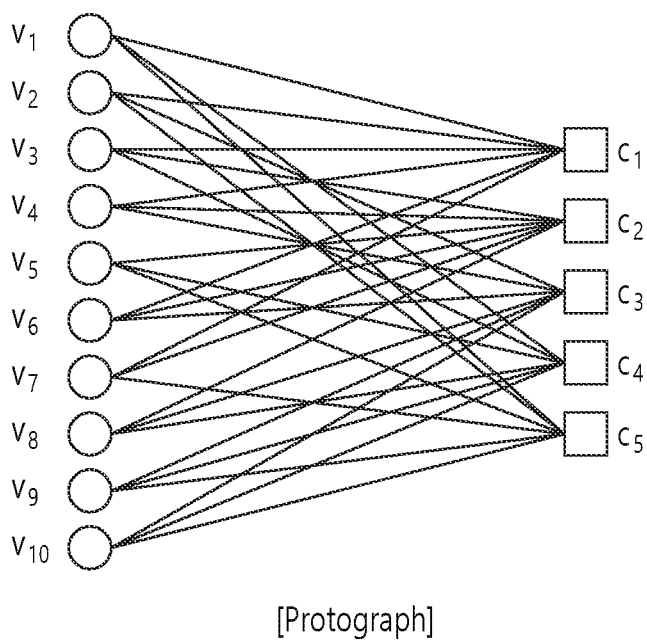

FIG. 34 illustrates a parity check matrix expressed by a protograph.

More specifically, FIG. 34 shows a parity check matrix about the association relationship between variable nodes and check nodes, which is expressed by a protograph.

As one example, according to FIG. 34, variable nodes having an association relationship with the check node $c_1$ are $v_1, v_2, v_3, v_4, v_6, v_7$, and check nodes having an association relationship with the variable node $v_8$ are $c_2, c_3, c_4$.

Figure 35:
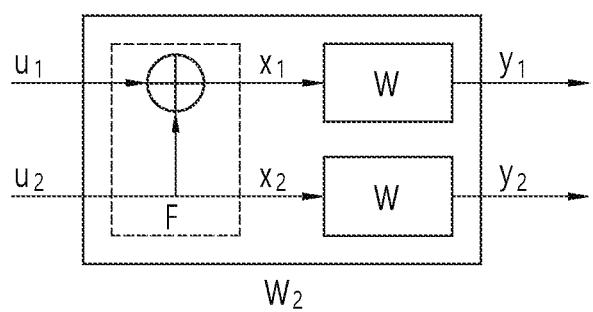
FIG. 35 illustrates one example of an encoder structure for the polar code.

FIG. 35 illustrates one example of an encoder structure for the polar code. More specifically, FIG. 35(a) shows one example of a base module of the polar code, and FIG. 35(b) shows a base matrix.

The polar code is known as the code capable of obtaining channel capacity in the Binary-input Discrete Memoryless Channel (B-DMC). In other words, if the size N of a code block increases indefinitely, channel capacity may be obtained.

Figure 36:
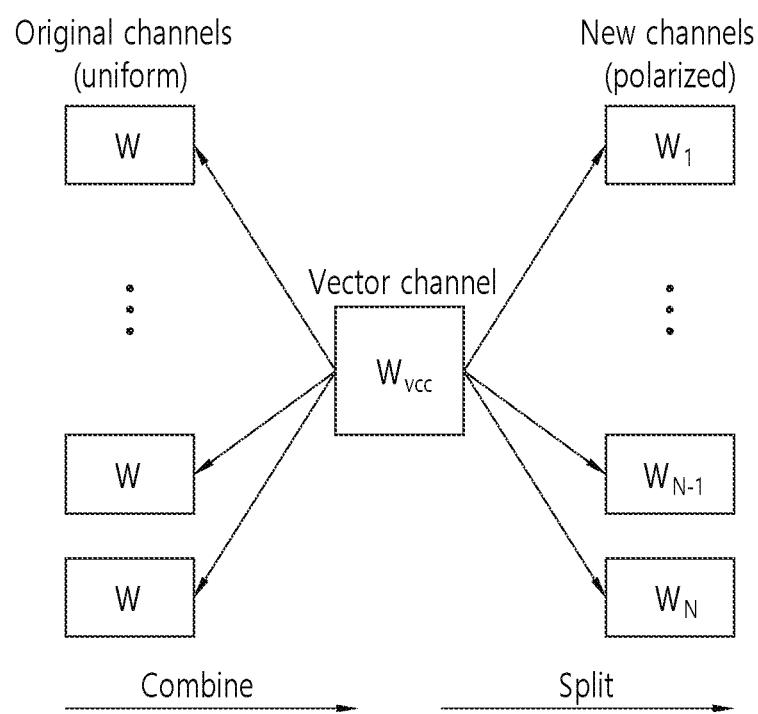
FIG. 36 illustrates one example of an encoder operation based on the polar code.

FIG. 36 illustrates one example of an encoder operation based on the polar code.

Referring to FIG. 36, the encoder based on the polar code may perform channel combining and channel division. More specifically, the encoder based on the polar code may combine existing channels into one vector channel or divide one vector channel into a plurality of new channels. As one example, the existing channels before being combined into one vector channel may be uniform, and a plurality of new channels split from one vector channel may be polarized.

In what follows, Discontinuous Reception (DRX) will be described.

Discontinuous Reception (DRX) refers to an operation mode in which a UE reduces battery consumption to receive a downlink channel in a discontinuous manner. In other words, a UE configured for DRX may reduce power consumption by receiving a DL signal discontinuously.

A DRX operation is performed within a DRX cycle representing a time interval in which On Duration is repeated periodically. ADRX cycle includes On Duration and Sleep Duration (or an occasion of DRX). On Duration refers to a time interval in which a UE monitors a PDCCH to receive the PDCCH.

DRX may be performed in the Radio Resource Control (RRC)_IDLE state (or mode), RRC_INACTIVE state (or mode) or RRC_CONNECTED state (or mode). In the RRC_IDLE state and RRC_INACTIVE state, DRX may be used to receive a paging signal discontinuously.

RRC_IDLE state: The state in which a radio connection (RRC connection) is not established between a base station and a UE.

RRC_INACTIVE state: The state in which, although a radio connection (RRC connection) has been established between the base station and the UE, the radio connection is deactivated.

RRC_CONNECTED state: The state in which a radio connection (RRC connection) is established between the base station and the UE.

DRX may be basically divided into idle mode DRX, Connected DRX (C-DRX), and extended DRX.

DRX applied in the IDLE state may be referred to as idle mode DRX, and DRX applied in the CONNECTED state may be referred to as Connected mode DRX (C-DRX).

Extended/Enhanced DRX (eDRX) is a mechanism that may extend the cycle of the idle mode DRX and C-DRX and may be mostly used for (passive) IoT applications. In the idle mode DRX, whether to allow eDRX may be configured based on system information (for example, SIB1). SIB1 may include an eDRX-allowed parameter. The eDRX-allowed parameter represents whether extended DRX is allowed in the idle mode.

In what follows, idle mode DRX is described.

In the idle mode, the UE may use DRX to reduce power consumption. One paging occasion (PO) is a subframe in which Paging-Radio Network Temporary Identifier (P-RNTI) may be transmitted on a Physical Downlink Control Channel (PDCCH) or an MTC PDCCH (MPDCCH) or a Narrowband PDCCH (NPDCCH) (addressing a paging message for NB-IoT).

In the P-RNTI transmitted on the MPDCCH, PO may represent a starting subframe of MPDCCH repetitions. In the case of P-RNTI transmitted on the NPDCCH, when a subframe determined by PO is not a valid NB-IoT downlink subframe, PO may represent a starting subframe of NPDCCH repetitions. Therefore, the first valid NB-IoT downlink subframe after PO is the starting subframe of NPDCCH repetitions.

One Paging Frame (PF) is one radio frame, which may contain one or a plurality of POs. When DRX is used, the UE only needs to monitor one PO per DRX cycle. One Paging Narrowband (PNB) is one narrowband, on which the UE performs reception of a paging message. PF, PO, and PNB are determined based on the DRX parameters provided in System Information.

Figure 37:
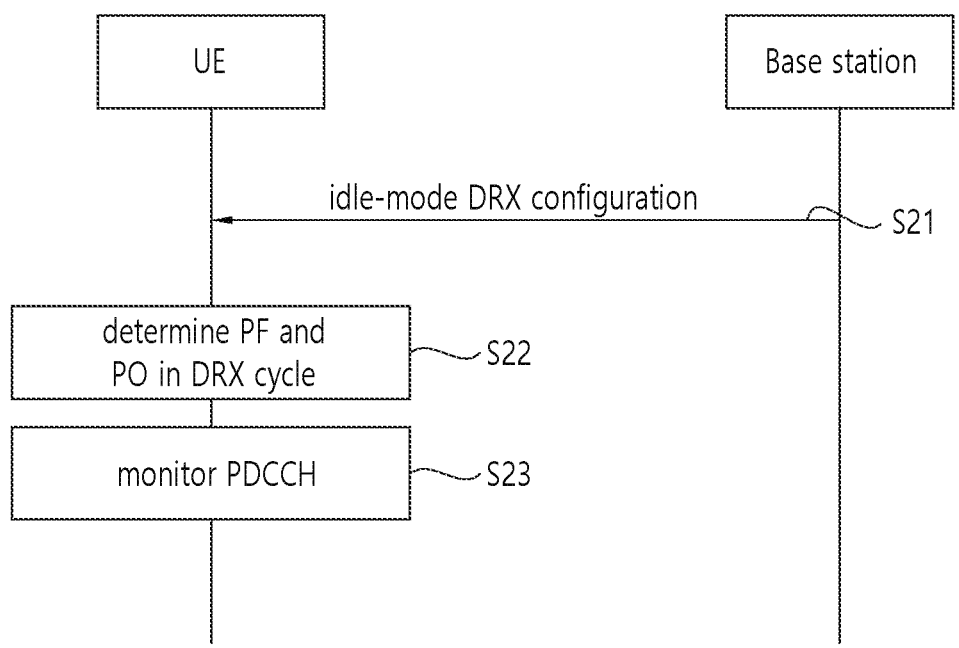
FIG. 37 is a flow diagram illustrating one example in which an idle mode DRX operation is performed.

FIG. 37 is a flow diagram illustrating one example in which an idle mode DRX operation is performed.

According to FIG. 37, the UE may receive idle mode DRX configuration information from a base station through upper layer signaling (for example, system information) S11.

The UE may determine the Paging Frame (PF) and Paging Occasion (PO) to monitor a PDCCH in a paging DRX cycle based on the idle mode DRX configuration information S12. In this case, the DRX cycle may include On Duration and Sleep Duration (or an occasion of DRX).

The UE may monitor the PDCCH at the PO of a determined PF S13. In this case, for example, the UE monitors only one subframe (PO) per paging DRX cycle. Also, if the UE receives a PDCCH scrambled by P-RNTI during the On Duration (namely, when paging is detected), the UE may transition to the connected mode and transmit and receive data to and from the base station.

Figure 38:
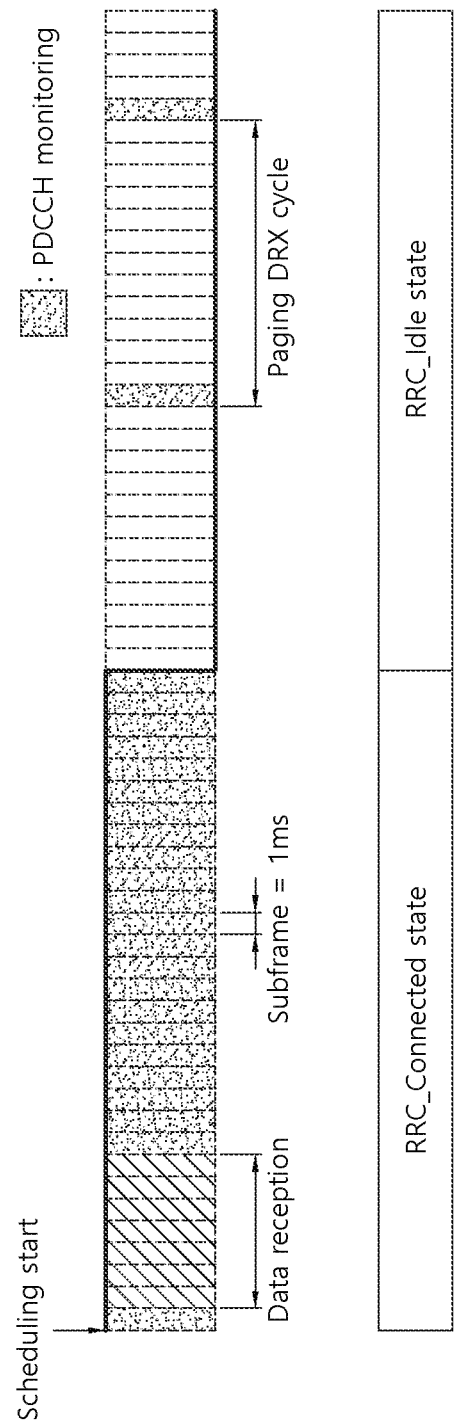
FIG. 38 illustrates one example of an idle mode DRX operation.

FIG. 38 illustrates one example of an idle mode DRX operation.

According to FIG. 38, when there exists traffic directed toward the UE in the RRC_IDLE state (hereinafter, referred to as 'idle state'), paging is generated with respect to the corresponding UE. The UE may wake up periodically (namely, every (paging) DRX periods) to monitor a PDCCH. In the absence of paging, the UE may transition to the connected state, receive data, and enter the sleep mode again if there exists no data.

In what follows, Connected mode DRX (C-DRX) is described.

C-DRX refers to DRX applied in the RRC connected state. The DRX cycle for C-DRX may be composed of a short DRX cycle and/or a long DRX cycle. Here, a short DRX cycle may be selected optionally.

When C-DRX is configured, the UE may perform PDCCH monitoring with respect to On Duration. If a PDCCH is successfully detected during PDCCH monitoring, the UE operates (or runs) an inactive timer and maintain the timer in the awake state. On the other hand, if a PDCCH is not detected successfully during PDCCH monitoring, the UE may enter the sleep state after the On Duration expires.

When C-DRX is configured, a PDCCH reception occasion (for example, a slot having PDCCH search space) may be configured to be discontinuous based on the C-DRX configuration. On the other hand, if C-DRX is not configured, the PDCCH reception occasion (for example, a slot having PDCCH search space) may be configured to be continuous according to the present disclosure.

Meanwhile, PDCCH monitoring may be limited to a time interval configured in terms of a measurement gap regardless of the C-DRX configuration.

Figure 39:
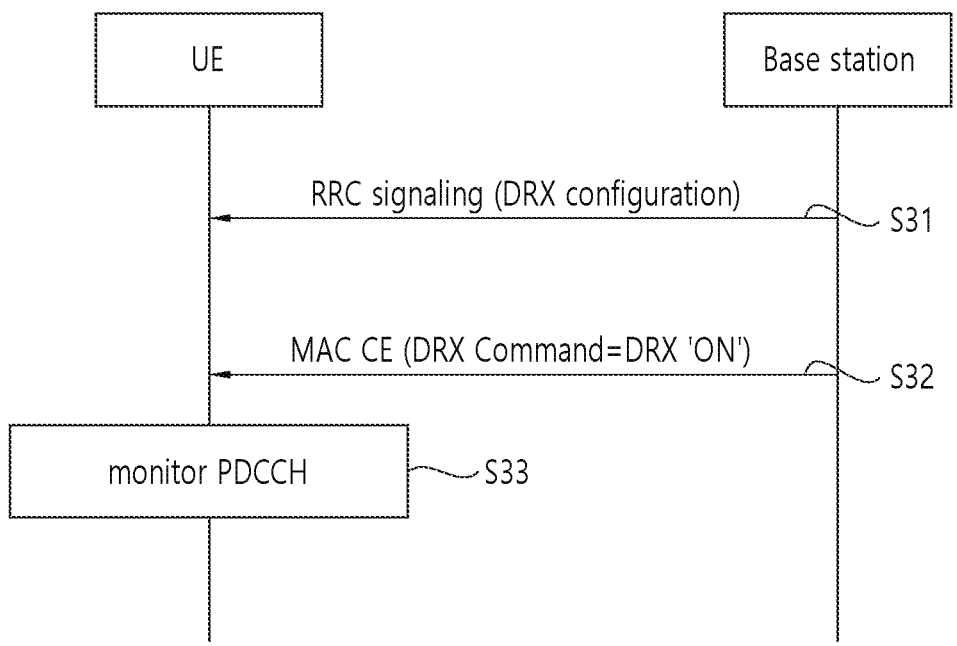
FIG. 39 is a flow diagram illustrating one example of a method for performing a C-DRX operation.

FIG. 39 is a flow diagram illustrating one example of a method for performing a C-DRX operation.

The UE may receive RRC signaling (for example, MAC-MainConfig IE) including DRX configuration information from a base station S21.

Here, DRX configuration information may include the following information.

onDurationTimer: The number of PDCCH subframes to be monitored continuously from the starting position of a DRX cycle.

drx-InactivityTimer: The number of PDCCH subframes to be monitored continuously when the UE decodes a PDCCH having scheduling information.

drx-RetransmissionTimer: The number of PDCCH subframes to be monitored continuously when HARQ retransmission is expected.

longDRX-Cycle: The period during which On Duration is generated.

drxStartOffset: The subframe number at which a DRX cycle is started.

drxShortCycleTimer: The short DRX cycle number shortDRX-Cycle: A DRX cycle operating as many times as the number of drxShortCycleTimers when the Drx-InactivityTimer expires.

Also, when DRX 'ON' is configured by the DRX command of the MAC Command Element (CE) S22, the UE monitors the PDCCH with respect to the On Duration of the DRX cycle based on the DRX configuration S23.

Figure 40:
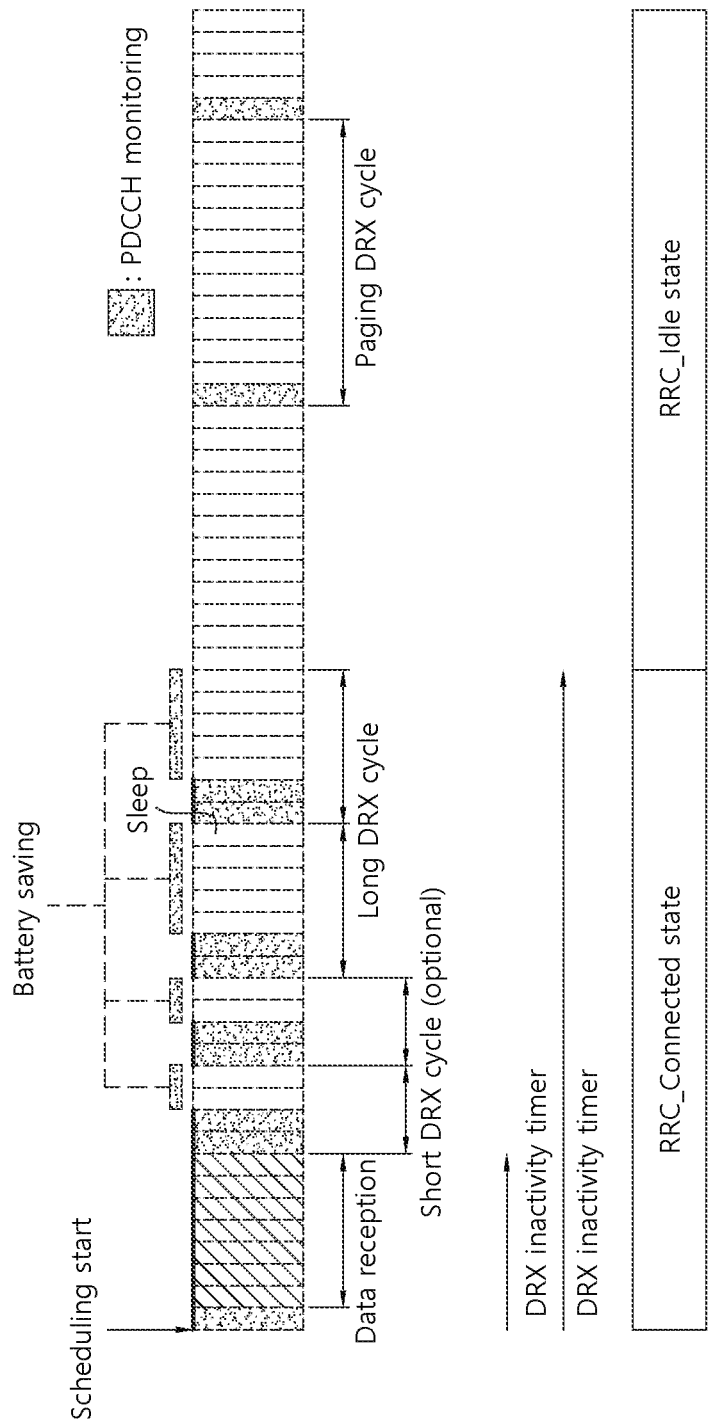
FIG. 40 illustrates an example of a C-DRX operation.

FIG. 40 illustrates an example of a C-DRX operation.

If the UE receives scheduling information (for example, a DL grant) in the RRC_CONNECTED state (in what follows, referred to as connected state), the UE may execute the DRX inactive timer and the RRC inactive timer.

When the DRX inactive timer expires, the DRX mode may be started. The UE may wake up from the DRX cycle and monitor the PDCCH for a predetermined time period (on the duration timer).

In this case, when short DRX is configured and the UE starts the DRX mode, the UE first starts with a short DRX cycle and after the short DRX cycle is completed, starts a long DRX cycle. Here, the long DRX cycle may correspond to a multiple of the short DRX cycle. Moreover, during the short DRX cycle, the UE may wake up more often. After the RRC inactive timer expires, the UE may transition to the IDLE state and perform the IDLE mode DRX operation.

In what follows, a combination of IA/RA and a DRX operation (IA/RA+DRX operation) is described.

Figure 41:
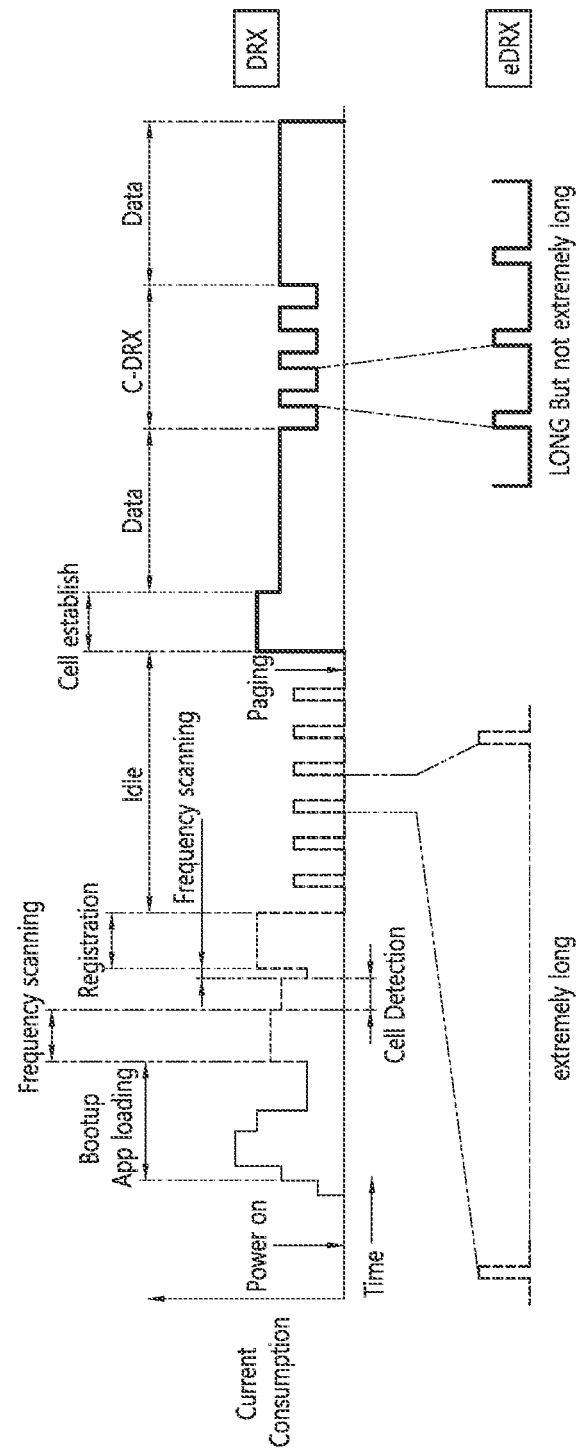
FIG. 41 illustrates an example of power consumption according to the state of a UE.

FIG. 41 illustrates an example of power consumption according to the state of a UE.

According to FIG. 41, after the UE is powered up, the UE performs boot-up for application loading, an initial access/random access procedure for downlink and uplink synchronization with a base station, and a registration procedure for a network. FIG. 41 shows an amount of current (or an amount of power) consumed while each procedure is carried out.

If transmission power of the UE is high, current consumption of the UE may be increased. Also, when the UE does not have traffic to be transmitted thereto or to a base station, the UE transitions to the idle mode to reduce power consumption and performs the idle mode DRX operation.

Meanwhile, if paging (for example, a call) occurs during the idle mode DRX operation, the UE may transition to the connected mode from the idle mode through a cell establishment procedure and transmit and receive data to and from the base station.

Also, when there is no data received from or transmitted to the base station in the connected mode or for a specific time period of a configured timing, the UE may perform the connected mode DRX (C-DRX).

Also, when the UE is configured with extended DRX (eDRX) through upper layer signaling (for example, system information), the UE may perform an eDRX operation in the idle mode or connected mode.

What is claimed is:

1. A method for receiving a downlink signal performed by a user equipment (UE) in a wireless communication system, the method comprising:
receiving a Synchronization Signal Block (SSB) from a base station; and
receiving the downlink signal from the base station,
wherein the SSB is received periodically on every N-th Fixed Frame Period (FFP), wherein the N is an integer larger than or equal to 1, and
wherein, for an operation with shared spectrum channel access, a reception of the SSB in a half frame is within a time resource that starts from a first symbol of a first slot in the half frame.

2. The method of claim 1, wherein at least one of the SSB and the downlink signal is transmitted on an unlicensed band.

3. The method of claim 1, wherein the FFP is determined by the base station.

4. The method of claim 1, wherein the FFP is less than or equal to 10 milliseconds (ms).

5. The method of claim 1, wherein a transmission period of the SSB is the same as a measurement period related to cell measurement.

6. The method of claim 5, wherein the cell measurement is a measurement of a serving cell or a neighboring cell.

7. The method of claim 1, wherein the FFP includes a channel occupancy time and an idle period, and
wherein the idle period includes an observation slot.

8. The method of claim 1, wherein the UE receives the SSB and the downlink signal within a specific channel occupancy time.

9. The method of claim 8, wherein, based on the downlink signal including an uplink grant, the UE performs uplink transmission to the base station from the time at which the uplink grant is received to the end time of the specific channel occupancy time.

10. The method of claim 9, wherein the uplink transmission includes transmission related to a Random Access Channel (RACH).

11. The method of claim 1, wherein a first parameter configured for a first operator related to the base station initiating device is different from a second parameter configured for a second operator, and
wherein the first parameter is at least one of the length of an observation slot, a contention window size, and a Clear Channel Assessment (CCA) threshold.

12. A user equipment (UE), comprising:
- a transceiver configured to transmit and receive a radio signal;
- a processor; and
- a computer-readable memory storing instructions that, when executed by the processor, perform operations comprising:
- receiving a Synchronization Signal Block (SSB) from a base station; and
- receiving a downlink signal from the base station,
- wherein the SSB is received periodically on every N-th Fixed Frame Period (FFP), wherein the N is an integer larger than or equal to 1, and
- wherein, for an operation with shared spectrum channel access, a reception of the SSB in a half frame is within a time resource that starts from a first symbol of a first slot in the half frame.

13. The UE of claim 12, wherein the UE communicates with at least one of a mobile terminal, a network, and a self-driving vehicle other than the UE.

* * * * *